(12) United States Patent
Sundell et al.

(10) Patent No.: US 12,511,981 B2
(45) Date of Patent: Dec. 30, 2025

(54) SYSTEMS AND METHODS OF PROFILE SHARING

(71) Applicant: SimpliSafe, Inc., Boston, MA (US)

(72) Inventors: Dan Sundell, Medford, MA (US); Jordan Thayer, Hopkinton, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/926,893

(22) Filed: Oct. 25, 2024

(65) Prior Publication Data

US 2025/0246054 A1  Jul. 31, 2025

Related U.S. Application Data

(60) Provisional application No. 63/625,682, filed on Jan. 26, 2024.

(51) Int. Cl.
  *G08B 13/196* (2006.01)
  *G06V 40/16* (2022.01)

(52) U.S. Cl.
  CPC ..... *G08B 13/19602* (2013.01); *G06V 40/172* (2022.01)

(58) Field of Classification Search
  CPC . G06T 2207/30232; G06T 2207/30196; G06T 2207/30201; H04N 7/186; H04N 7/18; H04N 7/188; H04N 7/183; H04L 12/2803; H04W 12/08; G08B 13/19684; G08B 13/19695; G08B 13/19682; G08B 25/001; G06V 20/52; G06V 20/44; G06V 40/16; H04M 11/025; H04M 1/0291
  See application file for complete search history.

(56) References Cited

U.S. PATENT DOCUMENTS

| | | |
|---|---|---|
| 7,426,512 B1 | 9/2008 | Ben-Natan |
| 8,861,804 B1 | 10/2014 | Johnson et al. |
| 9,307,269 B2 | 4/2016 | Martin et al. |
| 9,448,704 B1 | 9/2016 | Belhumeur et al. |
| 9,728,077 B1* | 8/2017 | Fu ................. G08B 27/003 |
| 10,679,443 B2 | 6/2020 | Grigorov et al. |
| 11,218,297 B1 | 1/2022 | Hegg et al. |
| 12,118,864 B2 | 10/2024 | Sundell et al. |
| 12,154,386 B2 | 11/2024 | Gupta et al. |

(Continued)

FOREIGN PATENT DOCUMENTS

| CN | 105191331 A | 12/2015 |
|---|---|---|
| CN | 107067504 A | 8/2017 |

(Continued)

OTHER PUBLICATIONS

Abrams et al., "Video Content Analysis with Effective Response", 2007 IEEE Conference on Technologies for Homeland Security, doi:10.1109/THS.2007.370020 (May 2007).

(Continued)

*Primary Examiner* — Jared Walker
(74) *Attorney, Agent, or Firm* — Finch & Maloney PLLC

(57) ABSTRACT

A method includes receiving, from a computing device, input specifying a profile of a subject authorized to access a location; receiving, from an image capture device of a system, an image acquired at the location, the image depicting the subject; and refraining from initiating an alarm signal in response to detection of the subject by the system based on the image and the profile.

18 Claims, 60 Drawing Sheets

(56) References Cited

U.S. PATENT DOCUMENTS

| | | | |
|---|---|---|---|
| 12,293,132 B2 | 5/2025 | Hirukawa | |
| 12,300,080 B2 | 5/2025 | Nalen et al. | |
| 2004/0024851 A1 | 2/2004 | Naidoo et al. | |
| 2006/0095539 A1 | 5/2006 | Renkis | |
| 2006/0155851 A1 | 7/2006 | Ma et al. | |
| 2006/0176167 A1 | 8/2006 | Dohrmann | |
| 2006/0209857 A1 | 9/2006 | Hicks, III | |
| 2008/0055423 A1 | 3/2008 | Ying et al. | |
| 2008/0284580 A1 | 11/2008 | Babich et al. | |
| 2008/0311879 A1 | 12/2008 | Martin et al. | |
| 2010/0245107 A1 | 9/2010 | Fulker et al. | |
| 2011/0010761 A1 | 1/2011 | Doyle | |
| 2011/0090334 A1 | 4/2011 | Hicks, III et al. | |
| 2011/0131131 A1 | 6/2011 | Griffin et al. | |
| 2012/0001755 A1 | 1/2012 | Conrady | |
| 2013/0061309 A1 | 3/2013 | Diaz-Cuellar et al. | |
| 2013/0276061 A1 | 10/2013 | Chebiyyam et al. | |
| 2013/0282180 A1 | 10/2013 | Layton | |
| 2014/0250126 A1* | 9/2014 | Baldwin | G06F 16/51 707/737 |
| 2014/0267716 A1* | 9/2014 | Child | H04N 7/186 348/143 |
| 2015/0095352 A1 | 4/2015 | Lacey | |
| 2015/0156031 A1* | 6/2015 | Fadell | G08B 27/003 700/90 |
| 2015/0312050 A1 | 10/2015 | Warren | |
| 2015/0339912 A1 | 11/2015 | Farrand et al. | |
| 2016/0191864 A1* | 6/2016 | Siminoff | H04M 11/025 348/155 |
| 2016/0300465 A1 | 10/2016 | Britton et al. | |
| 2017/0003829 A1 | 1/2017 | Wilde et al. | |
| 2017/0018167 A1 | 1/2017 | Dey et al. | |
| 2017/0024408 A1 | 1/2017 | Foley et al. | |
| 2017/0070563 A1 | 3/2017 | Sundermeyer et al. | |
| 2017/0195625 A1 | 7/2017 | Mahar et al. | |
| 2017/0324624 A1 | 11/2017 | Taine et al. | |
| 2018/0018081 A1 | 1/2018 | Dattilo-Green et al. | |
| 2018/0124606 A1 | 5/2018 | Macy et al. | |
| 2018/0157835 A1 | 6/2018 | Nos | |
| 2019/0043326 A1 | 2/2019 | Madden et al. | |
| 2019/0245869 A1 | 8/2019 | Dawes et al. | |
| 2019/0286901 A1* | 9/2019 | Blanco | G08B 13/19693 |
| 2019/0378176 A1* | 12/2019 | O'Brien | G06Q 30/0267 |
| 2020/0090662 A1 | 3/2020 | Castro et al. | |
| 2020/0226416 A1 | 7/2020 | Bapat et al. | |
| 2020/0304875 A1 | 9/2020 | Krishnan et al. | |
| 2020/0327315 A1 | 10/2020 | Mullins | |
| 2021/0037174 A1 | 2/2021 | Meganathan et al. | |
| 2021/0042527 A1 | 2/2021 | Ton-That | |
| 2021/0165898 A1 | 6/2021 | Weiss et al. | |
| 2021/0165917 A1 | 6/2021 | Yu et al. | |
| 2021/0302052 A1 | 9/2021 | Trinh | |
| 2021/0329165 A1 | 10/2021 | Liu et al. | |
| 2021/0334399 A1 | 10/2021 | Wright et al. | |
| 2021/0377276 A1 | 12/2021 | Dasari et al. | |
| 2022/0027511 A1 | 1/2022 | Watkins | |
| 2022/0057815 A1 | 2/2022 | Raz | |
| 2022/0114851 A1* | 4/2022 | Carter | G08B 13/19695 |
| 2022/0157139 A1 | 5/2022 | Subramany | |
| 2022/0240058 A1 | 7/2022 | Conner | |
| 2022/0357801 A1 | 11/2022 | Udall et al. | |
| 2022/0366727 A1 | 11/2022 | Gupta et al. | |
| 2022/0382840 A1* | 12/2022 | Weston | G06V 40/30 |
| 2022/0417473 A1 | 12/2022 | Davidson et al. | |
| 2023/0114650 A1 | 4/2023 | Keith, Jr. | |
| 2023/0214097 A1 | 7/2023 | Pearson et al. | |
| 2023/0316229 A1 | 10/2023 | Lalwani et al. | |
| 2024/0019984 A1 | 1/2024 | Iwamoto | |
| 2024/0256693 A1 | 8/2024 | Wong et al. | |
| 2024/0290196 A1 | 8/2024 | Suzuki et al. | |
| 2024/0395093 A1 | 11/2024 | Ming et al. | |
| 2025/0095371 A1 | 3/2025 | Thayer et al. | |

FOREIGN PATENT DOCUMENTS

| | | |
|---|---|---|
| CN | 110910549 A | 3/2020 |
| CN | 111985663 A | 11/2020 |
| CN | 117238068 A | 12/2023 |
| EP | 3422237 A1 | 1/2019 |
| JP | 2009-098971 A | 5/2009 |
| KR | 1841882 B1 | 5/2018 |
| WO | WO2010008479 A2 | 1/2010 |
| WO | WO2014072910 A1 | 5/2014 |
| WO | WO2014144628 A2 | 9/2014 |

OTHER PUBLICATIONS

IPCOM000191225D, Advanced Video Management Systems. 21 pages, Dec. 22, 2009. (Year: 2009).

U.S. Appl. No. 18/830,658, filed Sep. 11, 2024 (129 pages).

Moustafa, Hassnaa, Eve M. Schooler, Gang Shen, and Sanjana Karnath. "Remote monitoring and medical devices control in eHealth." In 2016 IEEE 12th International Conference on Wireless and Mobile Computing, Networking and Communications (WiMob), pp. 1-8. IEEE, 2016. (Year: 2016).

Raty, Tomi, Johannes Oikarinen, Mikko Nieminen, and Mikko Lindholm. "Sensor data collection of the Single Location Surveillance Point System." In Seventh IEEE/ACIS International Conference on Computer and Information Science (icis 2008), pp. 382-387. IEEE, 2008. (Year: 2008).

Onarlioglu, Kaan, William Robertson, adn Engin Kirda, "Overhaul: Input-driven access control for better privacy on traditional operating systems." In 2016 46th Annual IEEE/IFIP International Conference on Dependable Systems and Networks (DSN), pp. 443-454. IEEE, 2016. (Year: 2016).

U.S. Appl. No. 18/987,603, filed Dec. 19, 2024 (79 pages).

International Patent Application PCT/US2025/011084, International Search Report and Written Opinion (13 pages) (Apr. 11, 2025).

Stream, "SFU, MCU or P2P: What's the Difference Between These WebRTC Architectures?" Getstream.io, Inc. Sep. 9, 2022, https://getstream.io/blog/what-is-a-selective-forwarding-unit-in-webrtc/ (Retrived Apr. 25, 2025).

* cited by examiner

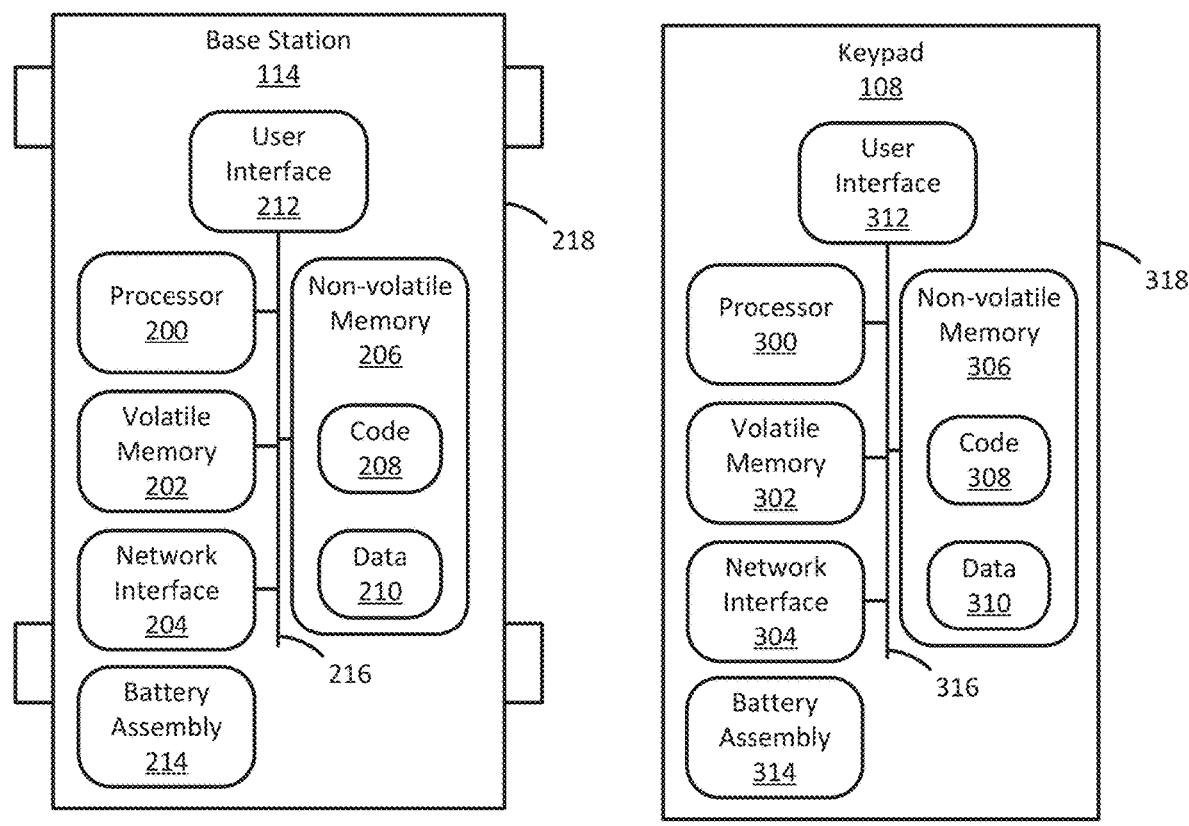

SYSTEMS AND METHODS OF PROFILE SHARING

CROSS-REFERENCE TO RELATED APPLICATION

This application claims the benefit of U.S. Provisional Patent Application 63/625,682 (filed 26 Jan. 2024), the entire disclosure of which is incorporated by reference herein.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for creating and sharing profiles that enable a security system to autonomously identify subjects (e.g., persons) who are authorized to access a location.

In at least one example, a method is provided. The method includes receiving, from a computing device, input specifying a profile of a subject authorized to access a location; receiving, from an image capture device of a system, an image acquired at the location, the image depicting the subject; and refraining from initiating an alarm signal in response to detection of the subject by the system based on the image and the profile.

In at least one other example, an image capture device is provided. The image capture device includes an image sensor; a network interface; and at least one processor. The at least one processor is configured to receive, from a computing device via the network interface, input specifying a profile of a subject authorized to access a location; receive, from the image sensor, an image acquired at the location, the image depicting the subject; and refrain from initiating an alarm signal in response to detection of the subject based on the image and the profile.

In at least one other example, a device is provided. The device includes a network interface and at least one processor. The at least one processor is configured to receive, from a computing device via the network interface, input specifying a profile of a subject authorized to access a location; receive, from an image capture device, an image acquired at the location, the image depicting the subject; and refrain from initiating an alarm signal in response to detection of the subject based on the image and the profile. The device may be a computing device, such as an image sensor, a server, a base station, or some other computing device.

In at least one other example, a server within a data environment is provided. The server within the data environment includes a network interface; and at least one processor. The at least one processor is configured to receive, from a computing device via the network interface, input specifying a profile of a subject authorized to access a location; receive, from an image capture device, an image acquired at the location, the image depicting the subject; and refrain from initiating an alarm signal in response to detection of the subject based on the image and the profile.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 2 is a schematic diagram of a base station, according to some examples described herein.

FIG. 3 is a schematic diagram of a keypad, according to some examples described herein.

DETAILED DESCRIPTION

Figure 1:
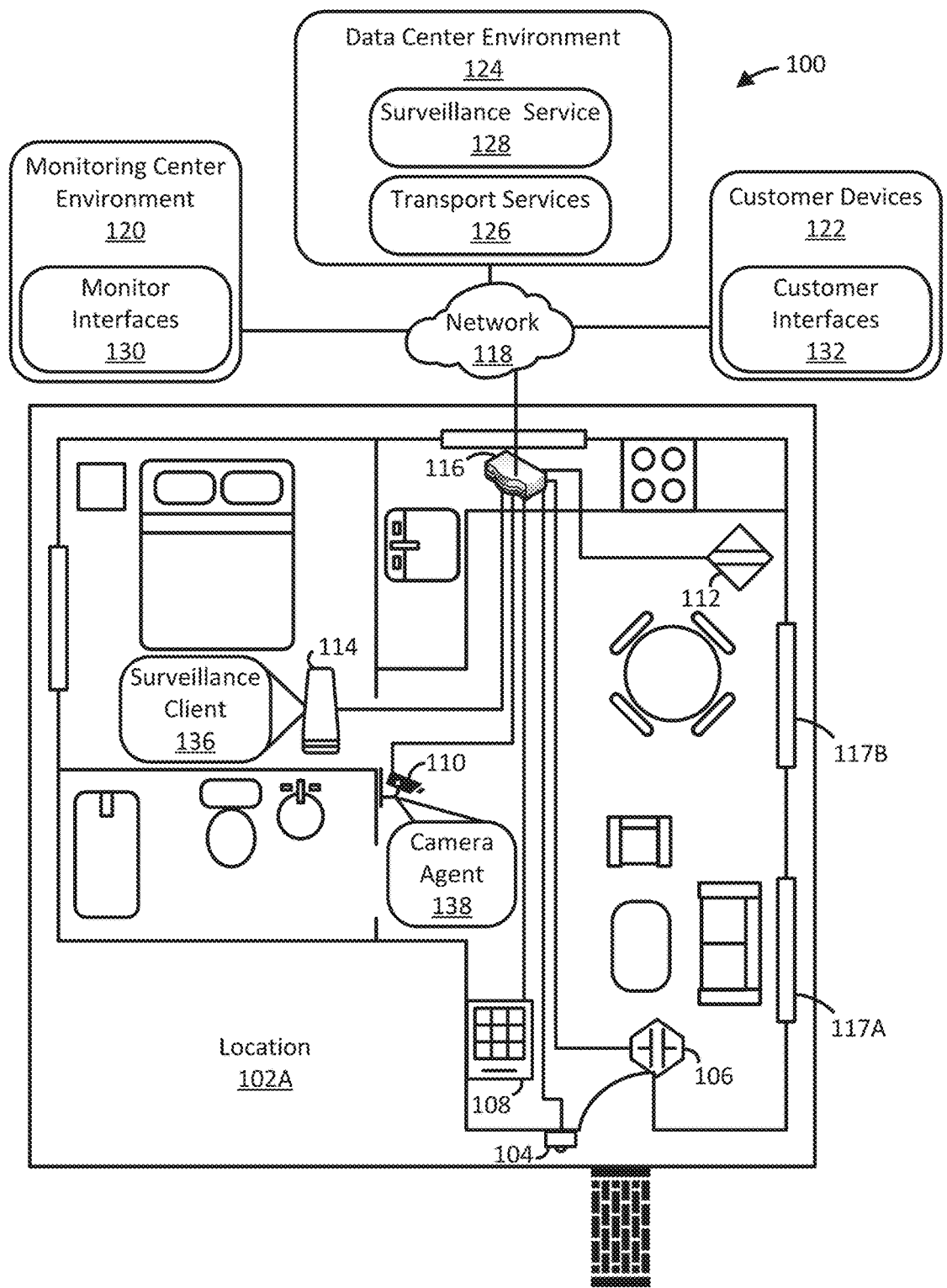
FIG. 1 is a schematic diagram of a security system, according to some examples described herein.

As summarized above, at least some examples disclosed herein are directed to systems and processes that create and utilize profiles to identify individuals who are authorized to access monitored locations. In some examples, a profile includes one or more images (e.g., photographs) that depict the face of a subject, a list of locations the subject is authorized to access, and an indicator of a type of the profile. For instance, in certain examples, a profile is recorded as a data structure with fields allocated to store the informational attributes listed above. The facial images included in the profile can be used to train facial recognition processes that utilize artificial intelligence (AI) models to recognize the subject of a profile. The list of locations can be used by customers to fine tune the applicability of the profiles to specific customer locations. The profile type can be used to determine the target audience and effect of the profile. For instance, in some examples, profiles of the customer type are used to determine whether potential threats (e.g., persons detected at a location) are actually benign (e.g., authorized to be at the location). As such, creation and use of a customer profile can change an event (e.g., the appearance of a person at a monitored location) that would normally be reportable to a customer and/or monitoring personnel to a non-reportable event. Profiles of the curated type may be created by, and shared among, monitoring personnel. In certain examples, curated profiles do not filter event reporting, but can, nevertheless provide helpful context to monitoring personnel when handling a potential threat at a monitored location. In addition, in some examples, curated profiles can be made available to promotion, by the customer, to customer profiles. In these examples, curated profiles that are made available for promotion assume a recommended profile type. A recommended profile may be, for example, a profile that a monitoring professional creates and offers to a customer for consideration and potential adoption as a one of the customer's profiles. In some examples the customer can either promote the recommended profile to a customer profile or demote the recommended profile back to a curated profile.

Creation and use of profiles can yield a variety of benefits including reduction of false alarms sent to customers and/or monitoring personnel, conservation of security system resources, and provision of actionable information for monitoring personnel as to who should, and who should not, be allowed to visit a location.

Profiles allow a security system to autonomously recognize and dispose of issues that might otherwise require handling by monitoring personnel. Moreover, even if a situation cannot be disposed of autonomously by a security system, the presence of profiles provides monitoring personnel with additional information that can help them handle the situation quickly and efficiently. This can be particularly helpful if the security system is large and can detect a high volume of events. Efficient and accurate processing of these events is helpful, if not required, to scale any monitoring service that surveils locations via the security system. In at least some examples disclosed herein, the profiles provide a solution to the technical challenge of resolving a high number of events detected at numerous monitored locations, as may be captured by cameras disposed both inside and outside of the monitored locations.

Despite the availability of these benefits, impediments to the adoption and widespread use of profiles remain an issue. Customers often do not understand the potential benefits and/or simply do not wish to commit the time required to set up and maintain profiles. As such, some examples disclosed herein leverage the security system support of recommended profiles to increase creation and use of customer profiles. As monitoring personnel may more readily access images from certain devices (e.g., security cameras) than customers, the monitoring personnel may be better situated to create profiles using the images from these devices. For instance, some devices at a location may regularly capture images of service personnel who visit a location (e.g., the mailman, lawncare service personnel etc.), but since the customer may not have a personal relationship with the service personnel, the customer may not have easy access to images of them. However, in this situation, the monitoring personnel may have easy access through on-site security devices. As such, the monitoring personnel may create a curated profile for the service personnel that may be promoted to a customer profile by the customer via a recommendation process. In some examples, recommended profiles that are demoted back to a curated profile are maintained in the security system and still accessible to monitoring personnel. This feature provides the monitoring personnel with helpful information regarding the customer's level of trust of the subject of the profile and prevents repeated recommendations of profiles of subjects not trusted by the customer.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 57). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5A, 5B, and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g., memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
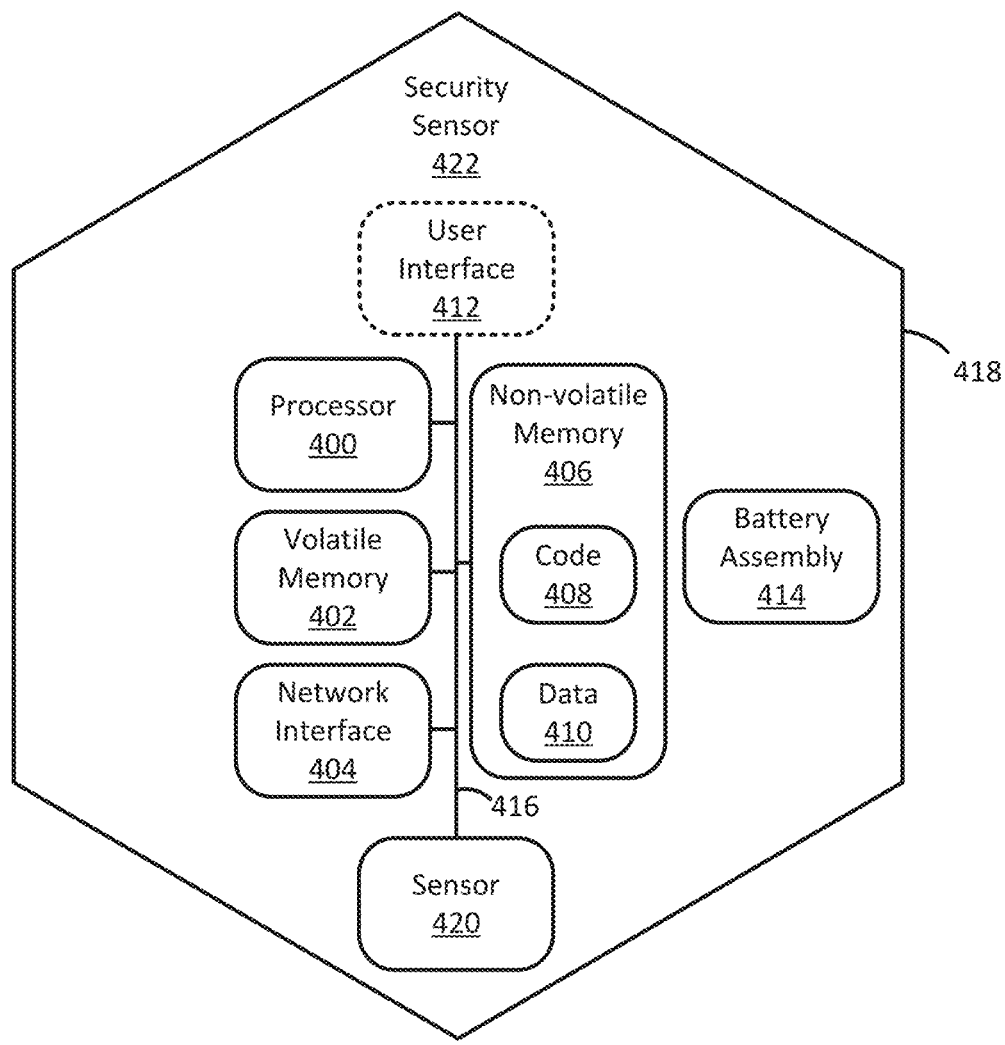
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
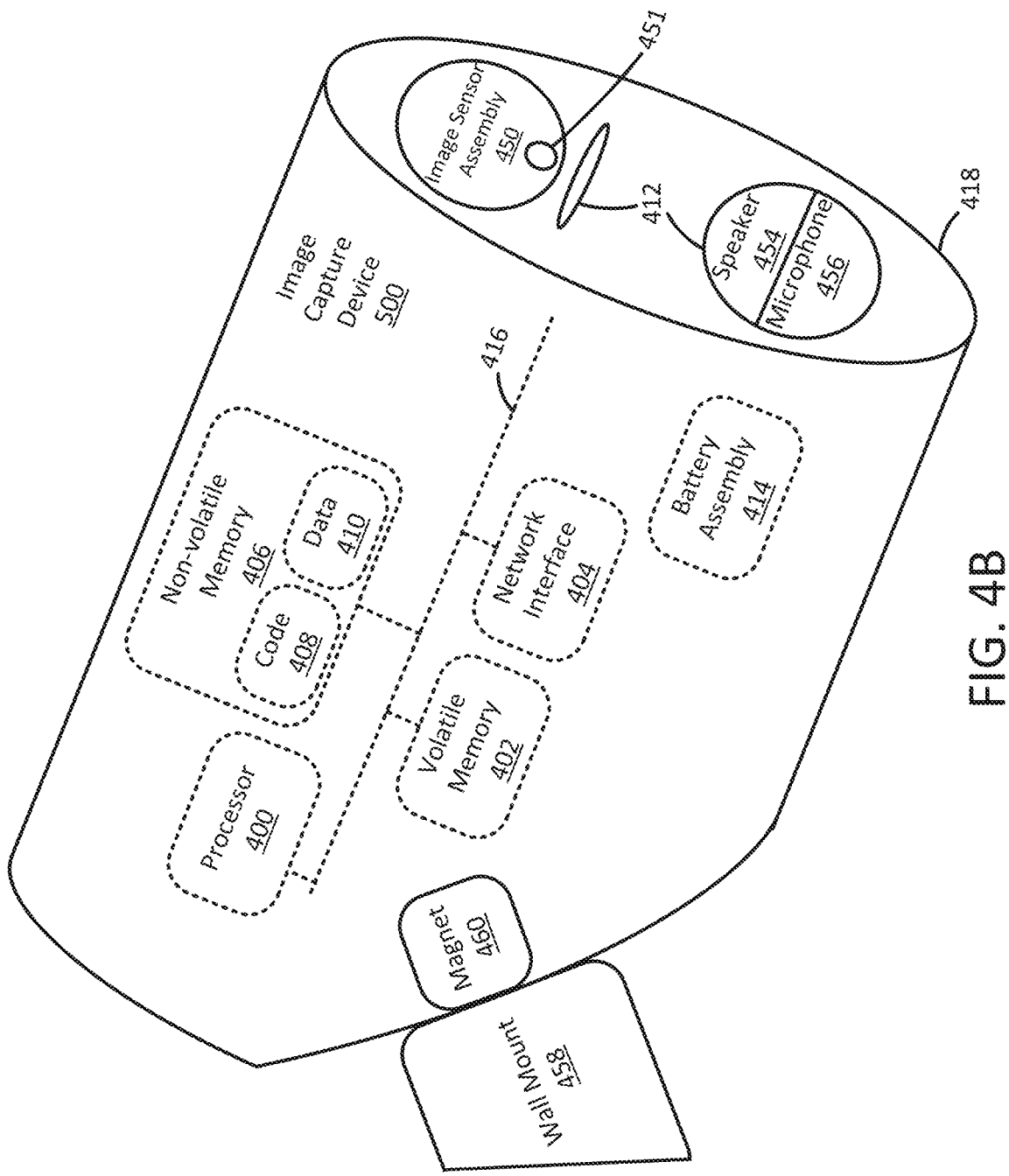
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor 451). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
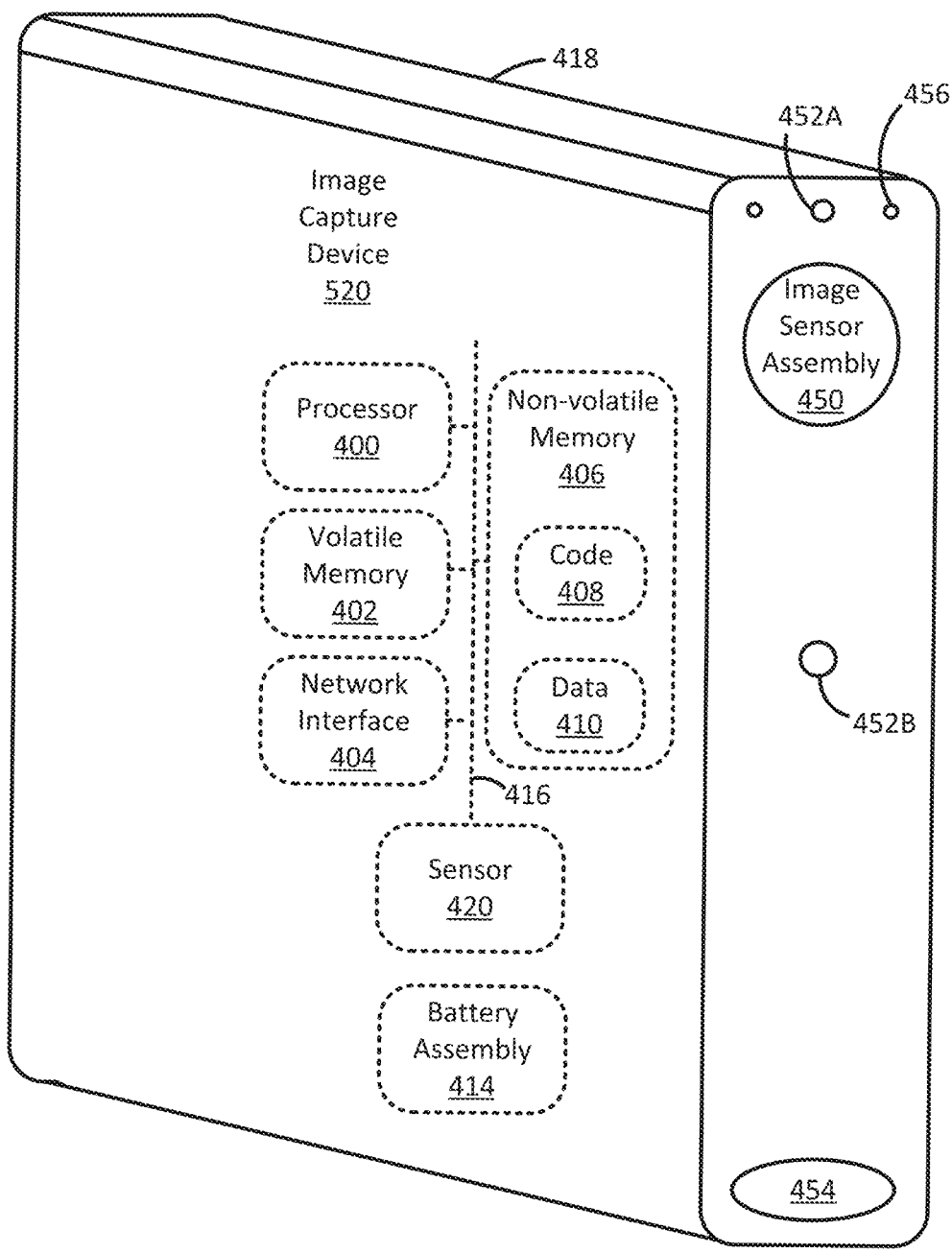
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5A:
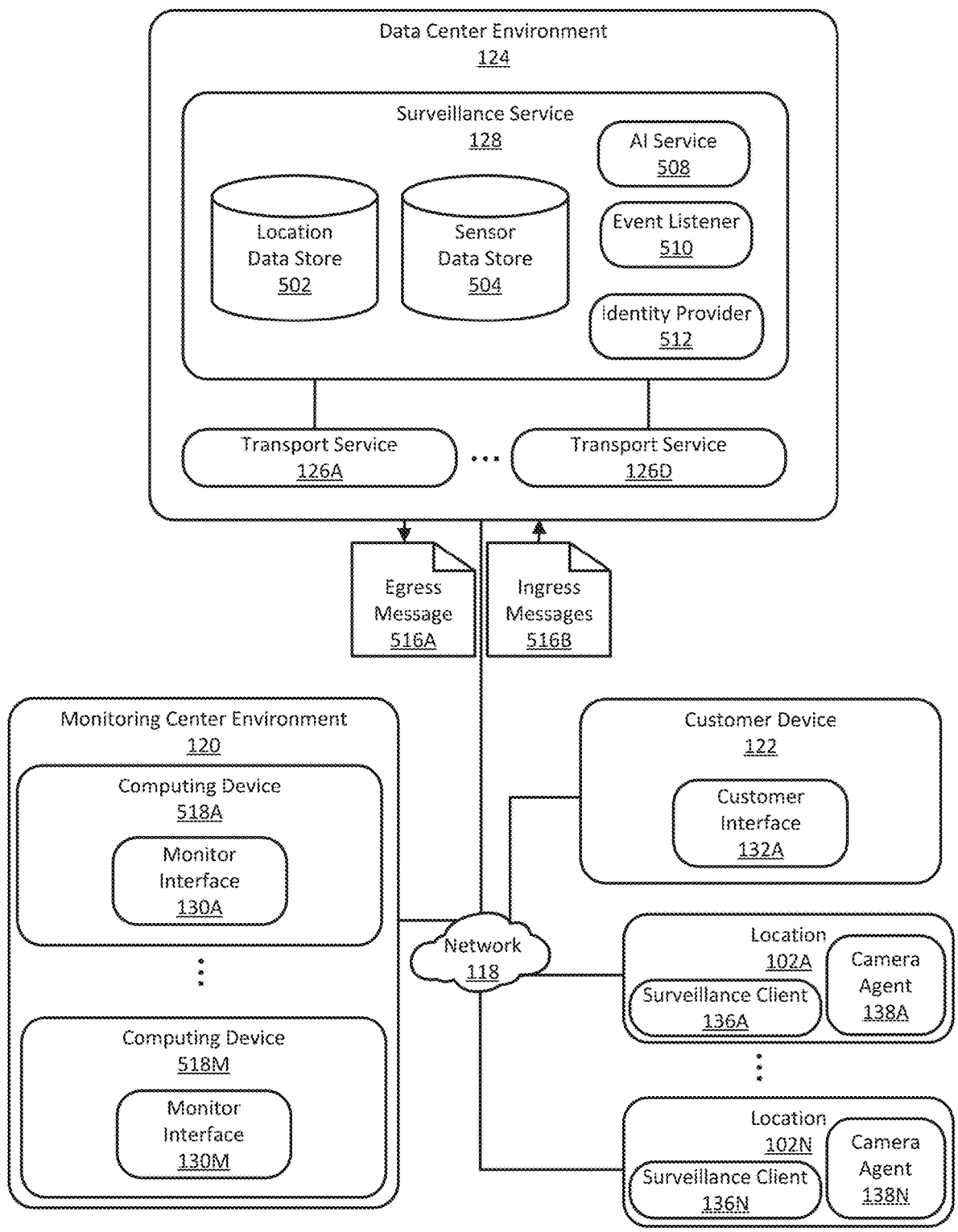
FIG. 5A is a schematic diagram of a data center environment, a monitoring center environment, and a customer device, according to some examples described herein.

Turning now to FIG. 5A, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5A, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5A, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers (e.g., user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5A, the AI service 508 is configured to process sensor data (e.g., images and/or sequences of images) to identify movement, human faces, and other features within the sensor data. In some examples, the AI service returns a classification of the sensor data and a metric indicative of level of confidence that the classification is correct. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5A, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5A, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 5B:
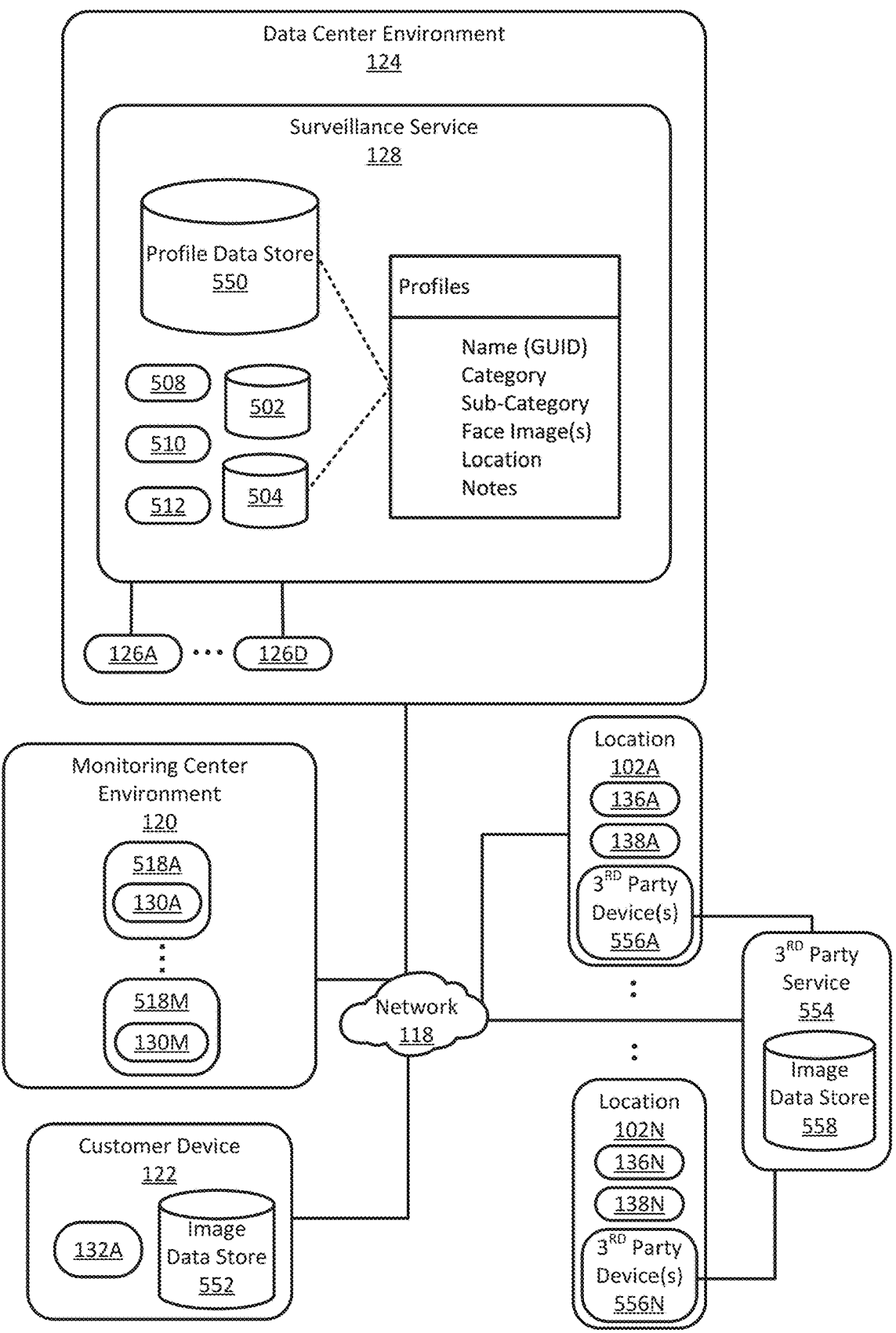
FIG. 5B is another schematic diagram of a data center environment, a monitoring center environment, and a customer device, according to some examples described herein.

Turning now to FIG. 5B, selected aspects of the system 100 of FIG. 1 that support implementation of profiles are schematically illustrated. As shown in FIG. 5B, these aspects include the data center environment 124 of FIG. 1, one of the customer devices 122 of FIG. 1, the locations 102 of FIG. 5A, and a third party service 554. The data center environment 124, the customer devices 122, and the locations 102 illustrated in FIG. 5B include the features of the data center environment 124, the customer devices 122, and the locations 102 illustrated in FIG. 5A. FIG. 5B illustrates other features not expressly enumerated in FIG. 5A, namely a profile data store 550 within the surveillance service 128, an image data store 552 within the customer device 122, and third party devices 556A-556N (collectively referred to as third party devices 556) within the locations 102. As shown in FIG. 5B, the third party service 554 includes an image data store 558.

Continuing the example of FIG. 5B, the profile data store 550 is configured to persistently store configuration data that specifies attributes of profiles. A profile can be understood as a data structure stored in a database, wherein the profile represents a person who is recognized at a monitored location. In one example, the database (profile data store 550 in FIG. 5B) is implemented using MongoDB (MongoDB, Inc., Palo Alto, CA), although other database software can be used in other implementations. In the implementation illustrated in FIG. 5B, individual records of this profile data are stored under a schema that includes fields sized and typed to store a name (such as a globally unique identifier), a category of a profile, a sub-category of a profile, one or more face images of a profile, a location, and notes descriptive of the profile. The category and sub-category fields are useful to identify groups of profiles that share specified commonalities, such as profiles associated with a particular customer or monitored location or profiles that are used by monitoring personnel and/or by customers. For instance, in some examples, the category and/or sub-category fields can be used to record the profile type (e.g., customer, curated, or recommended). In some examples, recommended profile types have a limited lifespan (e.g., 90 days) and are required to be promoted to a customer type or demoted to a curated type within the lifespan or be deleted by the system.

The face image fields are useful to train one or more parts of the AI service 508 (e.g., based on a version of OpenFace, DeepFace, Face++, FaceNet, or other generally available facial recognition package(s)) to identify individuals depicted within image data. In some examples, the data store 550 is configured to store face images as actual image files (PNG, JPEG, etc.). In certain implementations, one of the facial images can be tagged as a primary facial image for the corresponding profile. The facial image data can be stored in an array that stores facial image properties such as resolution and size. Additionally or alternatively, in some examples, the data store 550 is configured to store feature sets representative of the face images. The feature sets may include biometric embeddings generated from a plurality of facial images using an artificial intelligence model such as Ada-Face. Such biometric embeddings can support facial recognition functionality as further disclosed herein. In certain implementations, biometric embeddings are selectively removed from a profile (and more generally, from data center environment 124) to promote privacy interests or to avoid collection of biometric information from nonconsenting parties.

The location field is configured to identify one or more locations where the corresponding profile is valid. For example, a given customer may have monitoring service provided at multiple locations, so a profile of a trusted individual may be valid for one or more of the monitored locations. The notes field is configured to store textual information descriptive of the profile, as may be entered by monitoring personnel when creating curated and/or recommend profiles.

Continuing with the example of FIG. 5B, the image data store 552 is configured to persistently store image data acquired by the customer device 122 (e.g., via an integrated camera). Common examples of the image data store 552 include camera rolls supported by many smartphone operating systems, such as various versions of iOS and Android. In some examples, the customer interface 132A is configured to access the image data store 552 as part of profile setup, as described further below with reference to FIGS. 15 through 56. In these examples, the customer interface 132 is configured to communicate, as part of profile setup, face images to the surveillance service 128 through one or more API calls transmitted via the network 118 to the transport services 126. It should be noted that the face images communicated by customer interface 132 to the surveillance service 128 may be subject to a processing pipeline that, among other operations, identifies face images within the image data, isolates the face images (e.g., crops) from other image data, and stores the face images for subsequent processing, such as training one or more parts of the AI service 508 to identify subjects depicted within image data.

Continuing with the example of FIG. 5B, the third party devices 556 (e.g., other devices located at a monitored location that are not part of the system 100) are configured to obtain image data and communicate the image data to the third party service 554. The third party service 554, in turn, is configured to receive the obtained image data, store the image data in the data store 558, and communicate the stored image data to the surveillance service through one or more API calls transmitted via the network 118 to the transport services 126. It should be noted that, in some examples, the one or more API calls executed by the third party service are different from the API calls used by the customer interface 132 to communicate face images to the surveillance service 128. As a result, the image data communicated by the third party service to the surveillance service 128 may be subject to a different processing pipeline that, among other operations, identifies face images within the image data, isolates the face images (e.g., crops) from other image data, and stores the face images for subsequent processing via execution of profile creation and/or editing workflows.

Figure 6:
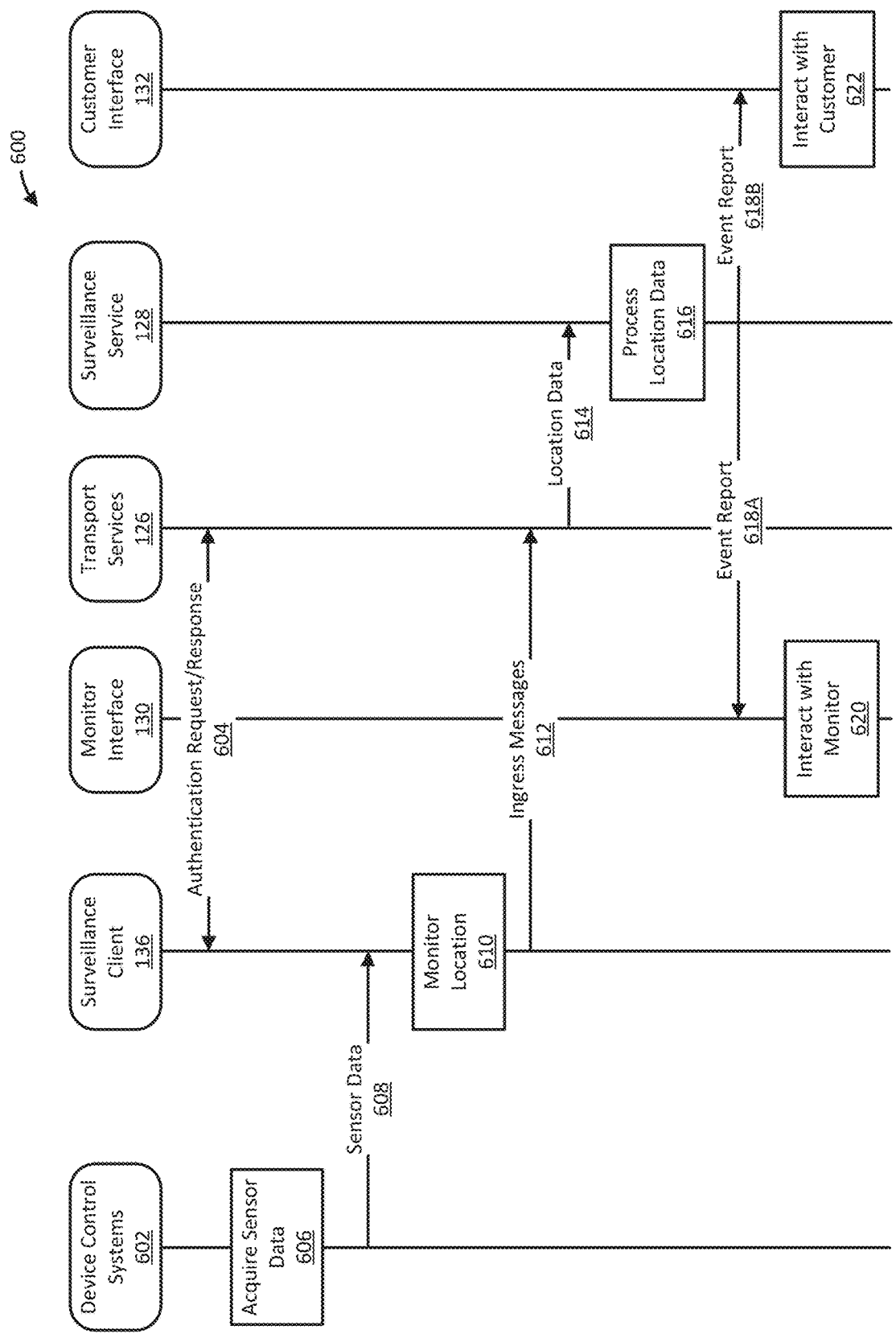
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5A) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4C. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
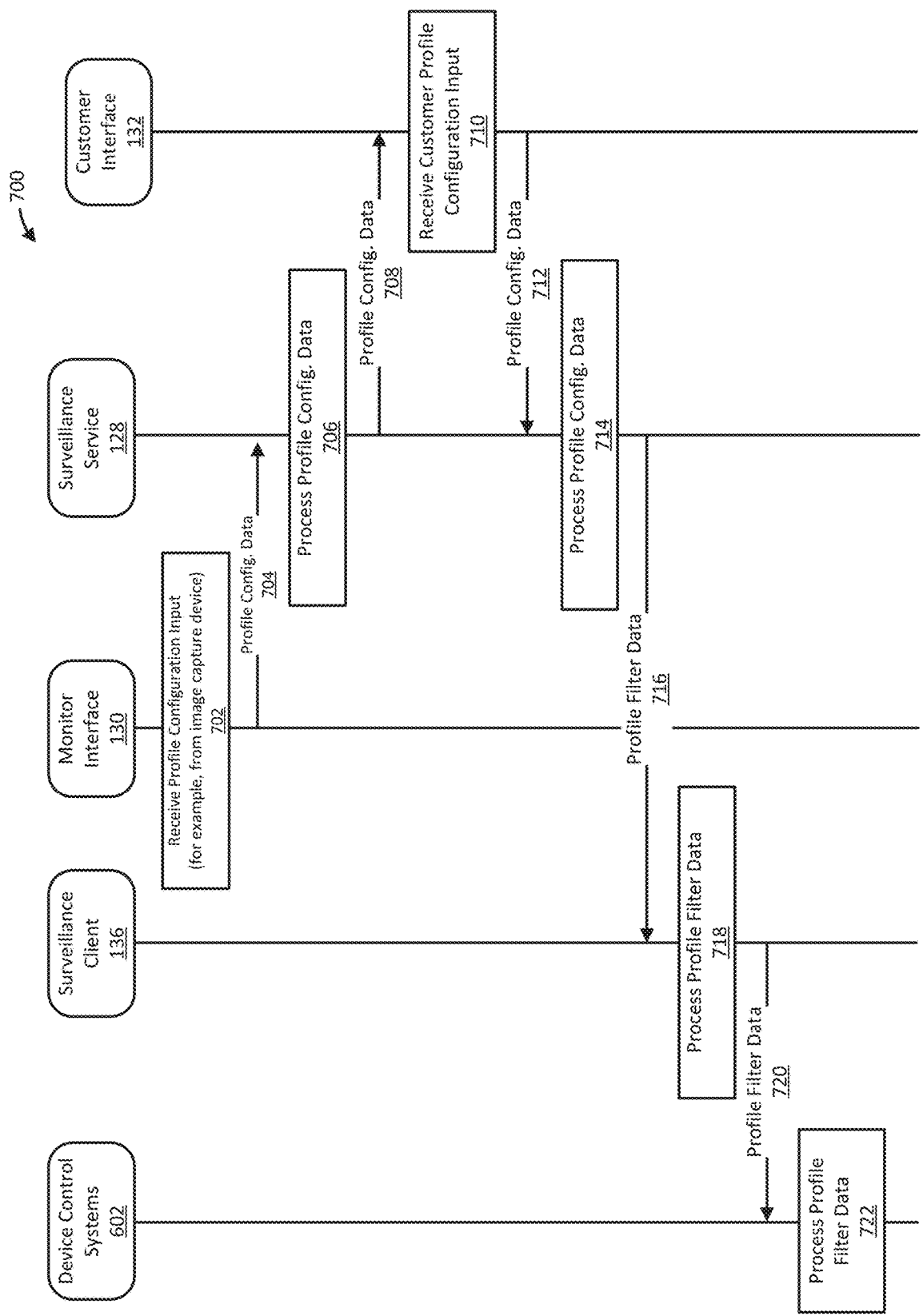
FIG. 7 is a sequence diagram of process of configuring profiles, according to some examples described herein.

Turning now to FIG. 7, a process 700 to configure profiles is illustrated as a sequence diagram. The process 700 can be executed, in some examples, by a security system (e.g., the security system 100 of FIG. 1). More specifically, in some examples, at least a portion of the process 700 is executed by the location-based devices under the control of device control system (DCS) code (e.g., the code 208, 308, or 408) implemented by at least one processor (e.g., the processors 200, 300, or 400 of FIGS. 2-4C). The DCS code can include, for example, a camera agent (e.g., the camera agent 138 of FIG. 1). At least a portion of the process 700 is executed by a base station (e.g., the base station 114 of FIG. 1) under control of a surveillance client (e.g., the surveillance client 136 of FIG. 1). At least a portion of the process 700 is executed by a monitoring center environment (e.g., the monitoring center environment 120 of FIG. 1) under control of a monitor interface (e.g., the monitor interface 130 of FIG. 1). At least a portion of the process 700 is executed by a data center environment (e.g., the data center environment 124 of FIG. 1) under control of a surveillance service (e.g., the surveillance service 128 of FIG. 1) or under control of transport services (e.g., the transport services 126 of FIG. 1) (not shown in FIG. 7). At least a portion of the process 700 is executed by a customer device (e.g., the customer device 122 of FIG. 1) under control of a customer interface (e.g., customer interface 132 of FIG. 1).

As shown in FIG. 7, the process 700 starts with the monitor interface 130 receiving 702 input specifying profile configuration information. For example, in certain implementations the profile configuration information comprises one or more images that the monitor interface 130 receives from an image capture device. The received images are used to create a new profile or supplement an existing profile. This profile configuration information may include a name of the profile, one or more face images of a visitor trusted to access one or more monitored locations, and identifiers of the one or more monitored locations. In some examples, the monitor interface 130 interacts with a user (e.g., monitoring personnel) via a user interface screen rendered and administered by the monitor interface 130 to obtain the profile configuration information. FIGS. 8-14, which are described further below, illustrate some examples of screens and administrative processes that are executed by the monitor interface 130 during the operation 702 in some examples.

Continuing with the process 700, the monitor interface 130 communicates profile configuration information 704 to the surveillance service 128. For instance, in some examples, the monitor interface 130 transmits one or more ingress messages addressed to the surveillance service 128 that specify the profile configuration information 704. Transmission of these ingress messages may be accomplished via one or more API calls to transport services (e.g., the transport service 126 of FIG. 1).

Continuing with the process 700, the surveillance service 128 processes 706 profile configuration information via one or more pipelines to validate, transform, and/or store the data (e.g., within the data store 550 of FIG. 5B). The processing executed within the operation 706 may include training an AI service (e.g., the AI service 508 of FIG. 5A) to recognize the subject of the profile using the one or more face images included in the profile configuration information. The specific processing executed within the operation 706 may depend on a variety of factors including, for example, a type of interface (e.g., customer interface, monitor interface, etc.) that generated the profile configuration information, an identity of an authenticated user (monitoring personnel, a customer, etc.) of the interface, an indicator of whether the profile is recommended for customer approval, and/or other metadata descriptive of the profile included in the configuration information.

For instance, if the type of interface that generated the profile configuration information is a customer interface or the authenticated user is a customer, the surveillance service 128 may type the profile as a customer profile and record the profile as being approved. Alternatively, where the type of interface that generated the profile configuration information is a monitor interface or the authenticated user is a monitoring professional, the surveillance service 128 may type the profile as a curated profile and record the profile as being unapproved. In some examples, if the profile configuration information indicates that the profile is of a recommended type, the surveillance service 128 may submit the profile to the customer interface 132 for approval or disapproval. The profile configuration information submitted to the customer interface 132 for approval may be for a new profile or for suggested changes to an existing profile (e.g., new and/or different face images).

In certain examples, within the operation 706 the surveillance service 128 prepares profile filter data based on the profile configuration information stored in the data store 550. For instance, in some examples, the surveillance service 128 extracts face images or features based thereon from the data store 550 and stores the extracted information in the profile filter data. Alternatively or additionally, in some examples, the surveillance service 128 trains an AI model using image data including the face images and stores model parameters (e.g., node weights, etc.) resulting from the training within the profile filter data. In some examples, the profile filter data can be distributed to base stations (e.g., the base station 114 of FIG. 1) and/or image capture devices (e.g., the image capture device 110 of FIG. 1) to enable these devices to recognize profiled subjects and take preconfigured actions (e.g., abort/not trigger an alarm) if a subject is detected at a monitored location that the subject is permitted to access. This distributed approach to recognizing subjects can reduce power consumption of, and network traffic within, the security system by distributing facial recognition processing to monitored locations.

Continuing with the process 700, the surveillance service 128 communicates profile configuration information 708 to the customer interface 132. For instance, in some examples, the surveillance service 128 transmits one or more egress messages addressed to the customer interface 132 that specify the profile configuration information 708. Transmission of these egress messages may be accomplished via transport services.

Continuing with the process 700, the customer interface 132 receives 710 input specifying profile configuration information. In some examples, the customer interface 132 may notify the customer of reception of the profile configuration information via an alert, in-app notification, and/or badge to highlight additions and/or changes made to existing profiles via the received profile configuration information. This profile configuration information may include a name of the profile, one or more face images of a visitor trusted to access one or more monitored locations, and identifiers of the one or more monitored locations. Alternatively or additionally, this profile configuration information may simply include an indicator that a curated profile has been approved to be a customer profile. In some examples, the customer interface 132 interacts with a user (e.g., a customer) via one or more user interface screens rendered and administered by the customer interface 132 to obtain the profile configuration information. FIGS. 15-56, which are described further below, illustrate some examples of screens and administrative processes that are executed by the customer interface 132 during the operation 710 in some examples.

Continuing with the process 700, the customer interface 132 communicates profile configuration information 712 to the surveillance service 128. For instance, in some examples, the customer interface 132 transmits one or more ingress messages addressed to the surveillance service 128 that specify the profile configuration information 712. Transmission of these ingress messages may be accomplished via one or more API calls to the transport services.

Continuing with the process 700, the surveillance service 128 processes 714 profile configuration information via one or more pipelines to validate, transform, and/or store the data (e.g., within the data store 550 of FIG. 5B). In some examples, the processing pipeline executed within the operation 714 is the same as the processing executed in the operation 706, albeit on potentially different profile configuration information.

Continuing with the process 700, the surveillance service 128 communicates profile filter data 716 to the surveillance client 136. For instance, in some examples, the surveillance service 128 transmits one or more egress messages addressed to the surveillance client 136 that specify the profile filter data 716 to the transport services. Transmission of these egress messages may be accomplished via the transport services.

Continuing with the process 700, the surveillance client 136 processes 718 the profile filter data via one or more pipelines to validate, transform, and/or store the data (e.g., within the data store 210 of FIG. 2). The processing executed within the operation 718 may include training an AI process local to the base station (e.g., stored in the code 208 of FIG. 2) to recognize the subject of the profile using the one or more face images included in the profile filter data. Alternatively or additionally, the processing executed within the operation 718 may include adapting the local AI process to use model parameters stored in the profile filter data 716. Regardless, as a result of the operation 718, the base station is configured to allow the subject of the profile to access the location monitored by the base station without triggering an alarm.

Continuing with the process 700, the surveillance client 136 communicates profile filter data 720 to the DCSs 602 of image capture devices at the location monitored by the surveillance client 136. For instance, in some examples, the surveillance client 136 transmits one or more messages addressed to the DCSs 602 that specify the profile filter data 720. Transmission of these messages may be accomplished via any of the LAN or PAN technologies described above with reference to FIG. 1.

Continuing with the process 700, the DCSs 602 process 722 the profile filter data via one or more pipelines to validate, transform, and/or store the data (e.g., within the data store 410 of FIGS. 4A-4C). The processing executed within the operation 722 may include training an AI process local to the image capture device (e.g., stored in the code 408 of FIGS. 4A-4C) to recognize the subject of the profile using the one or more face images included in the profile filter data. Alternatively or additionally, the processing executed within the operation 722 may include adapting the local AI process to use model parameters stored in the profile filter data 716. Regardless, as a result of the operation 722, the image capture devices are configured to allow the subject of the profile to access the location monitored by the base station without triggering an alarm.

Figure 8:
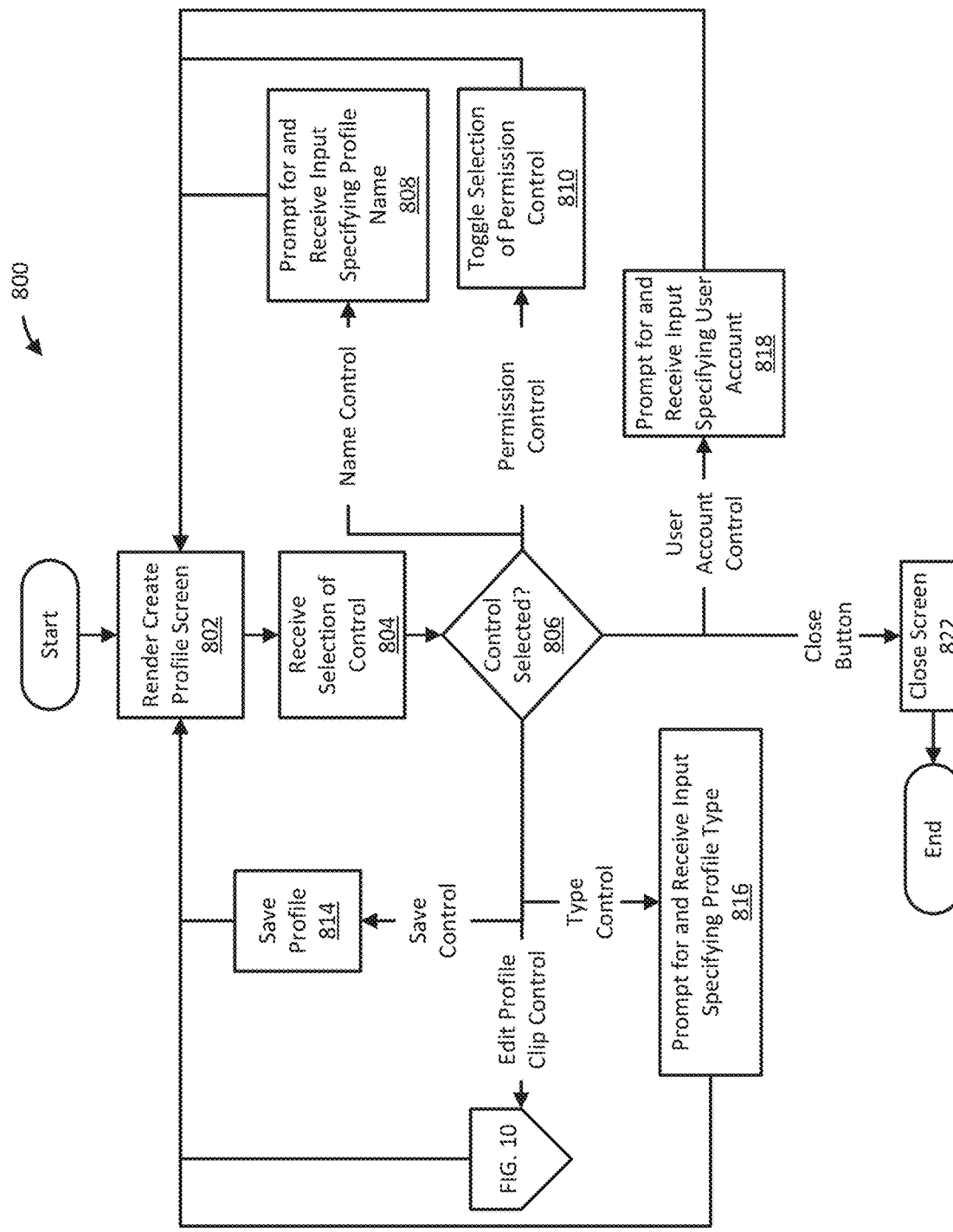
FIG. 8 is a flow diagram illustrating a process of administering a profile creation screen, according to some examples described herein.
Figure 9:
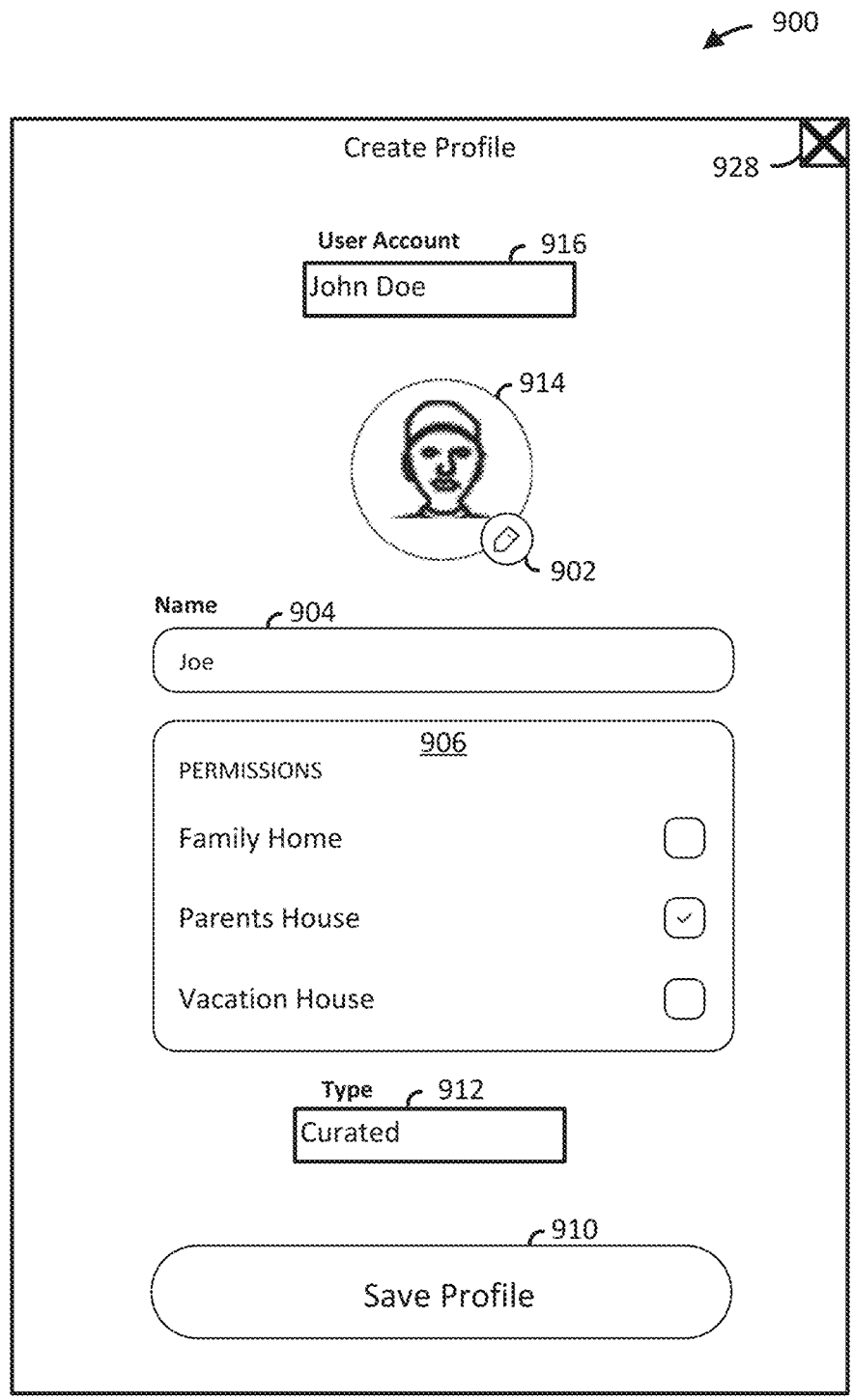
FIG. 9 is a front view of a profile creation screen, according to some examples described herein.

Turning now to FIG. 8, a process 800 of administering a profile creation screen is illustrated. As shown in FIG. 8, the process 800 starts with a program (e.g., one of the monitor interfaces 130 or customer interfaces 132 of FIG. 1) controlling a computing device (e.g., one of the computing devices 518 of FIG. 5A or a customer device 122 of FIG. 1) to render 802 a profile creation screen. FIG. 9 illustrates one example of a profile creation screen 900 that can be rendered in some examples. As shown in FIG. 9, the create profile screen 900 includes an edit profile clip button 902, a profile name control 904, a permissions list control 906, a save profile button 910, a close button 928, a profile clip control 914, a profile type control 912, and a user account control 916. Through the create profile screen 900 and the controls included therein, the program enables the user to save profiles of subjects trusted to visit locations associated with a user account.

In some examples, the profile clip control 914 is configured to display a face image (also referred to herein as a "face clip") representative of the subject of the profile being created. In some examples, the control 914 is selectable by the user to initiate selection of a particular face clip to be displayed in the control 914. The face clip initially included in the profile clip control may be a generic image. The name control 904 is configured to display a textual identifier of the profile (e.g., a subject's name). In some examples, the control 904 is selectable by the user to initiate input of a particular textual identifier. The textual identifier can include any alphanumeric character. The permissions list control 906 is configured to display a list of monitored locations associated with the user account and to indicate which individual monitored locations the subject of the profile is welcome to visit without initiating an alarm. In the example shown, entries within the permissions list control 906 are selectable by the user to toggle the entries between a marked (e.g., checked, as shown) and unmarked state. In this example, the subject of the profile is welcome to visit all monitored locations associated with a marked entry. The profile type control 912 is selectable by the user to initiate selection of a type (curated, recommended, or customer) for the profile. The user account control 916 is selectable by the user to initiate selection of a user account with which to associate the profile. The save profile button 910 is selectable by the user to create a profile with attributes specified by the other controls of the screen 900. The close button 928 is selectable by the user to close the create profile screen 900.

Returning to the process 800 of FIG. 8, the program receives 804 input selecting a control of the screen 900. For instance, in some examples, the program receives a message from an operating system or other code (e.g., a runtime engine of a development platform, a virtual machine, etc.) executing on the computing device. The message may include information regarding an interaction between the touchscreen, a mouse, or some other input device and a user. For instance, the message may specify a location, duration of interaction, and any movement detected on the touchscreen, via the mouse, etc. Alternatively or additionally, the message may specify an identifier of a control of the screen and a type of selection (e.g., a tap, a double tap, a double click, a swipe, a long press, a drag-and-drop, etc.).

Continuing with the process 800, the program determines 806 which control of the screen 900 is selected. For instance, in some examples, the program identifies the control and the type of selection based on a message received in the operation 804. In some examples, the program makes this determination by identifying the location specified in the message as being within an area of the screen occupied by the control and by classifying the selection type using the duration and type of interaction(s) specified in the message. Alternatively or additionally, the program may make this determination by reading an identifier of the control and the type of selection from the message.

Continuing with the process 800, if the program determines that the close button 928 is selected, the program closes 822 the screen 900 and returns control to the previously executing process. If the program determines that the name control 904 is selected, the program prompts for and receives 808 input specifying a name for the profile to be saved. If the program determines that a control of the permissions list control 906 was selected, the program toggles 810 marking of the selected control. If the program determines that the profile type control 912 is selected, the program prompts for and receives 816 input specifying a type for the profile. If the program determines that the user account control 916 is selected, the program prompts for and receives 818 input specifying a user account for the profile. If the program determines that the save profile button 910 is selected, the program saves 814 the profile. In some examples, the program prompts the user for, and receives input specifying, notes descriptive of the profile as part of the operation 814. This prompt may include previously recorded notes. It should be noted that the operation 814 may involve saving profile information locally and/or remotely, so that the security system as a whole can utilize the information to recognize persons permitted to visit specified locations without the visit resulting in an alarm. This utilization can include, for example, training one or more AI processes executed within the system to better recognize the subject of the saved profile. These training operations may utilize one or more face clips associated with or otherwise assigned or linked to the profile. Furthermore, within the operation 814, the security system may select a face clip to display within the profile clip control 914 based, for example, on completeness and clarity metrics of the face clip calculated by the security system, as described herein. In some examples, the completeness metric is based on a percentage of landmarks positively identified in the face clip. If no face clips have been selected for the profile, the app may include a generic image within the profile clip control 914.

Figure 10:
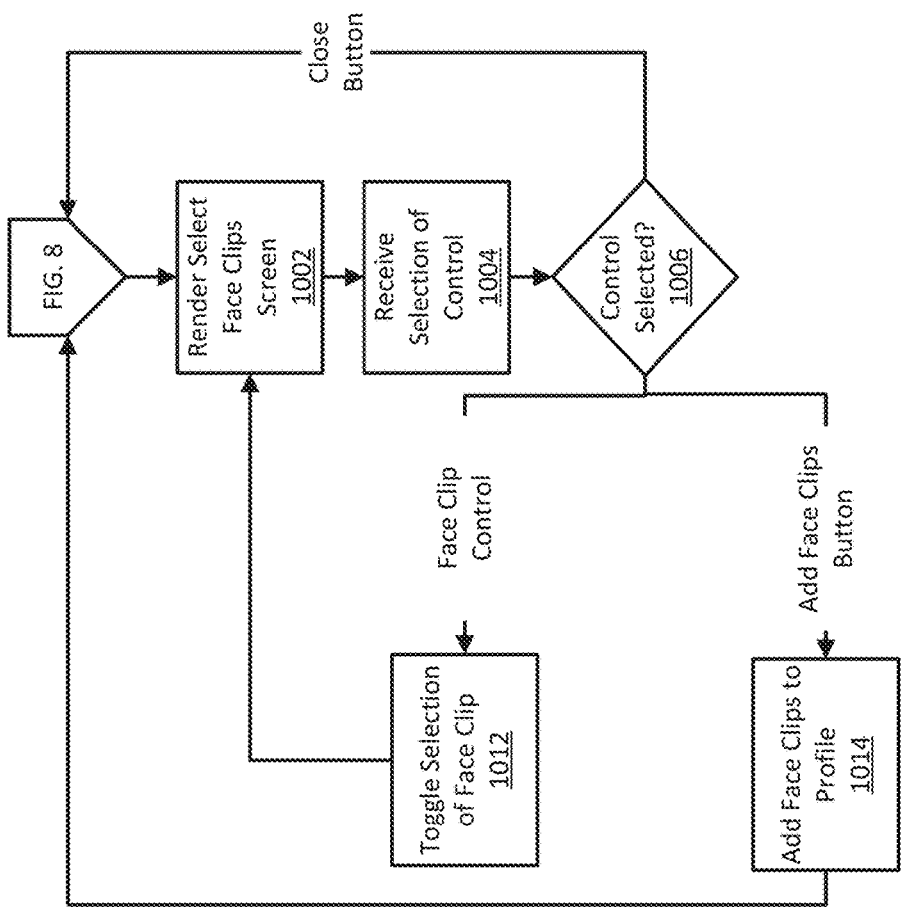
FIG. 10 is a flow diagram illustrating a process of administering a face clip selection screen, according to some examples described herein.
Figure 11:
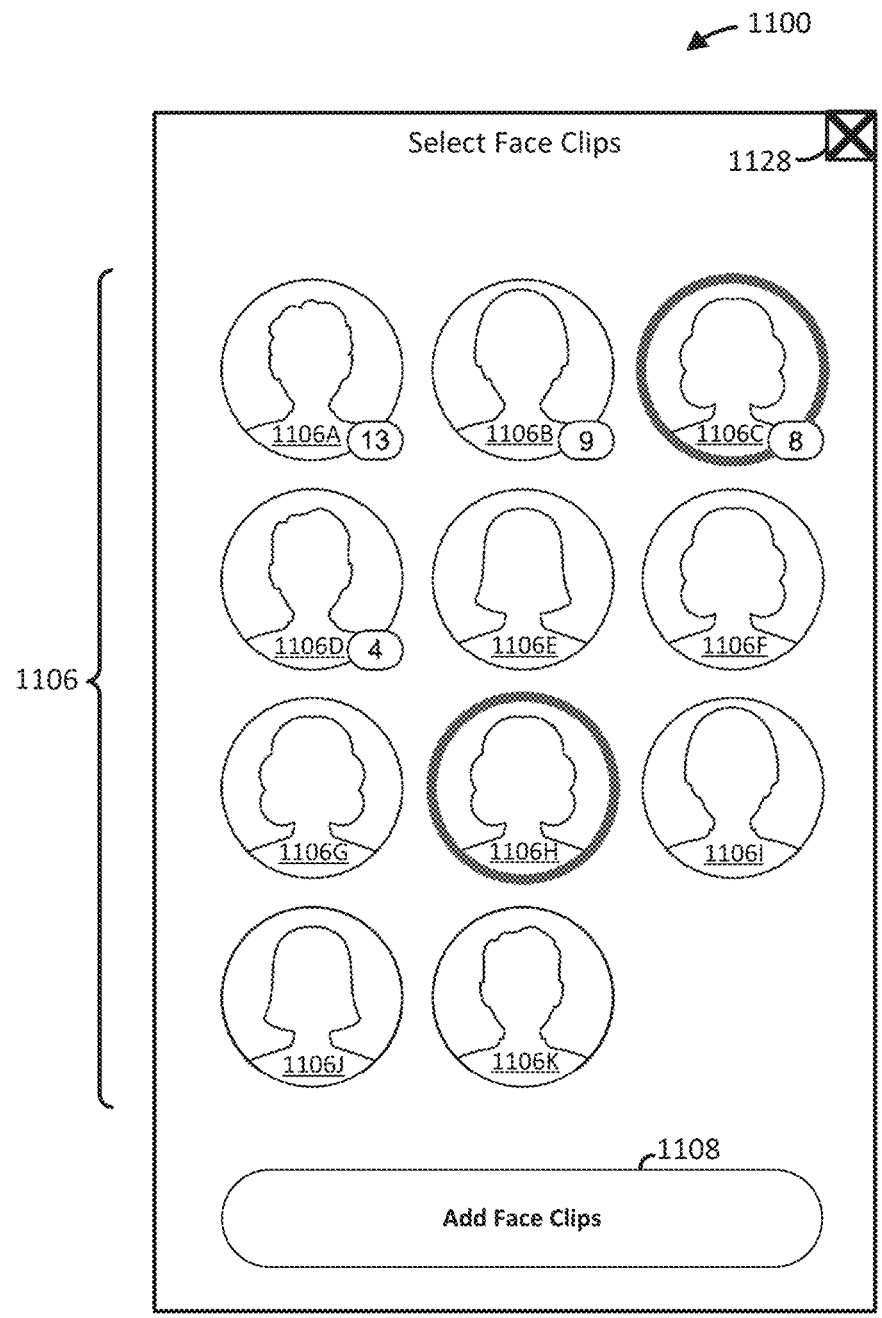
FIG. 11 is a front view of a face clip selection screen, according to some examples described herein.

Continuing with the process 800, if the program determines that the edit profile clip button 902 is selected, the program executes a configuration process to update one or more face clips associated, assigned, or linked with the profile. FIG. 10 illustrates an example of such a process, a face clip selection process 1000. As shown in FIG. 10, the process 1000 starts with the program controlling the host mobile computing device to render 1002 a face clips selection screen via the touchscreen. FIG. 11 illustrates one example of a face clips selection screen 1100 that can be rendered in some examples. As shown in FIG. 11, the screen 1100 includes a clip control group 1106, an add button 1108, and a close button 1128. The clip control group 1106 includes face clip controls 1106A-1106K.

In some examples, individual face clip controls within the clip control group 1106 include a face clip of a subject (e.g., a person). In these examples, individual face clip controls can also include a number indicating a count of distinct face clips recognized and/or stored in the security system for the person. As shown in FIG. 11, the face clip control 1106A indicates that the security system has 13 face clips stored for the person depicted in the face clip control 1106A. Similarly, face clip controls 1106B-1106D indicate security system storage of 9, 8, and 4 face clips for the persons depicted in face clip controls 1106B-1106D, respectively. Where the security system stores only a single face clip for a person, no number may be included in the face clip control associated with the person, as illustrated by controls 1106E-1106K.

In some examples, the user can select any one or more of the controls 1106A-1106K to mark the control for subsequent processing. As shown in FIG. 11, controls 1106C and 1106H are marked. Marked controls can be highlighted (e.g., encircled) in some examples. In certain examples, the user can select the add button 1108 to associate marked face clips with the profile being edited. The user can select the close button 1128 to return to the previous screen.

Returning to the process 1000 of FIG. 10, the program receives 1004 input selecting a control of the screen 1100. For instance, in some examples, the program receives the input selecting the control by executing the processing described above with reference to the operation 804 of FIG. 8.

Continuing with the process 1000, the program determines 1006 which control of the screen 1100 is selected. For instance, in some examples, the program identifies the control and the type of selection by executing the processing described above with reference to the operation 806 of FIG. 8.

Continuing with the process 1000, if the program determines that the close button 1128 is selected, the program returns to the previously executing process. If the program determines that one of the face clip controls 1106A-1106K is selected, the program toggles 1012 marking of the selected face clip control for subsequent processing. If the program determines that the add button 1108 is selected, the program associates, assigns, or links 1014, with the profile being edited, the face clips associated with the marked face clip controls.

Figure 12:
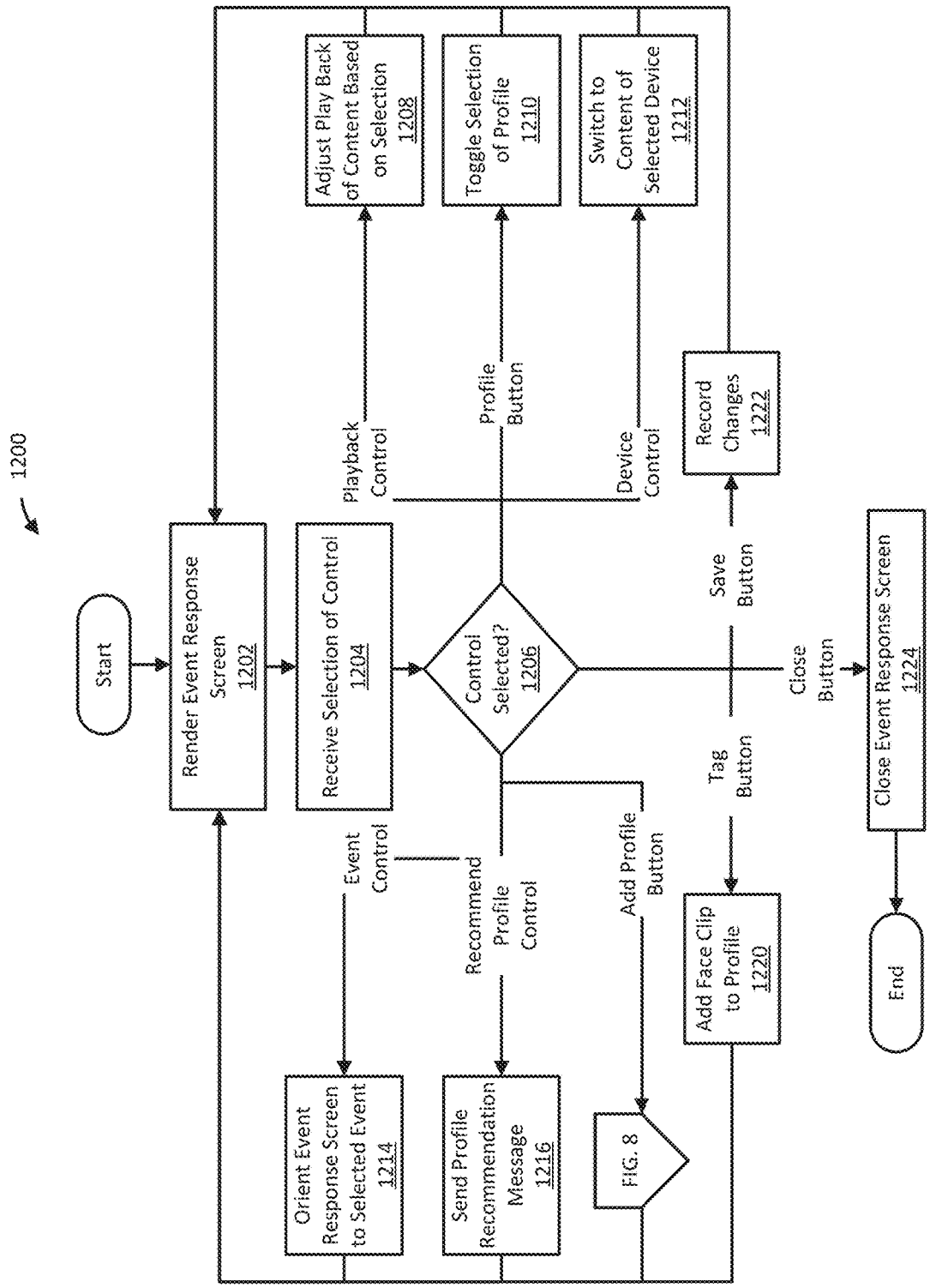
FIG. 12 is a flow diagram illustrating a process of administering an event response screen, according to some examples described herein.
Figure 13A:
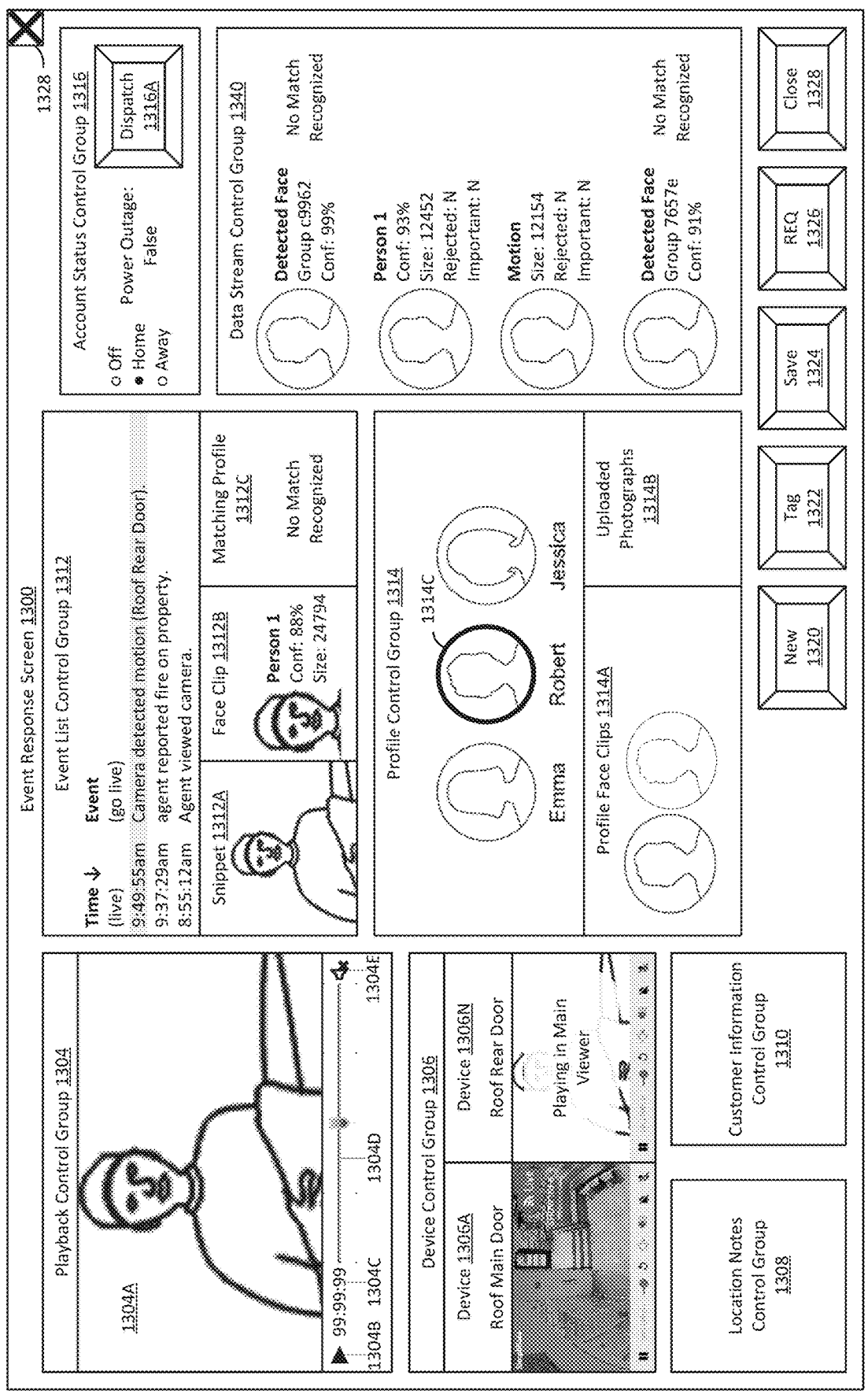
FIG. 13A is a front view of a monitoring agent event response screen, according to some examples described herein.
Figure 13B:
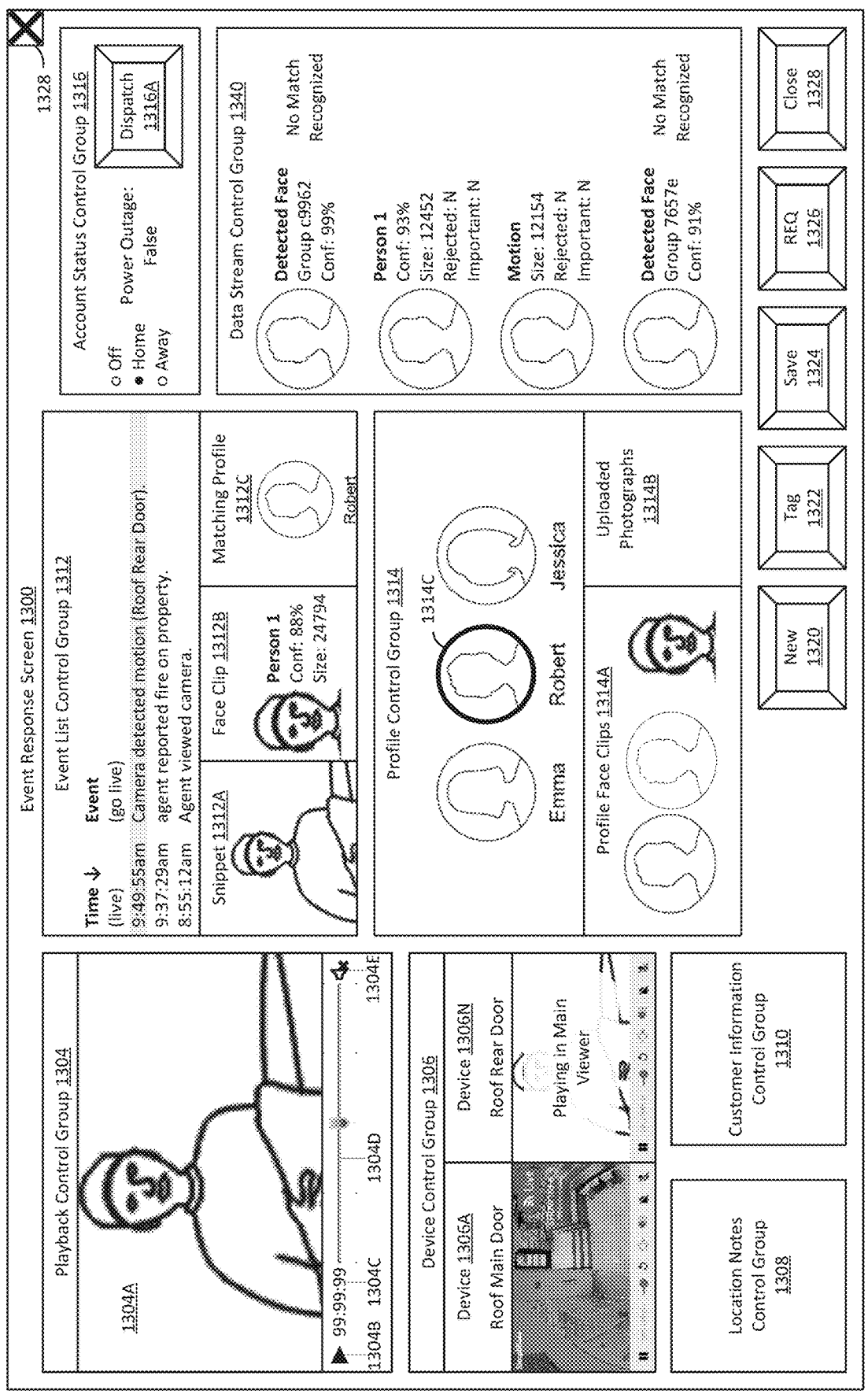
FIG. 13B is another front view of the monitoring agent event response screen, according to some examples described herein.

In some examples, a security system (e.g., the security system 100 of FIG. 1) enables monitoring personnel to reference, maintain, or create profiles before, during, or after responding to an event detected at a monitored location. FIG. 12 illustrates a process 1200 executed by the security system in these examples. Through execution of the process 1200, the security system administers an event response screen through which the monitoring personnel can create and/or modify profiles. As shown in FIG. 12, the process 1200 starts with a monitor interface (e.g., one of the monitor interfaces 130 of FIG. 1) controlling a computing device (e.g., one of the computing devices 518 of FIG. 5A) to render 1202 an event response screen. FIGS. 13A and 13B illustrate one example of an event response screen 1300 that can be rendered in some examples. As shown in FIGS. 13A and 13B, the screen 1300 includes a playback control group 1304, a device control group 1306, a location notes control group 1308, a customer information control group 1310, an event list control group 1312, a profile control group 1314, an account status control group 1316, and a data stream control group 1340. The screen 1300 also includes a new button 1320, a tag button 1322, a save button 1324, a recommend button 1326 (shown as REQ button 1326), and a close button 1328. Additional details regarding an example implementation of the data stream control group 1340 are described with respect to FIG. 14.

The playback control group 1304 includes a display area control 1304A, a play button 1304B, a time index control 1304C, a position slider 1304D, and a mute button 1304E. The device control group 1306 includes device controls 1306A-1306N. The event list control group 1312 includes a snippet control 1312A, a face clip control 1312B, and a matching profile control 1312C. The profile control group 1314 includes a profile face clips control 1314A, an uploaded photographs control 1314B, and one or more existing profile buttons, such as a profile button 1314C. The account status control group 1316 includes a dispatch button 1316A.

Through the screen 1300, the monitor interface can interact with a user (e.g., monitoring personnel) to create, update, or delete, within a security system (e.g., the security system 100 of FIG. 1) one or more curated profiles for subjects (e.g., visitors or other individuals) who are authorized to visit one or more monitored locations (e.g., locations like the location 102A of FIG. 1). In some examples, the screen 1300 is initiated by the monitor interface in response to reception of a reportable event that indicates a subject (e.g., a person) was detected at a monitored location. The screen 1300 enables the system 100 to effectively and efficiently gain knowledge of individuals who are authorized to access the monitored location within the context of an actual visitation.

As shown in FIGS. 13A and 13B, the event list control group 1312 is configured to display a list of events in which individual entries correspond to an event detected at a monitored location. The list of events includes a textual description of the event and a timestamp indicating a time at which the event was detected. The textual description may be associated (e.g., within a data structure in memory) with a type of event detected. For example, a particular list entry may include "Camera detected motion (Roof Rear Door)" and "9:49:55 a.m.". Column headers within the list may indicate (e.g., via a visualized upward or downward pointing arrow) that the list is sorted (e.g., in ascending or descending order). In some examples, the user may select a column header within the event list control group 1312 to sort the events listed in the table by timestamp or textual description. Moreover, in some examples, the user may select a particular entry within the control group 1312 to request that the other controls within the screen 1300 display information associated with the event represented by the selected entry. In this way, the user can move through and address events detected at the monitored location.

In some examples, the device controls 1306A-1306N in the device control group 1306 represent location-based devices installed at the monitored location and are configured to indicate device identity and status. For instance, in some examples, individual device controls 1306A-1306N are configured to display a device name and operational status (e.g., asleep, inaccessible due to user configuration, off-line, etc.). Further, in some examples, individual device controls 1306A-1306N are selectable and, if selected, indicate (e.g., via text, icons, etc.) that content captured by the device is available for playback via the playback control group 1304. As such, in these examples, the user can select a particular device control to initiate playback, within the playback control group 1304, of content related to the currently selected event.

In some examples, the playback control group 1304 is configured to play back content from which a reportable event (e.g., an event currently selected via the event list control group 1312) was detected. This playback can include video content displayed via the display area control 1304A and audio content mutable via the mute button 1304E. Within the playback control group 1304, the play button 1304B is selectable to toggle between playing and pausing content and is configured to indicate whether playback of the content is currently paused or active. The time index control 1304C is configured to display a relative or absolute time within the content currently being played back. The slider control 1304D is manipulatable to adjust the current playback time and configured to indicate the current time relative to the overall duration of the content. The mute button 1304E is configured to indicate whether audio playback is muted or audible. Due to the configuration of the playback control group 1304, the user can select a playback control within the playback control group 1304 to manipulate playback of content related to the currently selected event and device. For instance, in some examples, the user can select the play button 1304B to toggle between playing and pausing playback of the content within the display area control 1304A. The user can select (e.g., via a slow swipe/slide) the position slider 1304D to relocate the time index of playback of the content within the display area control 1304A. The time index control 1304C reflects the time index of content currently being played back. The user can select the mute button 1304E to toggle between muting and unmuting audio playback of the content.

In some examples, the snippet control 1312A is configured to display an image frame, or a portion thereof, that depicts the subject whose detection triggered the currently selected event in the event list control group 1312. In some examples, the image displayed via the snippet control 1312A is a crop of an image focusing on the subject and captured from the content being played back via the playback control group 1304. In some examples, the face clip control 1312B is configured to display a face clip of the subject cropped from the image currently displayed in the snippet control 1312A or otherwise obtained by the monitor interface.

In some examples, the matching profile control 1312C is configured to display an indication of a profile matched to the face clip displayed in the face clip control 1312B. This matching may be manually performed and/or automatically executed via facial recognition processes (e.g., via the AI service 508). For instance, in some examples, the monitor interface is configured to determine that an existing profile of any type matches the face clip displayed in the face clip control 1312B if a metric returned by the AI service indicates a level of confidence that a subject of the existing profile is depicted in the face clip exceeds a threshold level (e.g., 75%, 80%, etc.). As shown in FIG. 13A, no automatic match was found, and the user has not yet established a manual match via selection of the tag button 1322, which is described further below.

In some examples, the profile control group 1314 is configured to administer representations of profiles (e.g., in the form of existing profile buttons, such as the existing profile button 1314C) associated with an account of a customer whose system reported the currently selected event. These profiles represented within the profile control group 1314 may include profiles generated by a customer (e.g., via one of the customer interfaces 132 of FIG. 1) and/or profiles generated by monitoring personnel (e.g., via one of the monitor interfaces 130 of FIG. 1). Individual profile buttons, such as the profile button 1314C, are selectable and, when selected, are marked for subsequent processing. In some examples, the monitor interface is configured to alter the appearance of selected and unselected buttons within the control group to indicate a currently selected button. For instance, as shown in FIG. 13A, the existing profile button 1314C is highlighted (e.g., encircled) and the other existing profile buttons are not highlighted. In certain examples, individual profile buttons within the profile control group 1314 are further highlighted (e.g., shaded) to indicate the type (customer, curated, or recommended) of the profile associated with the profile button. In some examples, the profile face clips control 1314A is configured to display face clips already associated with the profile currently selected in the profile control group 1314. In certain implementations, the profile control group 1314 optionally includes an uploaded photographs control 1314B associated with a selected profile. In such implementations, the uploaded photographs control 1314B is configured to display one or more images acquired from a source other than devices deployed at the monitored location, such as customer-provided photographs of individuals who are trusted to be at the monitored location.

In some examples, the new button 1320 is selectable by the user to initiate creation of a new profile to be associated with the account of the customer whose system reported the currently selected event. The tag button 1322 is also selectable by the user to associate the face clip currently displayed in the face clip control 1312B with the profile currently marked for subsequent processing within the profile control group 1314. The save button 1324 is selectable by the user to initiate recordation and application of any changes made to profiles (e.g., profile creation, association of a face clip with a profile, etc.) via the screen 1300. The recommend (REQ) button 1326 is selectable by the user to initiate recommendation of the currently selected profile (or changes thereto) to the customer.

Referring still to the event response screen 1300 illustrated in FIG. 13A, the location notes control group 1308 optionally includes one or more notes generated by monitoring personnel regarding the monitored location. Such notes may include, for example, information that monitoring personnel have observed regarding the monitored location or events observed at the monitored location. Similarly, the customer information control group 1310 optionally includes one or more notes regarding a customer associated with the monitored location, such as notes relating to specific customer requests, previous customer interactions, or preferences.

Referring still to the event response screen 1300 illustrated in FIG. 13A, the account status control group 1316 optionally includes current status information for the monitored location, such as an alarm status control that indicates whether the alarm system state is in an off, home, or away state. Indication of other events may be displayed as well, such as a power outage status or a network communication status. The dispatch button 1316A allows monitoring personnel to dispatch emergency services or other first responders to the monitored location.

Figure 14:
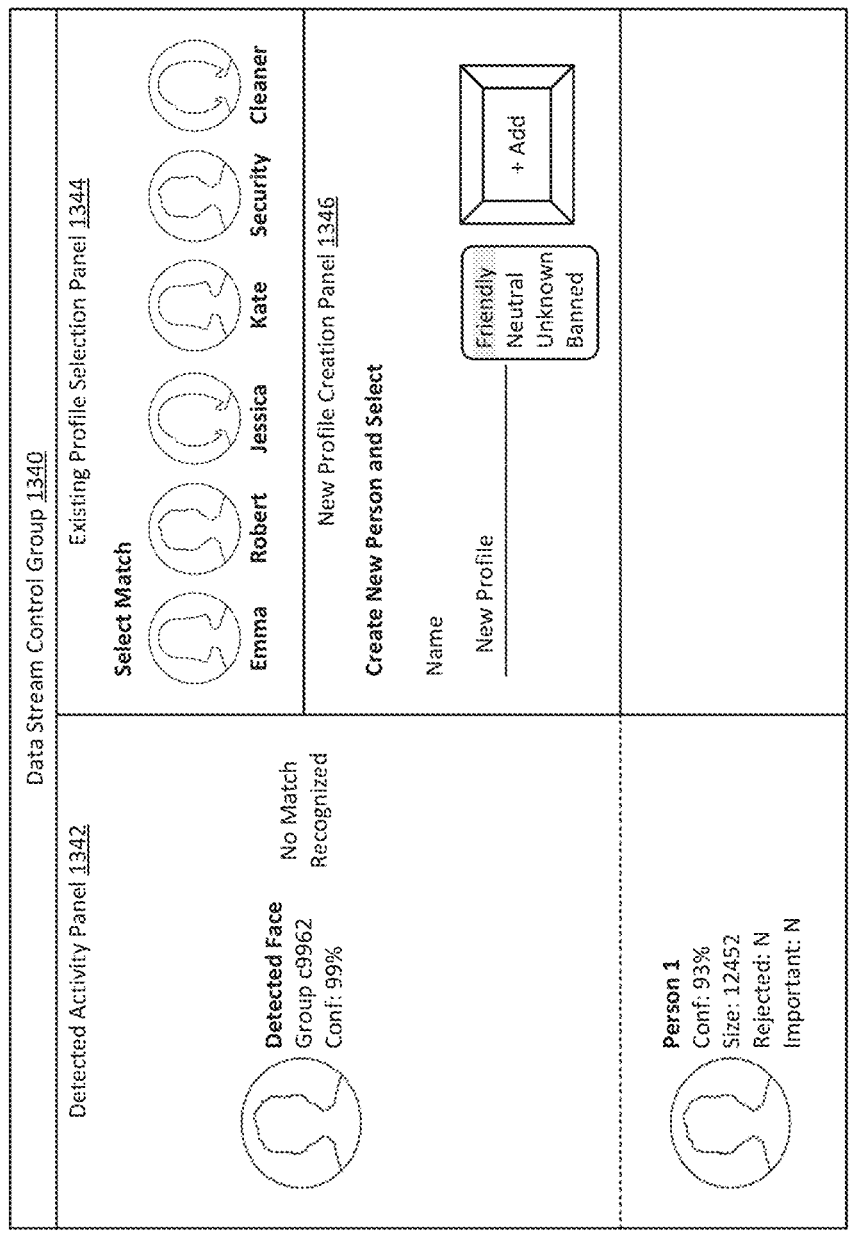
FIG. 14 is a front view of a data stream control group in the monitoring agent event response screen, according to some examples described herein.

FIG. 14 is a front view of a data stream control group 1340 in the monitoring agent event response screen 1300, according to some examples described herein. In the example implementation illustrated in FIG. 14, the data stream control group 1304 includes a detected activity panel 1342, an existing profile selection panel 1344, and a new profile creation panel 1346. In such embodiments detected activity panel 1342 is configured to display detected faces, objects, and/or motion along with information relating to a confidence level associated with the detection. The existing profile selection panel 1344 allows a detected face to be associated with an existing profile, while the new profile selection panel 1346 allows a detected face to be associated with a new profile. In certain implementations, the new profile creation panel 1346 includes a selection element, such as a dropdown menu, that allows monitoring personnel to tag the newly-created profile with a descriptor such as "friendly", "neutral", unknown", or "banned".

Likewise, in certain implementations a newly-created profile can be assigned a category that indicates who created the profile (for example, customer or monitoring agent). This categorization may appear in the data stream control group 1340 or in another portion of event response screen 1300. Providing such categorization can indicate to a monitoring agent that a proposed profile was rejected by a customer, thus reducing the likelihood that the monitoring agent create a profile for an individual that the customer rejected. For example, consider an implementation where a monitoring agent recommends a profile for a letter carrier, but that recommended profile is later rejected by the customer. By retaining the rejected profile as a curated profile, this informs monitoring agents that while the letter carrier is a frequent visitor, the letter carrier is not sufficiently trusted to be ignored by monitoring personnel.

Returning to the process 1200 of FIG. 12, the monitor interface receives 1204 input selecting a control of the screen 1300. For instance, in some examples, the monitor interface receives a message from an operating system or other code (e.g., a runtime engine of a development platform, a virtual machine, etc.) executing on the computing device. The message may include information regarding an interaction between a screen (e.g., a touchscreen) or mouse and a user. For instance, the message may specify a location, duration of contact(s), and any movement detected on the touchscreen or via the mouse. Alternatively or additionally, the message may specify an identifier of a control of the screen and a type of selection (e.g., a tap, a double tap, a double click, a swipe, a long press, drag and drop, etc.).

Continuing with the process 1200, the monitor interface determines 1206 which control of the screen 1300 is selected. For instance, in some examples, the monitor interface identifies the control and the type of selection based on a message received in the operation 1204. In some examples, the monitor interface makes this determination by identifying the location specified in the message as being within an area of the screen or touchscreen occupied by the control and by classifying the selection type using the duration of contact(s) specified in the message. Alternatively or additionally, the monitor interface may make this determination by reading an identifier of the control and the type of selection from the message.

Continuing with the process 1200, if the monitor interface determines that a control of the playback control group 1304 is selected, the monitor interface adjusts 1208 playback of the event content in accordance with the selected control. As explained above, adjusting 1208 may include toggling between pause and play, adjusting volume, moving to a different location within the content, etc.

Continuing with the process 1200, if the monitor interface determines that a control of the profile control group 1314 is selected, the monitor interface toggles 1210 marking of the selected profile control for subsequent processing. In some examples, within the operation 1210 the monitor interface may also display notes associated with the profile represented if the selection includes a hover. In addition, in some examples, the monitor interface populates the profile face clips control 1314A with images of faces associated with the profile represented by the selected profile control.

Continuing with the process 1200, if the monitor interface determines that one of the device controls 1306A-1306N is selected, the monitor interface switches 1212 to content associated with the event represented by the currently selected control, if such is available. For instance, in some examples, the monitor interface communicates a message to a surveillance service (e.g., the surveillance service 128 of FIG. 1) via one or more API calls requesting content associated with the currently selected event and device. Alternatively or additionally, if the event is part of an ongoing incident (e.g., no event indicating resolution of the incident has been received) and the device is available (e.g., connected, operational, and not blocked due to customer privacy preferences), the monitor interface communicates a message to the selected device requesting a session (e.g., a communication session). The requested session may be for an interactive and/or real time communication session implemented via, for example, WebRTC. In either case, if the monitor interface receives content in response to the request communicated within the operation 1212, the monitor interface switches to the content and plays back the content via the playback control group 1304. It should be noted that the monitor interface may also alter the content displayed in the snippet control 1312A and the face clip control 1312B during execution of the operation 1212.

Continuing with the process 1200, if the monitor interface determines that an entry of the event list control group 1312 is selected, the monitor interface orients 1214 the screen 1300 to provide information regarding the event represented by the selected entry. This orientation operation can include, for example, changing the content presented in one or more other control groups of screen 1300 from content associated with or otherwise assigned or linked to the previously selected event to content associated with the currently selected event. As such, the orientation operation 1214 can include loading new content into the playback control group 1304, new content and/or identifiers into one or more of the device controls 1306A-1306N, a new snippet into the snippet control 1312A, a new face clip into the face clip control 1312B, a newly matched (e.g., automatically) profile identifier into the matching profile control 1312C, new profile controls into the profile control group 1314, and new face images into the profiles face clip control 1314A.

Continuing with the process 1200, if the monitor interface determines that the recommend button 1326 is selected, the monitor interface initiates a recommendation process by communicating 1216 a message to a surveillance service, such as the surveillance service 128 of FIG. 1. The message may specify configuration data for the profile, such as a profile name, face clips associated with or otherwise assigned or linked to the profile, and/or one or more monitored locations that the subject of the profile is permitted to visit. Upon receipt of this message, the surveillance service may store data specifying the profile and communicate a message to a customer interface to initiate administration of a recommended profiles screen, such as the recommended profiles screen 1600 described below with reference to FIG. 16. In this way, a security system (e.g., the system 100 of FIG. 1) enables a monitoring professional to create a curated profile and recommend that a customer adopt the curated profile as a customer profile. Further, the security system enables a customer to approve of a recommended curated profile, thus promoting the curated profile to a customer profile, or to reject the recommended profile, thus causing it to remain a curated profile to be potentially referenced by monitoring personnel.

Continuing with the process 1200, if the monitor interface determines that the new button 1320 is selected, the monitor interface executes a profile creation process. FIG. 8, which is described above, illustrates an example of a profile creation process executed in some examples.

Continuing with the process 1200, if the monitor interface determines that the tag button 1322 is selected, the monitor interface associates 1220 the face clip displayed within the face clip control 1312B with the profile selected within the profile control group 1314 and updates the profile face clips control 1314A to display the face clip of face clip control 1312B. Moreover, within the operation 1220, the monitor interface updates the matching profile control 1312C to display the face clip of face clip control 1312B, if necessary, as a manual match has been found. FIG. 13B illustrates the screen 1300 after execution of the operation 1220. It should be noted that, in some examples, the operation 1220 may include storing, in local memory, associations or relationships between face clips displayed in the face clip control 1312B and matched profiles.

Continuing with the process 1200, if the monitor interface determines that the save button 1324 is selected, the monitor interface records 1222 changes to the profile made via interactions between the user and the monitor interface via the screen 1300. It should be noted that the operations 1222 may involve altering profile information locally and remotely, so that the security system as a whole can utilize the information. For instance, in some examples, the operation 1222 may include communication of associations or relationships between profiles and face clips to other parts (e.g., the surveillance service) of the security system via one or more messages. This communication, in turn, may initiate training of one or more AI models configured to detect the face clips within image data and execution of a profile recommendation process, such as the process 1500 illustrated in FIG. 15, in some examples.

Continuing with the process 1200, if the monitor interface determines that the close button 1328 is selected, the monitor interface closes 1224 the event response screen 1300 and returns control to the previously executing process.

Figure 15:
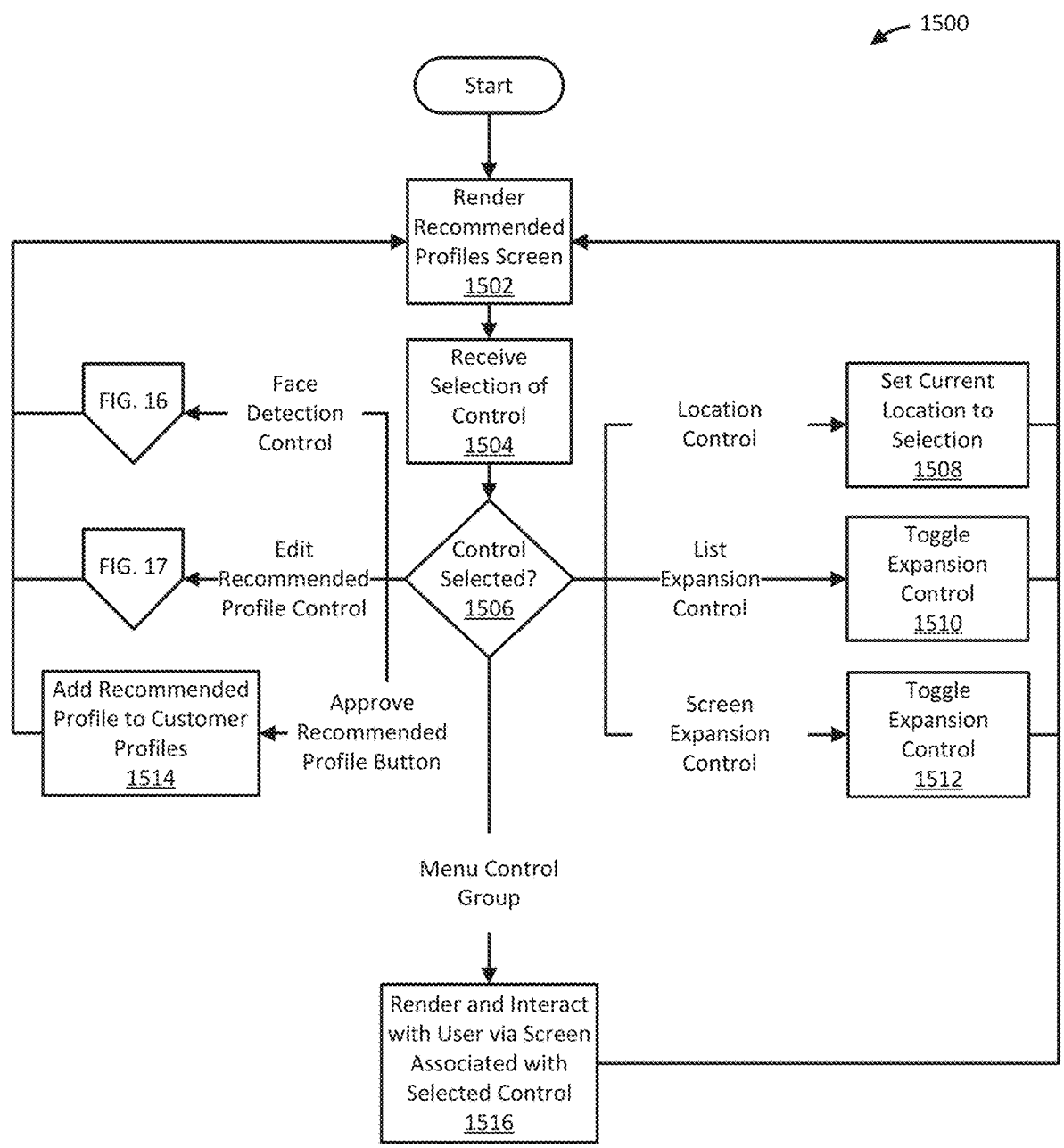
FIG. 15 is a flow diagram illustrating a process of administering a recommended profiles screen, according to some examples described herein.
Figure 16:
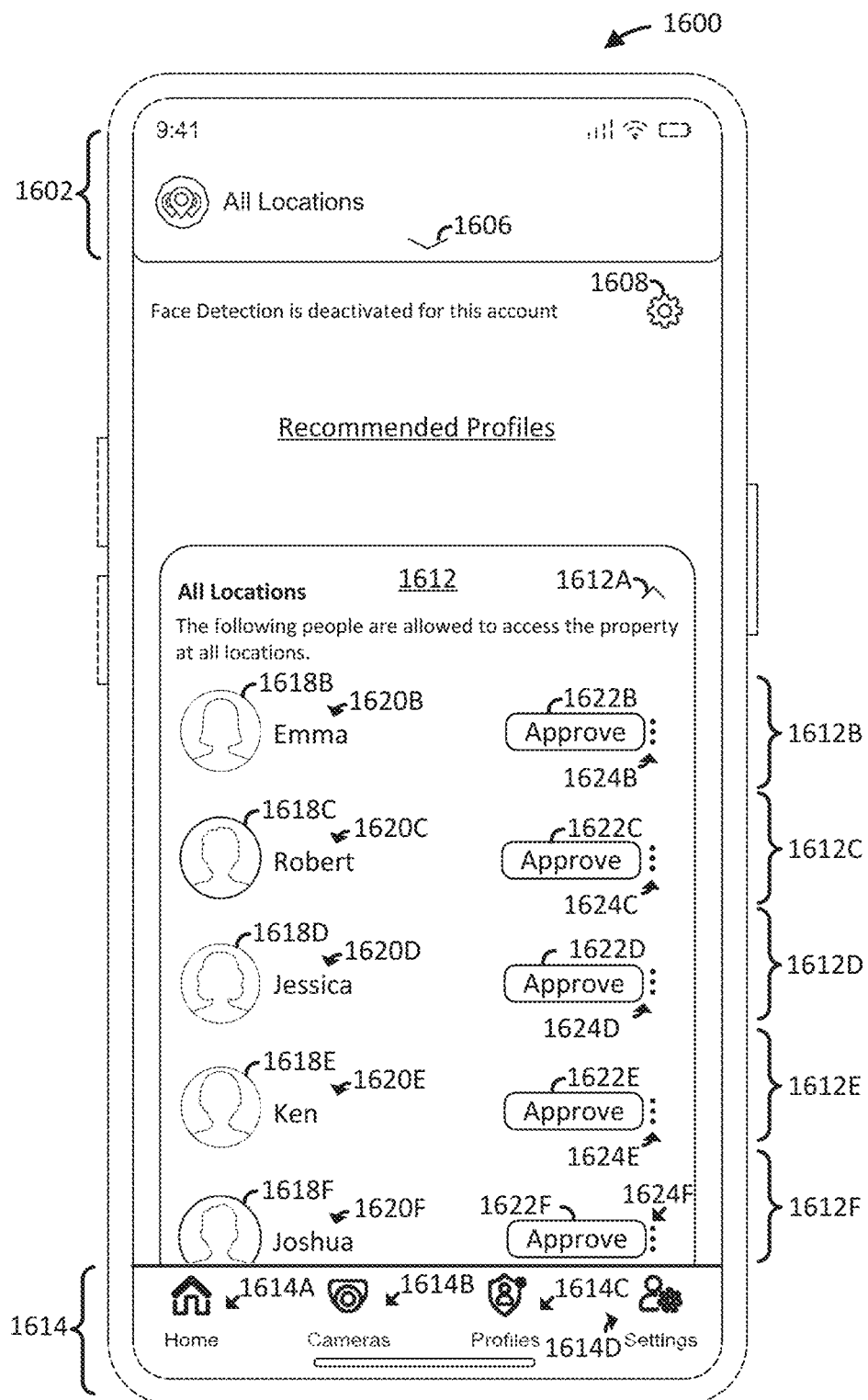
FIG. 16 is a front view of a recommended profiles screen, according to some examples described herein.

As described above, at least some examples disclosed herein implement processes that enable a security system (e.g., the system 100 of FIG. 1) to submit recommended profiles for customer approval and use. Turning now to FIG. 15, a process 1500 implemented by some such examples to administer a recommended profiles screen is illustrated. As shown in FIG. 15, the process 1500 starts with an app (e.g., one of the customer interfaces 132 of FIG. 1) controlling a mobile computing device hosting the app (e.g., one of the customer interfaces 132 of FIG. 1) to render 1502 a recommended profiles screen via a touchscreen incorporated into the mobile computing device. FIG. 16 illustrates one example of a recommended profiles screen 1600 that can be rendered in some examples. As shown in FIG. 16, the screen 1600 includes a location control group 1602, an expansion control 1606, a face detection configuration control 1608, a recommended profile control group 1612, and a menu control group 1614. The control group 1612 includes an optional location expansion control 1612A, and recommended profile list item controls 1612B-1612F. Individual item controls 1612B-1612F include face clip controls 1618 (shown as face clip controls 1618B-1618F), name controls 1620 (shown as name controls 1620B-1620F), approve buttons 1622 (shown as approve buttons 1622B-1622F), and edit controls 1624 (shown as edit controls 1624B-1624F).

Figure 17:
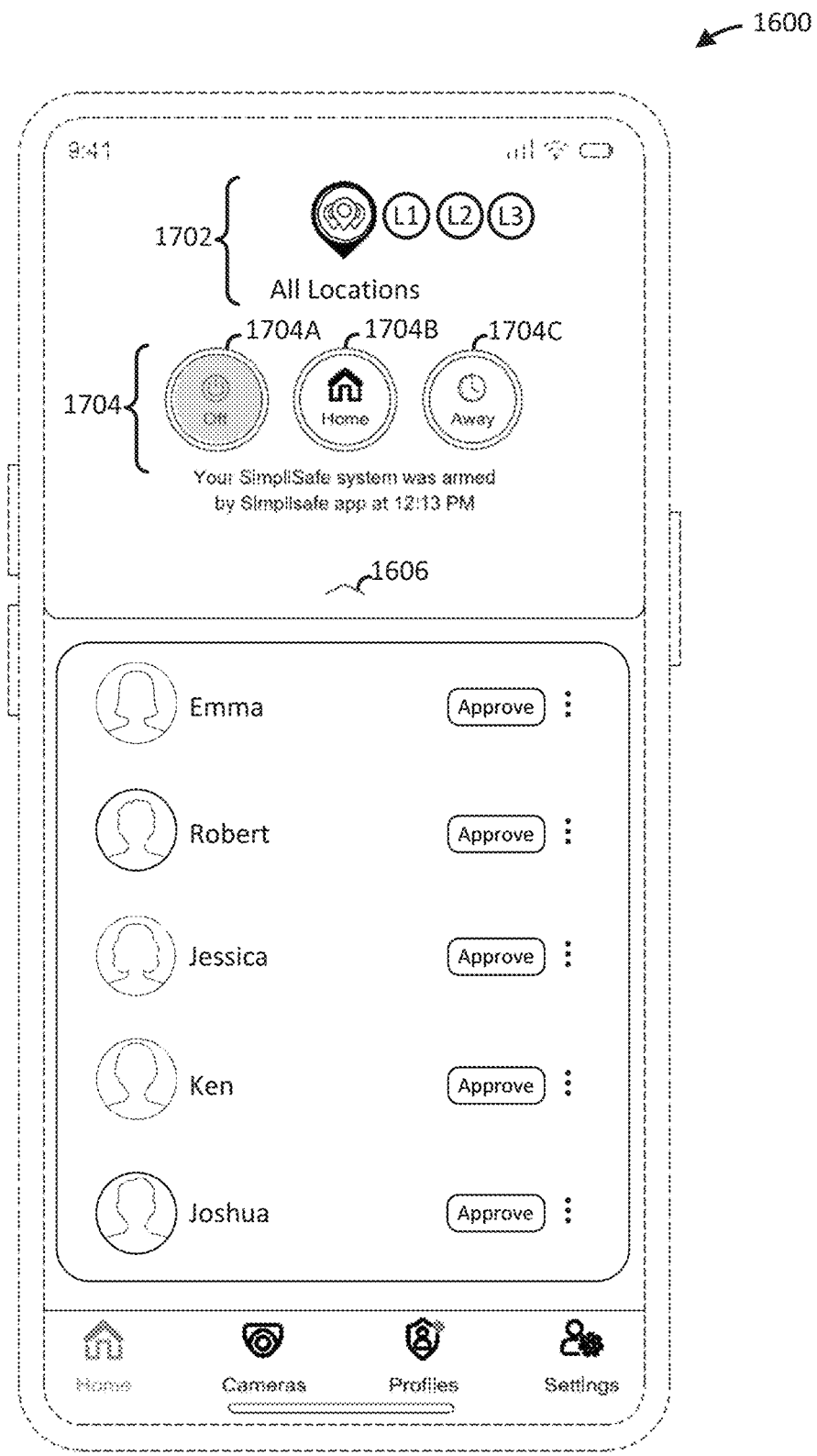
FIG. 17 is another front view of the recommended profiles screen, according to some examples described herein.

In some examples, the user can interact with the app via the location control group 1602 to select a current location context. As shown in FIG. 16, the current location context is set to all locations. In some examples, the app is configured to interact with the user via multiple selections within the location control group. For instance, in one example, upon detecting a first selection of the location control group 1602, the app expands or otherwise adjusts the location control group 1602 to reveal individual icons for individual configured locations belonging to the current user account. This first selection may be of the expansion control 1606 to adjust an amount of screen area devoted to the control groups 1602 and 1612. For instance, in the examples shown in FIG. 16, the app visualizes the expansion control 1606 as an upward or downward pointing chevron. As shown in FIG. 16, the expansion control 1606 is in a contracted state as indicated by its presentation as a downward pointing chevron. FIG. 17 illustrates an example of the screen 1600 in which the app visualizes the expansion control 1606 as an upward pointing chevron, indicating that the expansion control 1606 is in an expanded state. This approach enables a location to be selected with one additional motion (e.g., a tap) rather than requiring text entry or some other more complex selection method. Moreover, consolidation and expansion of less often used groups of controls allows the app to incorporate more controls within individual screens, thus decreasing the need for intra-screen navigation.

Figure 18:
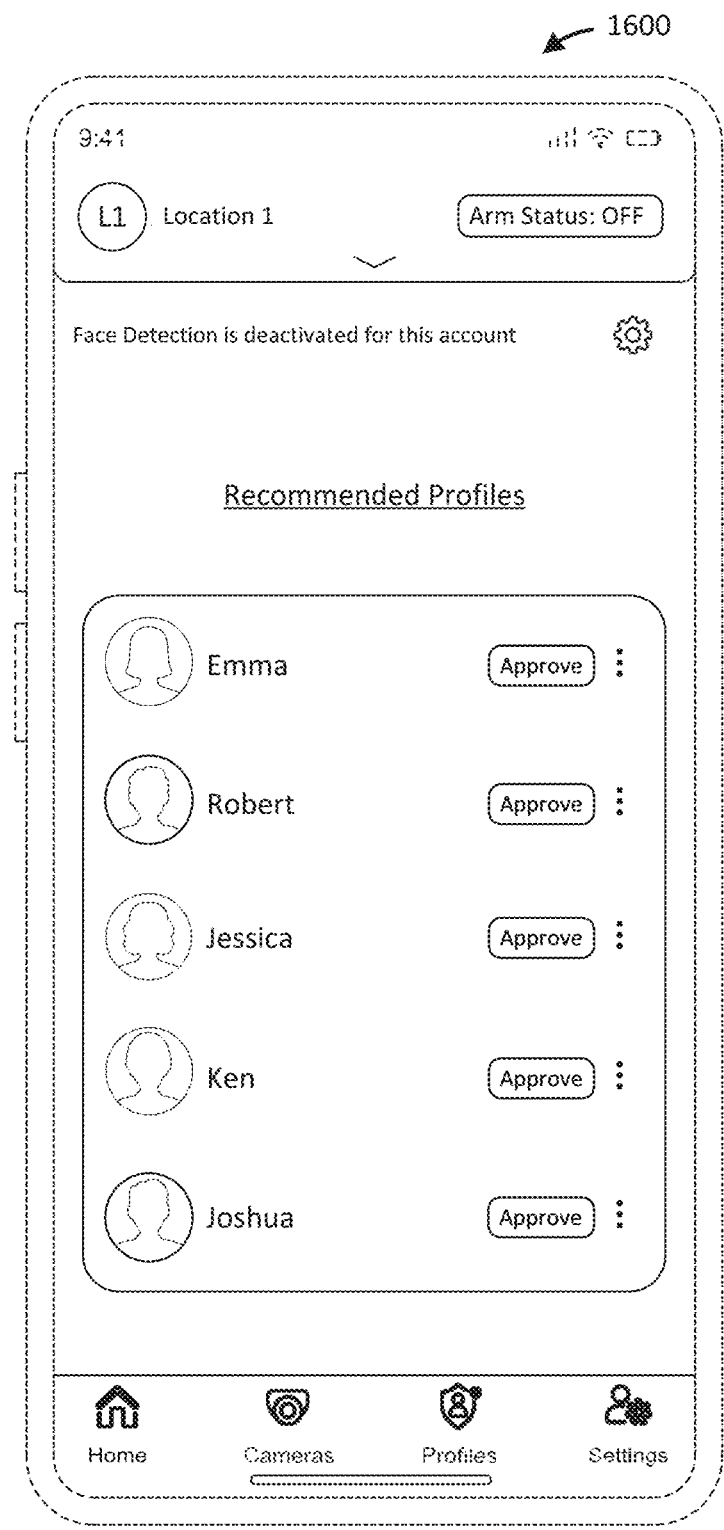
FIG. 18 is another front view of the recommended profiles screen, according to some examples described herein.

Continuing with an example illustrated in FIG. 17, the user can select an icon of the location control 1702 to select a current location context for the app. The user can select a button of the alarm sensitivity control group 1704 to initiate a change of alarm sensitivity for the location-based devices residing at the current location. FIG. 18 illustrates an example of the screen 1600 in which the current location context is set to location 1. As shown in FIG. 17, the alarm system status control group includes an off button 1704A, a home button 1704B, and an away button 1704C. Individual buttons within the alarm sensitivity control group may be associated with a set of configurable data that specifies sensitivity settings for the location-based devices. For example, the off button 1704A may be associated with a set of sensitivity settings that, when applied by the location-based devices, configure the location-based devices to not sound an alarm or otherwise report detected events (or even detect events in the first place, in some examples). Location-based devices configured in this manner may be referred to as being "disarmed". The away button 1704C may be associated with a set of sensitivity settings that, when applied by the location-based devices, configure the location-based devices to sound an alarm or otherwise report detected events. Location-based devices configured in this manner may be referred to as being "armed". The home button 1704B may be associated with a set of sensitivity settings that, when applied by the location-based devices, configure the location-based devices to sound an alarm or otherwise report detected events only where activity is detected by a subset of devices (e.g., a glass break sensor, a window contact sensor, etc.) as to allow people to remain in the home without causing a false alarm. Location-based devices configured via this set of settings may be armed or disarmed. In some examples, the app alters the appearance of selected and unselected buttons within the control group to indicate a currently selected button. For instance, as shown in FIG. 17, the off status button 1704A is highlighted (e.g., shaded) and the other buttons 1704B and 1704C are not highlighted.

In some examples, the sensitivity settings associated with the individual buttons 1704A-1704C may further, when applied by a surveillance service (e.g., the surveillance service 128 of FIG. 1) and/or the location-based devices, configure the surveillance service and/or the location-based devices to prevent any access to the location-based devices via monitor interfaces (e.g., the monitor interfaces 130 of FIG. 1). For instance, in certain examples, the sensitivity settings associated with the off button 1704A and the home button 1704B, when applied by the surveillance service and the location-based devices, configure the surveillance service and the location-based devices to not forward any information to the monitor interfaces. Application of these sensitivity settings may further prevent the monitor interfaces from establishing connections to the location-based devices. Further, in some examples, the sensitivity settings associated with the away button 1704C, when applied by the surveillance service and the location-based devices, configure the surveillance service and the location-based devices to forward information to the monitor interfaces, provided that the user account associated with the location-based devices has been set up and configured for the security system to be monitored by monitoring personnel. Application of these sensitivity settings may further allow the monitor interfaces to establish connections to the location-based devices.

Returning to FIG. 16, the user can select a button of the menu control group 1614 to navigate to another screen. As shown in FIG. 16, the menu control group includes a home button 1614A, a cameras button 1614B, a profiles button 1614C, and a settings button 1614D. The user can select the home button 1614A to navigate to a home screen for the app. The user can select the cameras button 1614B to navigate to a screen configured to display images acquired by cameras at a monitored location. The user can select the profiles button 1614C to navigate to a profiles screen, such as the profiles screen 3900 described further below with reference to FIG. 39. The user can select the settings button 1614D to navigate to a settings screen to configure operational parameters of the system 100 specific to the customer. In some examples, the app alters the appearance of selected and unselected buttons within the control group to indicate a currently selected button. For instance, any of the buttons 1614A-1614D can be highlighted (e.g., shaded) or not highlighted, depending on the currently displayed screen.

In some examples, the user can select the face detection configuration control 1608 to navigate to a face detection preferences screen configured to interact with the user to establish or modify face detection preferences. For instance, in some examples, the face detection preferences screen includes controls configured to receive preferences regarding whether to activate or deactivate identification of individual persons by the security system via facial recognition processes.

In some examples, the user can interact with the control group 1612 to approve or edit one or more recommended profiles. To approve a recommended profile identified by one of the item controls 1612B-1612F, the user can select the approve button 1622 of the item control that identifies the profile. Similarly, to edit a recommended profile identified by one of the item controls 1612B-1612F, the user can select the edit control 1624 of the item control that identifies the profile. To indicate the identity of recommended profiles associated with the list item controls 1612B-1612F, individual list controls include a face clip of the associated, assigned, or otherwise linked recommended profile within the profile face clip controls 1618 and a name of the associated recommended profile within the name controls 1620. Individual face clips may be images recognized by the security system as depicting a human face. The user can select the expansion control 1612A to expand or contract the control group 1612. The expansion control 1612A can be omitted from some examples, as illustrated in FIG. 18, which shows the screen 1600 where the currently selected location is L1 rather than all locations, as illustrated in FIG. 16.

Returning to FIG. 15, the app receives 1504 input selecting a control of the screen 1600. For instance, in some examples, the app receives a message from an operating system or other code (e.g., a runtime engine of a development platform, a virtual machine, etc.) executing on the mobile computing device. The message may include information regarding an interaction between the touchscreen and a user. For instance, the message may specify a location, duration of contact(s), and any movement detected on the touchscreen. Alternatively or additionally, the message may specify an identifier of a control of the screen and a type of selection (e.g., a tap, a double tap, a swipe, a long press, etc.).

Continuing with the process 1500, the app determines 1506 which control of the screen 1600 is selected. For instance, in some examples, the app identifies the control and the type of selection based on a message received in the operation 1504. In some examples, the app makes this determination by identifying the location specified in the message as being within an area of the touchscreen occupied by the control and by classifying the selection type using the duration of contact(s) specified in the message. Alternatively or additionally, the app may make this determination by reading an identifier of the control and the type of selection from the message.

Continuing with the process 1500, if the app determines that one of the approve buttons 1622 is selected, the app adds 1514 the recommended profile associated with the selected approve button 1622 to the customer's profiles. For instance, in some examples, via the operation 1514 the app stores or otherwise records an identifier of the recommended and approved profile within one or more data structures that list identifiers of the customer profiles. Alternatively or additionally, via the operation 1514 the app can store data indicating the recommended profile is approved within a data structure storing an identifier of the recommended and approved profile. The storage operations listed above can be executed in memory local to the mobile computing devices hosting the app and/or in memory within a remote computer (e.g., within a data center environment (e.g., the data center environment 124 of FIG. 1)). As such, in some examples, the operation 1514 may include communication of selection of the approve button 1622 to other parts (e.g., the surveillance service and/or location-based devices) of the security system via one or more messages. Other ways to add the recommended and approved profile to the customer profiles will be apparent in view of this disclosure.

Continuing with the process 1500, if the app determines that the location control group 1602 is selected, the app interacts with the user via the control group 1602 to set 1508 the location context for the app. For example, the location may be an individual location (e.g., the user's home, office, vacation home, etc.) or may be all locations associated with the user's account with the security system. In some examples, the operation 1508 may involve rendering adjustments to the location control group to prompt the user for additional input specifying a particular location to be used as the current location and receipt of such input.

Continuing with the process 1500, if the app determines that the list expansion control 1612A is selected, the app toggles 1510 the state of the expansion control 1612A and controls the host mobile computing device to re-render the screen 1600. If the app determines that the screen expansion control 1606 is selected, the app toggles 1512 the state of the expansion control 1606 and controls the host mobile computing device to re-render the screen 1600.

Continuing with the process 1500, if the app determines that the menu control group 1614 is selected, the app further determines 1516 which the buttons 1614A-1614D is selected, renders a screen associated with the selected button, and interacts with a user to exchange information via the rendered screen. For example, if the app determines that the home button 1614A is selected, the app renders a home screen with controls configured to display frequently sought information regarding a security system (e.g., the security system 100 of FIG. 1), such as events detected at one or more monitored locations. If the app determines that the cameras button 1614B is selected, the app renders a camera screen with controls configured to display images acquired by cameras at one or more monitored locations. If the app determines that the profiles button 1614C is selected, the app renders a profiles screen 3900 by executing a profiles screen provisioning process 3800 that is described further below. If the app determines that the settings button 1614D is selected, the app renders a settings screen with controls configured to receive configuration information from the user.

Figure 19:
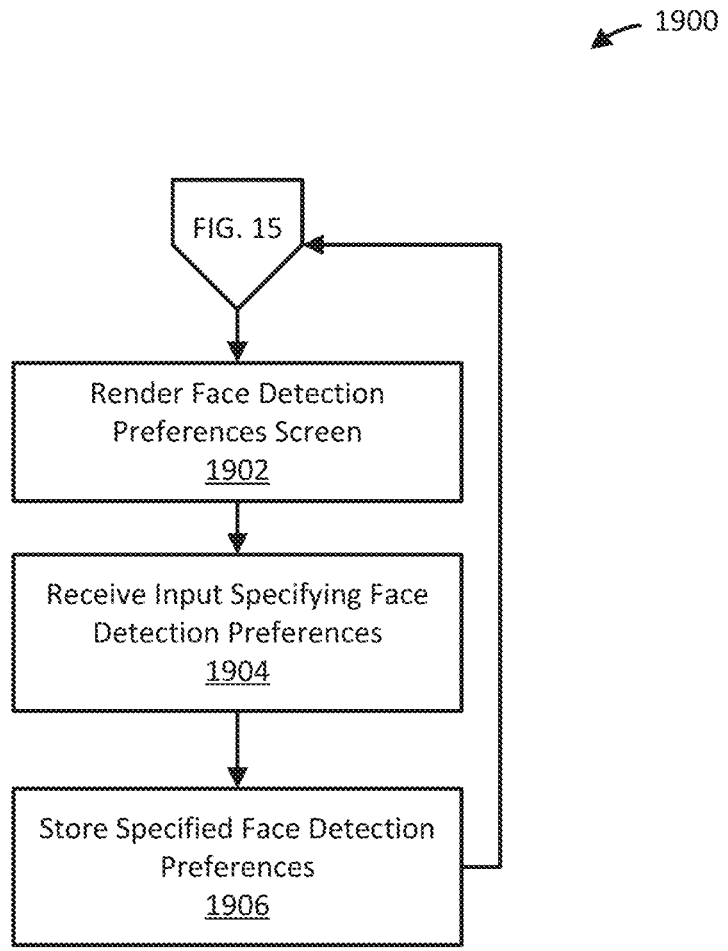
FIG. 19 is a flow diagram illustrating a process of administering an face detection preferences screen, according to some examples described herein.

Continuing with the process 1500, if the app determines that face detection configuration control 1608 is selected, the app executes a face detection configuration process. FIG. 19 illustrates an example of such a process, configuration process 1900. As shown in FIG. 19, the process 1900 starts with the app controlling the host mobile computing device to render 1902 a configuration screen via the touchscreen. This configuration screen may include, for example, controls configured to prompt for and receive selection of face detection preferences to be used by the security system with regard to facial recognition processes.

Continuing with the process 1900, the app receives 1904, via the controls, user input specifying the face detection preferences (e.g., detect faces, do not detect faces, etc.) to be used by the security system and stores 1906 the specified face detection preferences. It should be noted that, in some examples, the operation 1906 may include communication of the face detection preferences to other parts (e.g., the surveillance service and/or location-based devices) of the security system via one or more messages.

Figure 20:
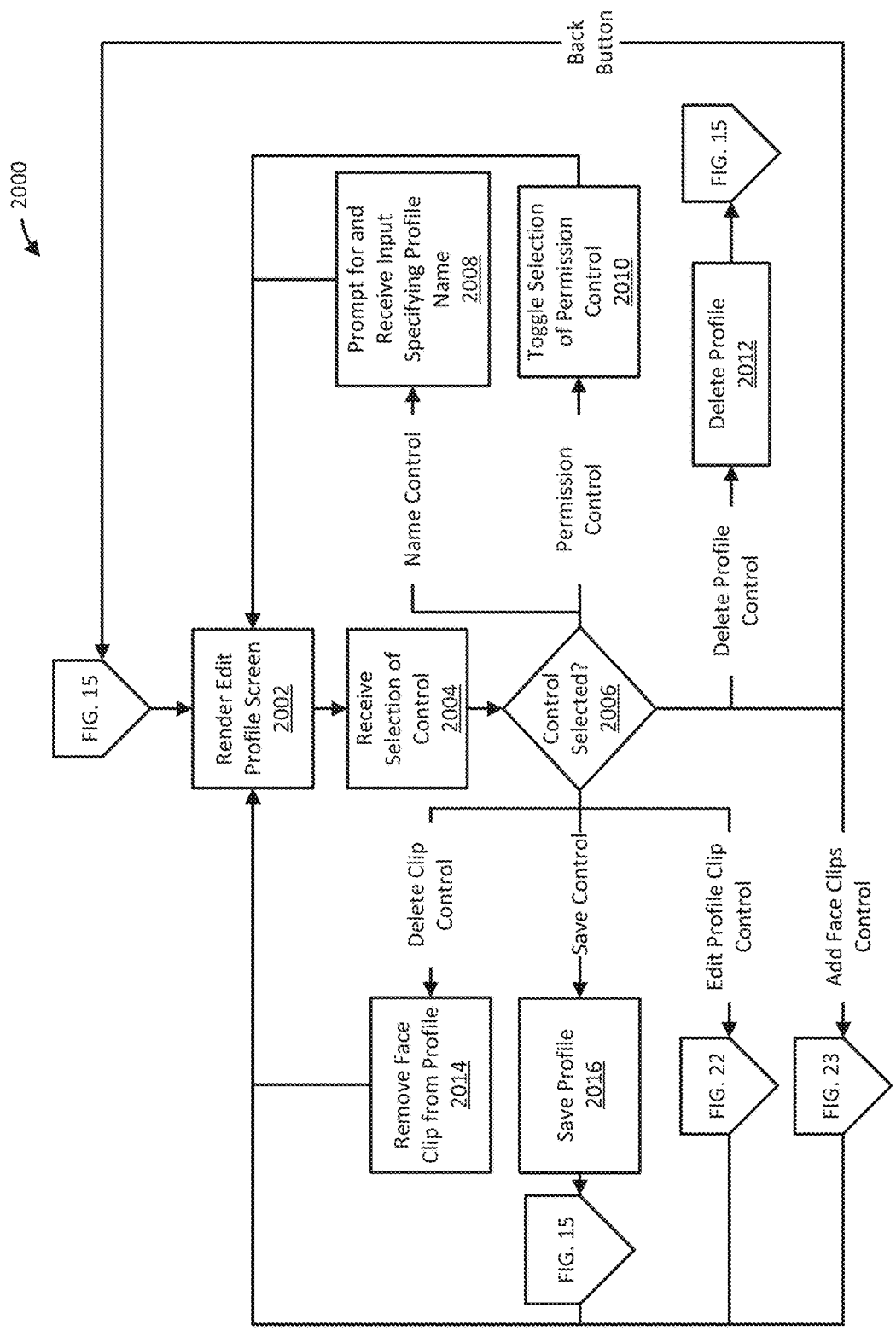
FIG. 20 is a flow diagram illustrating a process of administering a profile editing screen, according to some examples described herein.
Figure 21:
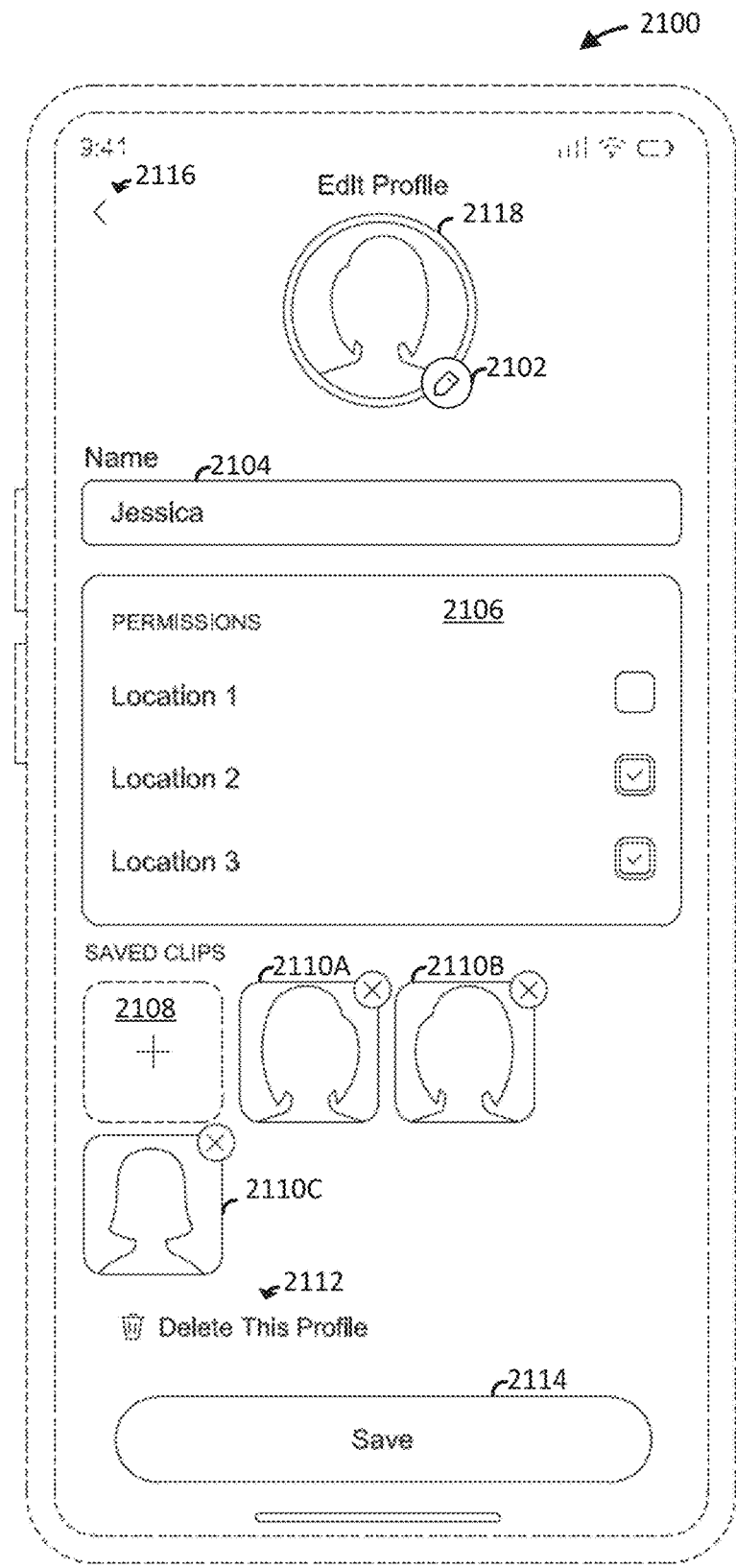
FIG. 21 is a front view of a profile editing screen, according to some examples described herein.

Returning to FIG. 15, if the app determines that one of the edit controls 1624 is selected, the app executes a profile editing process. FIG. 20 illustrates an example of such a process, profile editing process 2000. As shown in FIG. 20, the process 2000 starts with the app controlling the host mobile computing device to render 2002 an edit profile screen via the touchscreen. FIG. 21 illustrates one example of an edit profile screen 2100 that can be rendered in some examples. As shown in FIG. 21, the edit profile screen 2100 includes an edit profile clip button 2102, a profile name control 2104, a permissions list control 2106, an add clip control 2108, delete clip controls 2110A-2110C, a delete profile control 2112, a save profile button 2114, a back control 2116, and profile clip control 2118.

In some examples, the profile clip control 2118 includes a face clip representative of the person associated with the profile being edited. If no face clips have been selected for the profile, the app may include a generic image within the profile clip control 2118. The name control 2104 can include a textual identifier of the profile (e.g., a person's name). The permissions list control 2106 indicates locations at which the person in the profile is welcome to visit the monitored location without initiating an alarm. The delete clip controls 2110A-2110C include face clips that are currently associated with the profile.

In some examples, the user can effectuate a number of changes to the current profile of the edit profile screen 2100 via the controls included therein. For instance, in certain examples, the user can change the face clip displayed in the profile clip control by selecting the edit profile clip button 2102. The user can select the name control 2104 to enter a name for the profile. The user can select a control within the permissions list control 2106 to mark a location associated with the control as being welcome to visitation by the person associated, assigned or otherwise linked with the profile without sounding an alarm. The user can select one of the delete clip controls 2110A-2110C to disassociate, unassign or unlink the face clip depicted within the control from the profile. The user can navigate to a screen to associate, assign or otherwise link additional face clips with the profile by selecting the add clip control 2108. The user can delete the profile by selecting the delete profile control 2112. The user can save changes made to the profile by selecting the save profile button 2114. The user can navigate to the previous screen by selecting the back control 2116.

Returning to the process 2000, the app receives 2004 input selecting a control of the screen 2100. For instance, in some examples, the app receives the input selecting the control by executing the processing described above with reference to the operation 1504 of FIG. 15.

Continuing with the process 2000, the app determines 2006 which control of the screen 2100 is selected. For instance, in some examples, the app identifies the control and the type of selection by executing the processing described above with reference to the operation 1506 of FIG. 15.

Continuing with the process 2000, if the app determines that the back control 2116 is selected, the app returns to the previously executing process. If the app determines that the name control 2104 is selected, the app prompts for and receives 2008 input specifying a name for the profile. If the app determines that a control of the permissions list control 2106 was selected, the app toggles 2010 marking of the selected control. If the app determines that the delete profile control 2112 is selected, the app removes 2012 the profile from the security system. If the app determines that a delete clip control (e.g., one of delete clip controls 2110A-2110C) is selected, the app disassociates 2014 the selected face clip depicted within the selected control from the profile. If the app determines that the save profile button 2114 is selected, the app saves 2016 the profile. It should be noted that the operations 2012 and 2016 may involve altering profile information locally and remotely, so that the security system as a whole can utilize the information.

Figure 22:
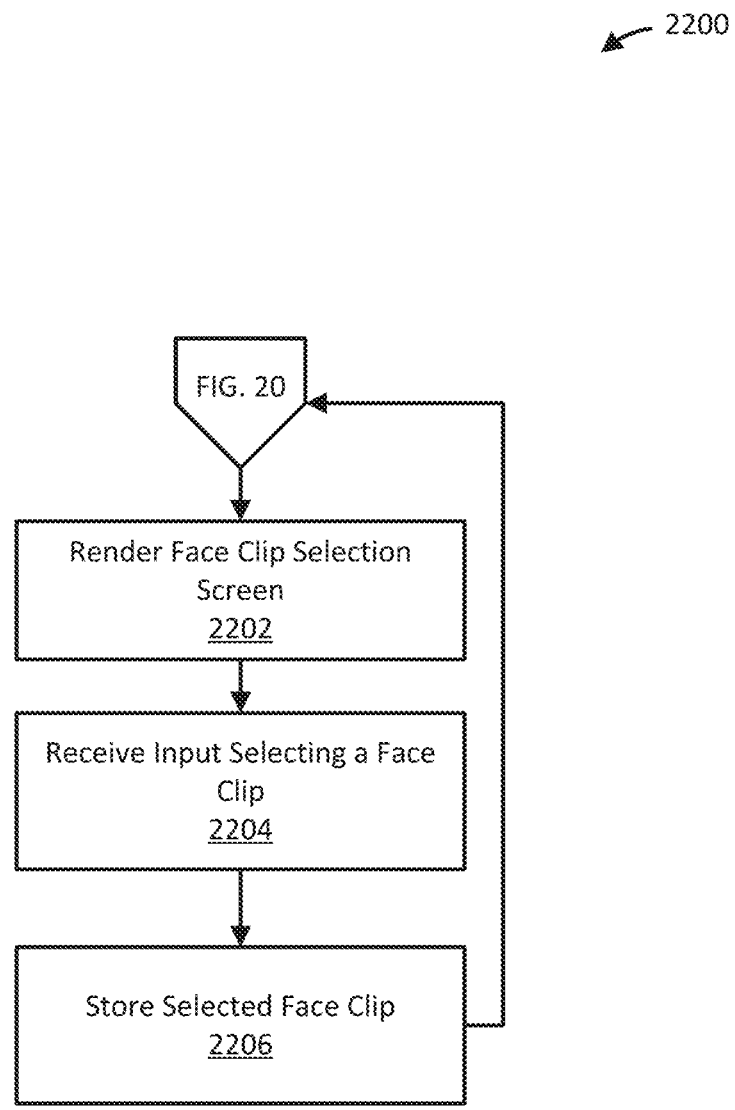
FIG. 22 is a flow diagram illustrating a process of administering a profile face clip selection screen, according to some examples described herein.

Continuing with the process 2000, if the app determines that the edit profile clip button 2102 is selected, the app executes a configuration process to update the face clip associated with the profile, such as the configuration process 2200 described with reference to FIG. 22. As shown in FIG. 22, the process 2200 starts with the app controlling 2202 the host mobile computing device to render a face clip edit screen. This face clip edit screen may include, for example, controls configured to prompt for and receive selection of a face clip to be used for the profile.

Continuing with the process 2200, the app receives 2204, via the controls, user input specifying the face clip to be used to represent the profile and stores 2206 an association between the profile and the face clip. It should be noted that, in some examples, the operation 2206 may include communication of the association between the profile and the face clip to other parts (e.g., the surveillance service) of the security system via one or more messages.

Figure 23:
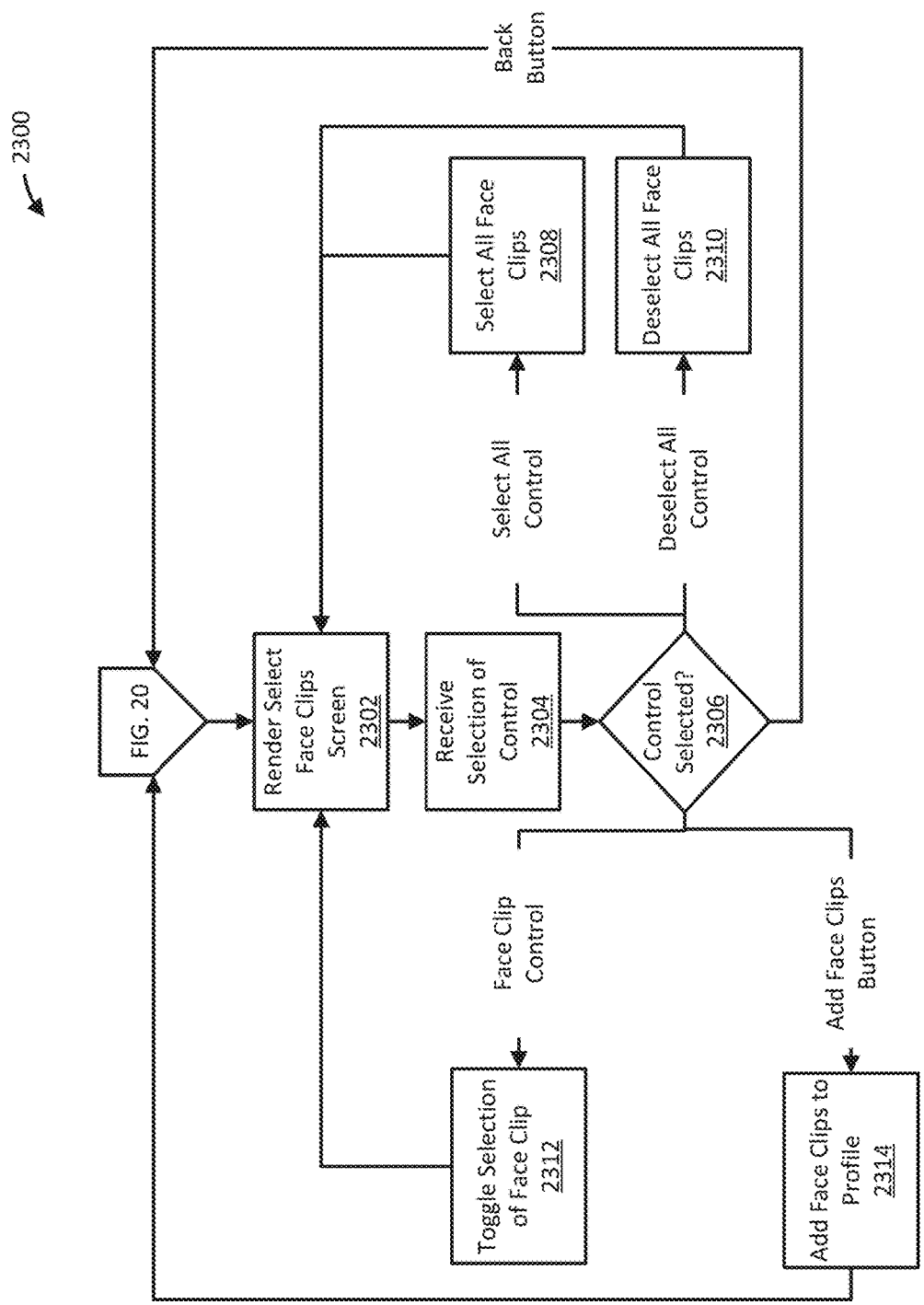
FIG. 23 is a flow diagram illustrating a process of administering a face clip selection screen, according to some examples described herein.
Figure 24:
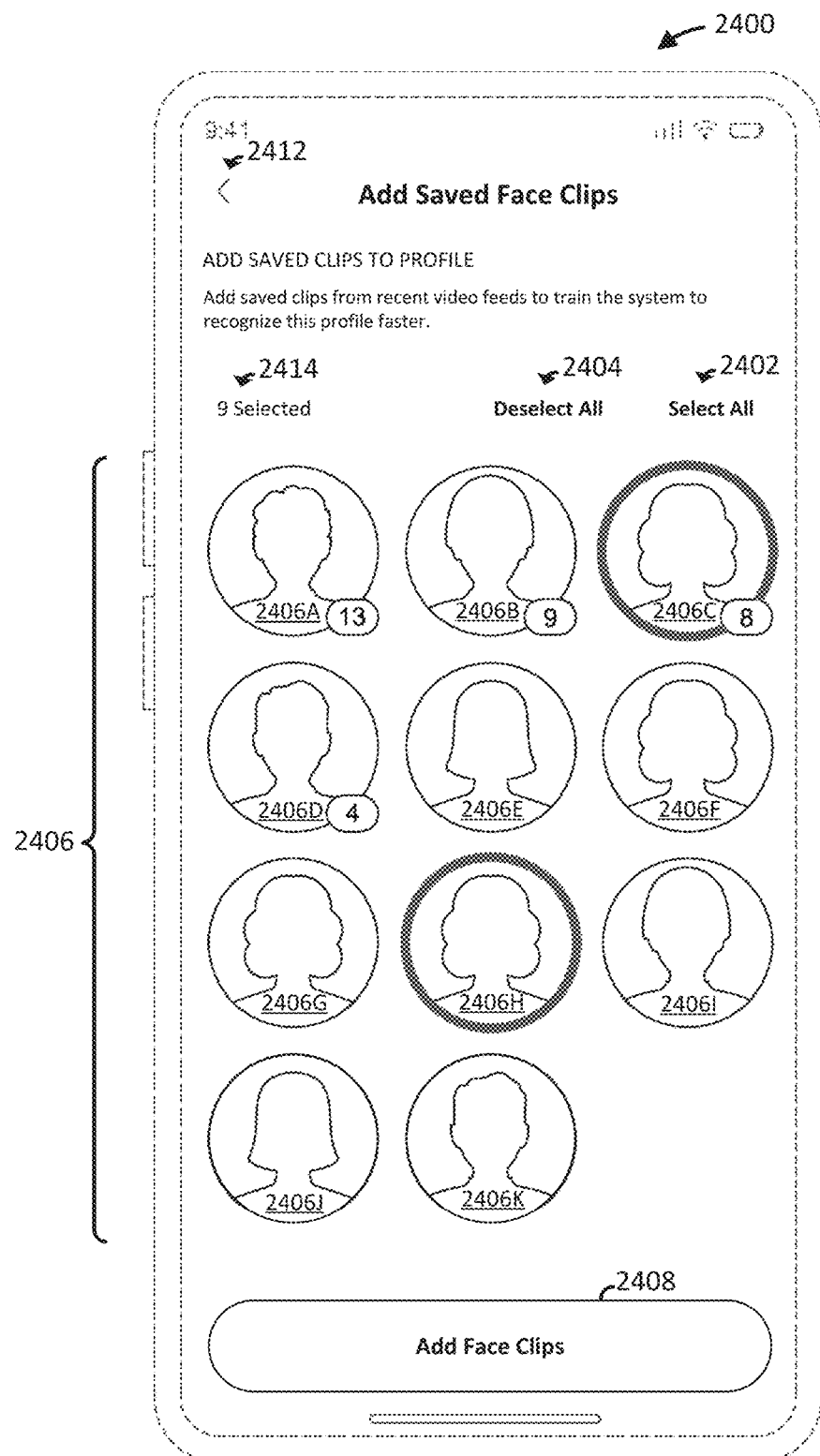
FIG. 24 is a front view of a face clip selection screen, according to some examples described herein.

Returning to FIG. 20, if the app determines that the add face clips control 2108 is selected, the app executes a face clip selection process. FIG. 23 illustrates an example of such a process, a face clip selection process 2300. As shown in FIG. 23, the process 2300 starts with the app controlling the host mobile computing device to render 2302 a face clips selection screen via the touchscreen. FIG. 24 illustrates one example of a face clips selection screen 2400 that can be rendered in some examples. As shown in FIG. 24, the screen 2400 includes a select all control 2402, a deselect all control 2404, a clip control group 2406, an add button 2408, a back button 2412, and a total selected control 2414. The clip control group 2406 includes face clip controls 2406A-2406K.

In some examples, individual face clip controls within the clip control group 2406 include a face clip of a person. In these examples, individual face clip controls can also include a number indicating a count of distinct face clips stored in the security system for the person. As shown in FIG. 24, the face clip control 2406A indicates that the security system has 13 face clips stored for the person depicted in the face clip control 2406A. Similarly, face clip controls 2406B-2406D indicate security system storage of 9, 8, and 4 face clips for the persons depicted in face clip controls 2406B-2406D, respectively. Where the security system stores only a single face clip for a person, no number may be included in the face clip control associated with the person, as illustrated by controls 2406E-2406K. Further, in some examples, the total selected control 2414 indicates a total number of face clips currently marked for subsequent processing.

In some examples, the user can select any one of the controls 2406A-2406K to mark the control for subsequent processing. As shown in FIG. 24, controls 2406C and 2406H are marked. Marked controls can be highlighted (e.g., encircled) in some examples.

In some examples, the user can select the deselect all control 2404 to unmark all face clip controls within the control group 2406, and the user can select the select all control 2402 to mark all face clip controls within the control group 2406. In certain examples, the user can select the add button 2408 to associate marked face clips with the profile being edited. The user can select the back button 2412 to return to the previous screen.

Returning to the process 2300, the app receives 2304 input selecting a control of the screen 2400. For instance, in some examples, the app receives the input selecting the control by executing the processing described above with reference to the operation 1504 of FIG. 15.

Continuing with the process 2300, the app determines 2306 which control of the screen 2400 is selected. For instance, in some examples, the app identifies the control and the type of selection by executing the processing described above with reference to the operation 1506 of FIG. 15.

Continuing with the process 2300, if the app determines that the back button 2412 is selected, the app returns to the previously executing process. If the app determines that the select all control 2402 is selected, the app marks 2308 all face clip controls 2406A-2406K. If the app determines that the deselect all control 2404 is selected, the app unmarks 2310 all marked face clip controls 2406A-2406K. If the app determines that one of the face clip controls 2406A-2406K is selected, the app toggles 2312 marking of the selected face clip control for subsequent processing. If the app determines that the add button 2408 is selected, the app associates 2314 the face clips included in the marked face clip controls with the profile. It should be noted that, in some examples, the operation 2314 may include communication of the association between the profile and the face clips to other parts (e.g., the surveillance service) of the security system via one or more messages.

Figure 25:
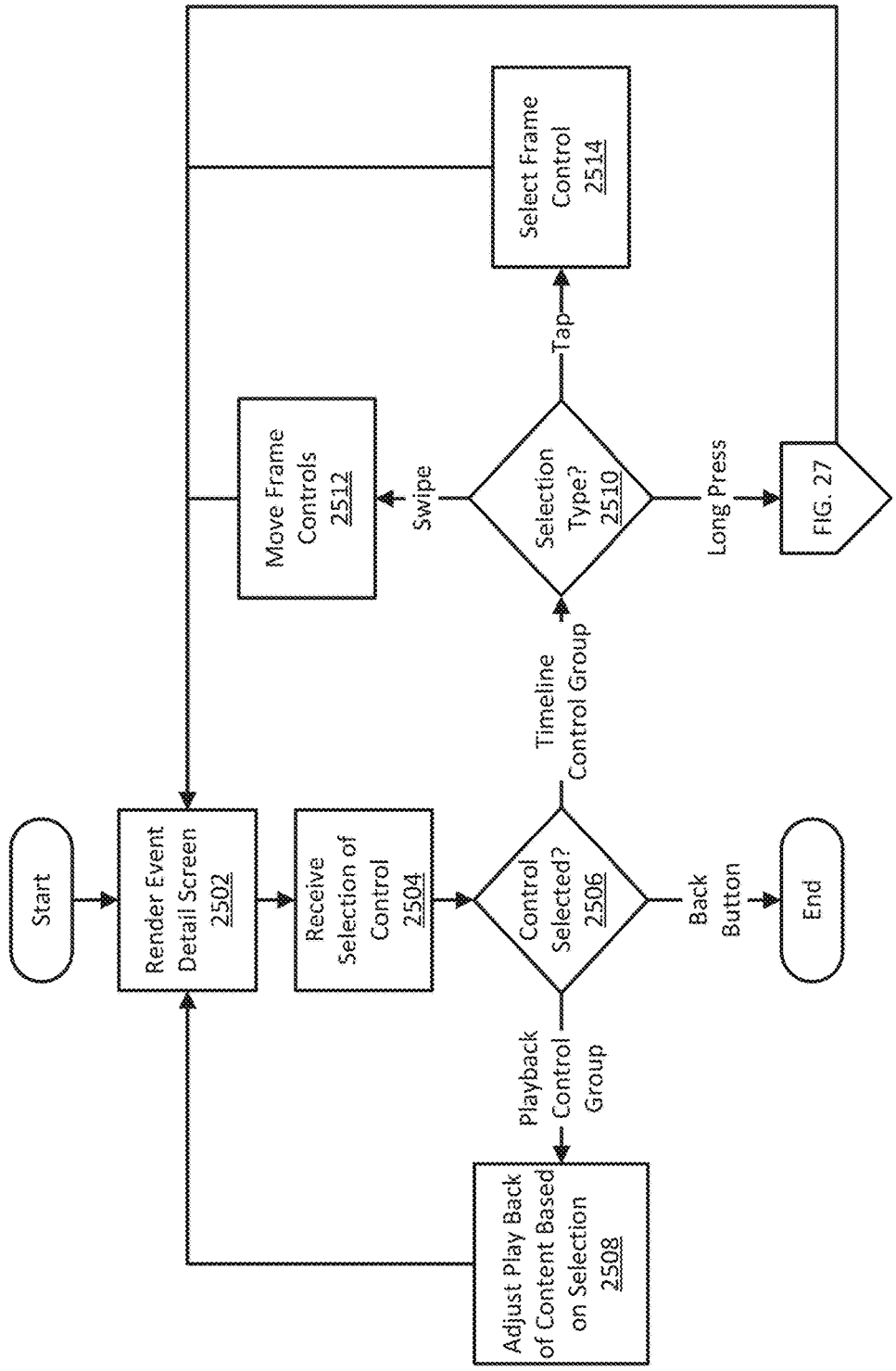
FIG. 25 is a flow diagram illustrating a process of administering an event details screen, according to some examples described herein.
Figure 26:
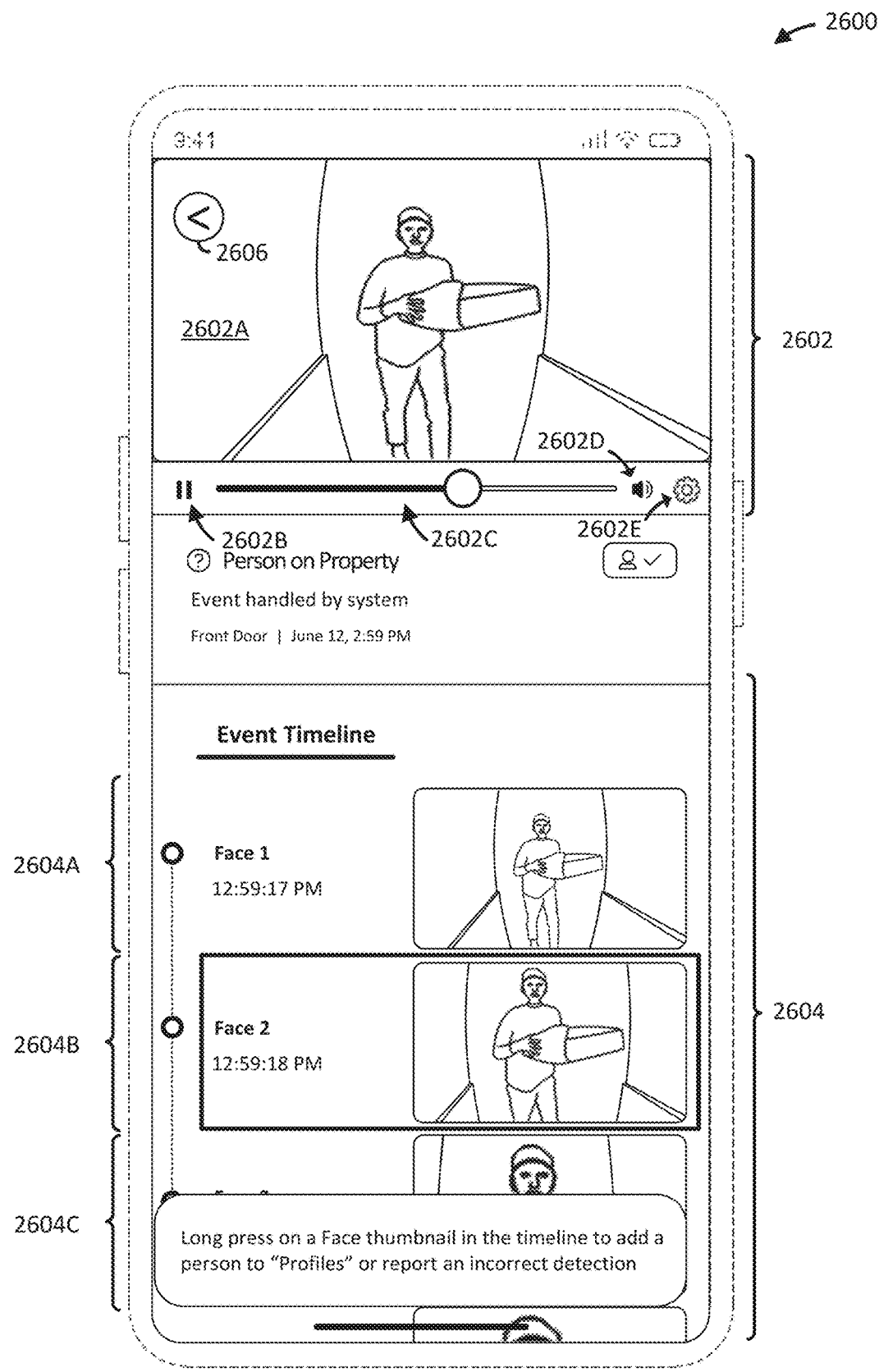
FIG. 26 is a front view of an event details screen, according to some examples described herein.

Some examples described herein are directed to processes that interact with users to add new customer profiles to a security system (e.g., the system 100 of FIG. 1). For instance, in one example, a process to add new customer profiles is implemented as a convenient part of an event review process through which the app displays information regarding events generated by the system. FIG. 25 illustrates an example of such a process, event review process 2500. As shown in FIG. 25, the process 2500 starts with the app controlling the host mobile computing device to render 2502 an event details screen via the touchscreen. FIG. 26 illustrates one example of an event details screen 2600 that can be rendered in some examples. As shown in FIG. 26, the event details screen 2600 includes a playback control group 2602, a timeline control 2604, and a back button 2606. The user can select the back button 2606 to navigate to the previously rendered screen. The playback control group 2602 includes a display area control 2602A, a play button 2602B, a position slider 2602C, a mute button 2602D, and a configuration button 2602E. The timeline control group 2604 includes frame controls 2604A-2604C.

In some examples, the user can select a playback control within the playback control group 2602 to manipulate playback of content related to an event. For instance, in some examples, the user can select the play button 2602B to toggle between playing and pausing playback of the content within the display area control 2602A. The user can select (e.g., via a slow swipe/slide) the position slider 2602C to relocate the time index of playback of the content within the display area control 2602A. The user can select the mute button 2602D to toggle between muting and unmuting audio playback of the content. The user can select the configuration button 2602E to access playback configuration settings, such as playback rate, quality, etc.

In some examples, the user can select a frame control within the timeline control group 2604 to adjust positioning of the frame controls 2604A-2604C within the details screen 2600 or initiate other workflows involving the image displayed within the selected frame control. In certain examples, the app alters the appearance of selected and unselected frame controls 2604A-2604C within the timeline control group to indicate a currently selected frame control. As shown in FIG. 26, the frame control 2604B is currently selected. As such, the frame control 2604B is highlighted (e.g., outlined and/or shaded) and the other frame controls 2604A and 2604C are not highlighted. The user may move all of the one or more frame controls 2604A-2604C by, for example, sliding a selected control toward the top or the bottom of the details screen 2600. In some examples, the user can long press a frame control to initiate a workflow to add the image within the frame control to a profile, as will be described further below.

Returning to the process 2500, the app receives 2504 input selecting a control of the details screen 2600. For instance, in some examples, the app receives the input selecting the control by executing the processing described above with reference to the operation 1504 of FIG. 15.

Continuing with the process 2500, the app determines 2506 which control of the details screen 2600 is selected. For instance, in some examples, the app identifies the control and the type of selection by executing the processing described above with reference to the operation 1506 of FIG. 15.

Continuing with the process 2500, if the app determines that a control of the playback control group 2602 is selected, the app adjusts 2508 playback of the event content in accordance with the selected control. As explained above, adjusting 2508 may include toggling between pause and play, adjusting volume, moving to a different location within the content, etc.

Continuing with the process 2500, if the app determines that a control of the timeline control group 2604 is selected, the app next determines 2510 the type of selection. If the app determines that the type of the selection is a swipe, the app moves 2512 the frame controls 2604A-2604C in the direction of the swipe at a speed proportional to the speed of the swipe. If the app determines that the type of the selection is a tap, the app visually highlights 2514 the selected control.

Figure 27:
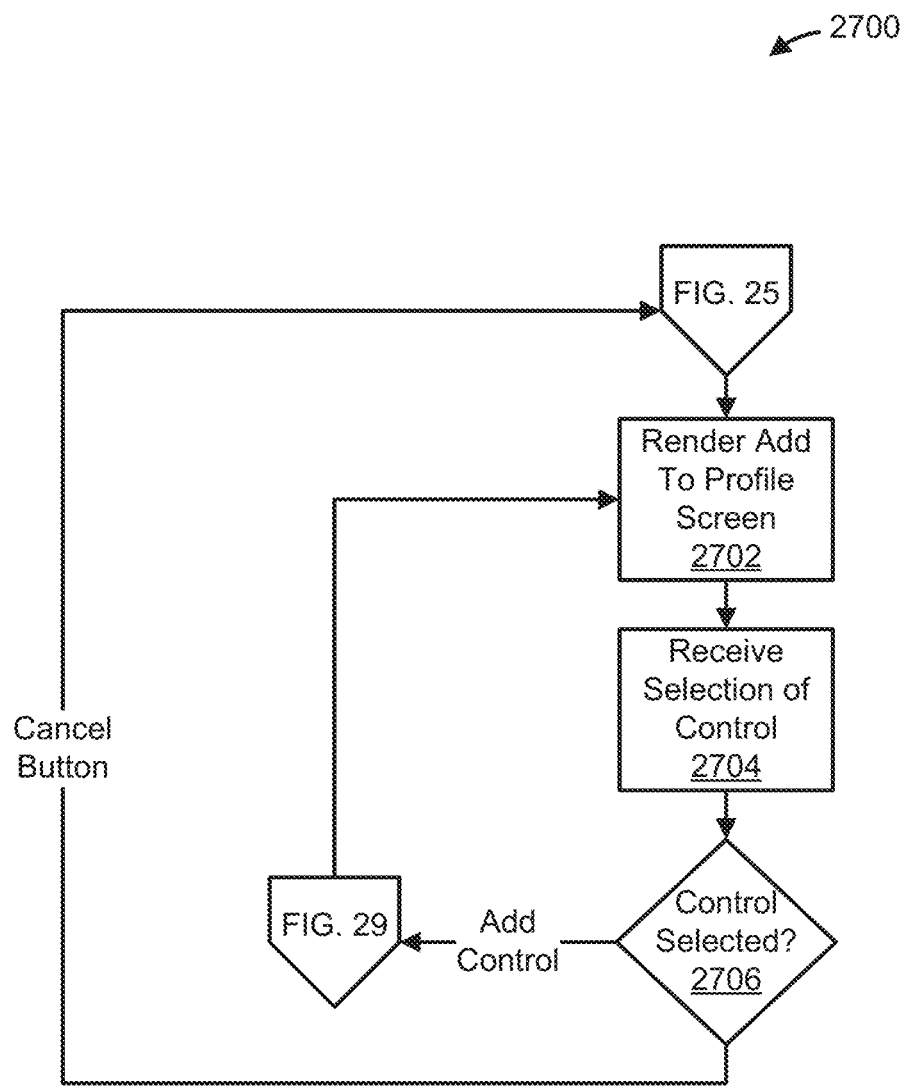
FIG. 27 is a flow diagram illustrating a process of administering an add to profile screen, according to some examples described herein.
Figure 28:
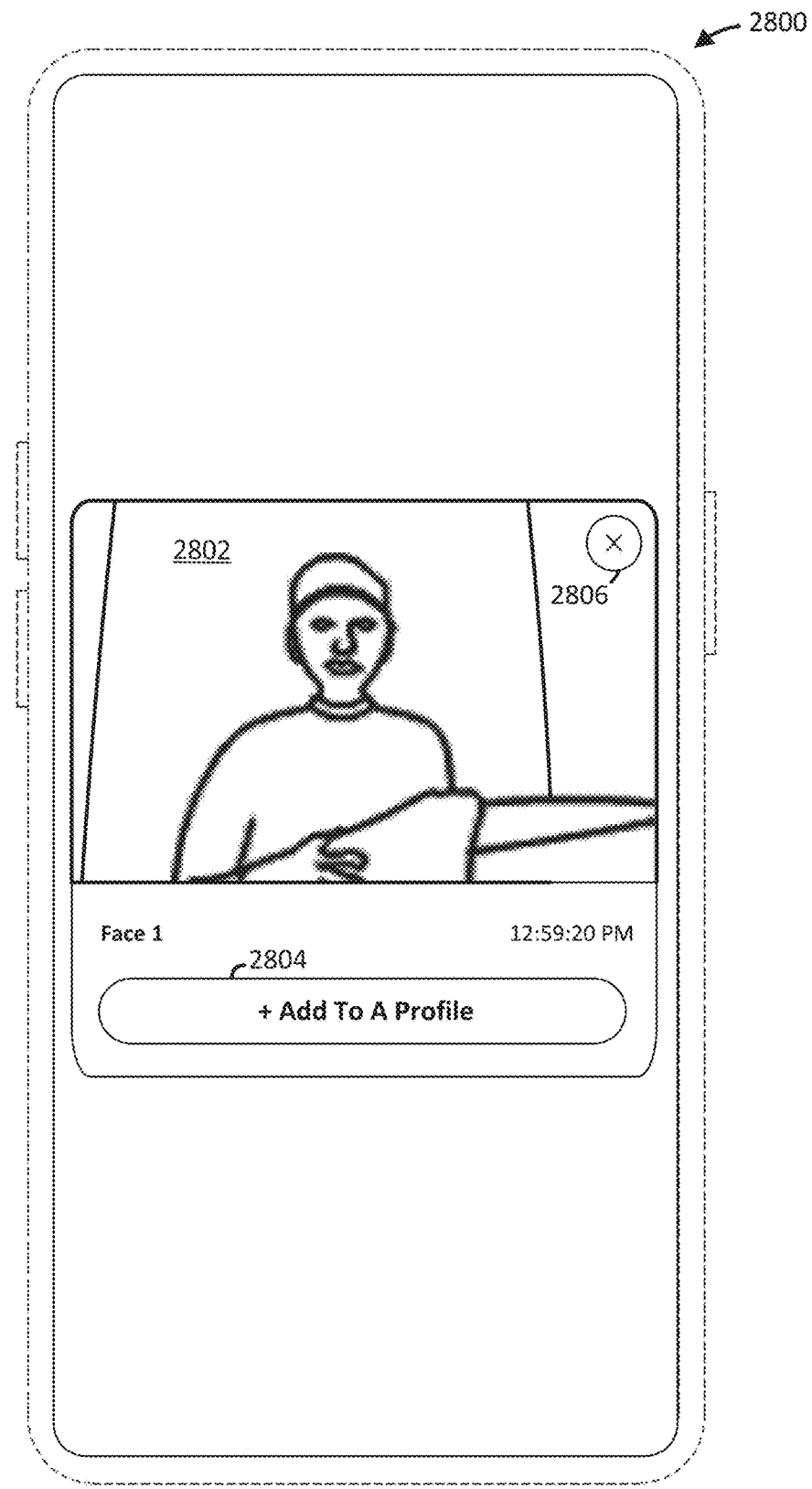
FIG. 28 is a front view of an add to profile screen, according to some examples described herein.

Continuing with the process 2500, if the app determines that the type of the selection is a long press, the app executes an add to profile process. FIG. 27 illustrates an example of such a process, add to profile process 2700. As shown in FIG. 27, the process 2700 starts with the app controlling the host mobile computing device to render 2702 an add to profile screen via the touchscreen. FIG. 28 illustrates one example of an add to profile screen 2800 that can be rendered in some examples. As shown in FIG. 28, the add to profile screen 2800 includes a face clip control 2802, an add to profile button 2804, and a cancel button 2806. The user can select the cancel button 2806 to navigate to the previously rendered screen. As illustrated in FIG. 28, the face clip control 2802 displays an image captured by a location-based device and recognized as depicting a person by the security system. In some examples, the user can select the add to profile button 2804 to confirm that the user wishes to continue the previously initiated workflow of adding a face clip from the image shown in the face clip control to a profile.

Returning to the process 2700, the app receives 2704 input selecting a control of the screen 2800. For instance, in some examples, the app receives the input selecting the control by executing the processing described above with reference to the operation 1504 of FIG. 15.

Continuing with the process 2700, the app determines 2706 which control of the screen 2800 is selected. For instance, in some examples, the app identifies the control and the type of selection by executing the processing described above with reference to the operation 1506 of FIG. 15.

Figure 29:
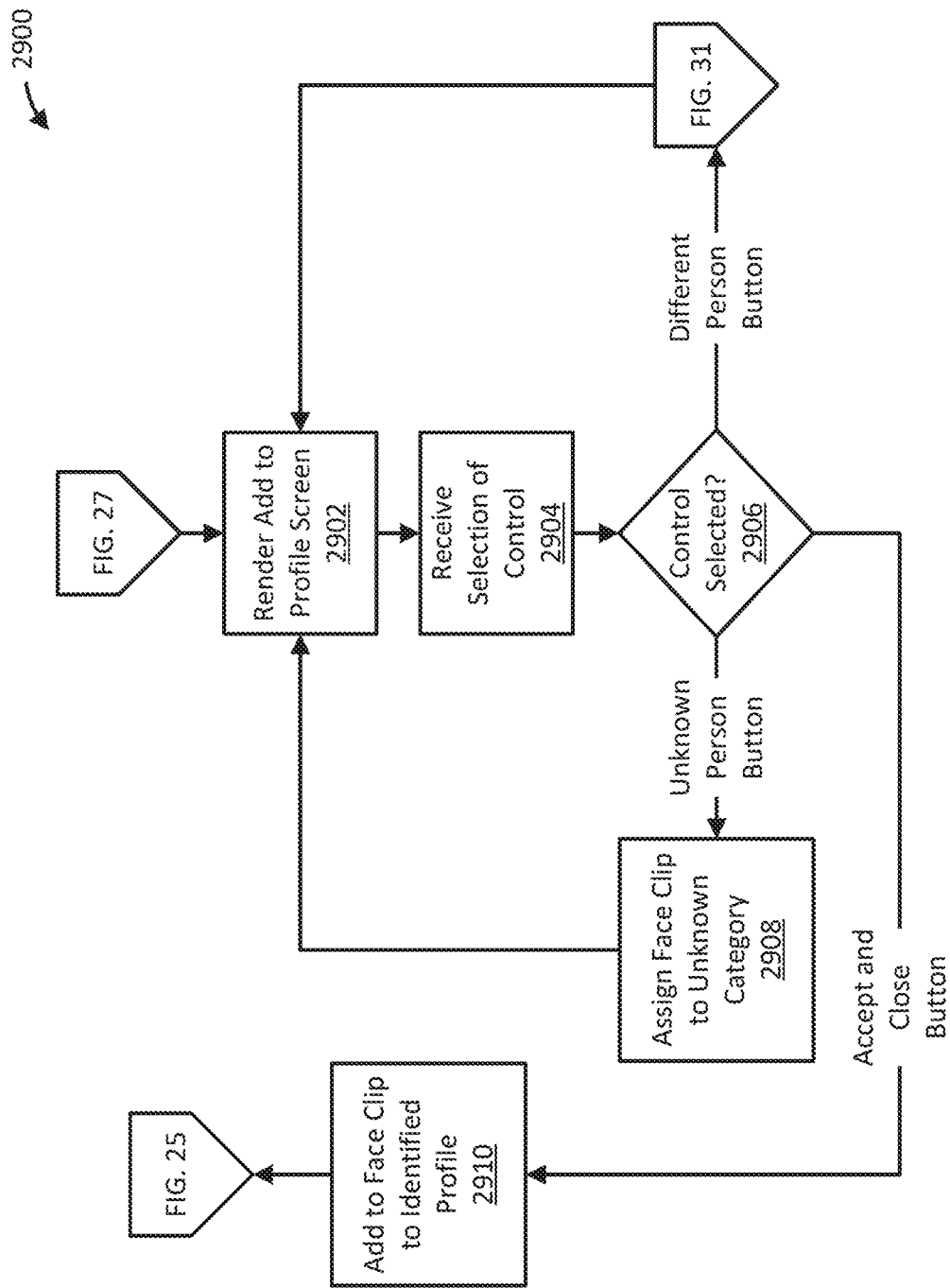
FIG. 29 is a flow diagram illustrating a process of administering another add to profile screen, according to some examples described herein.
Figure 30:
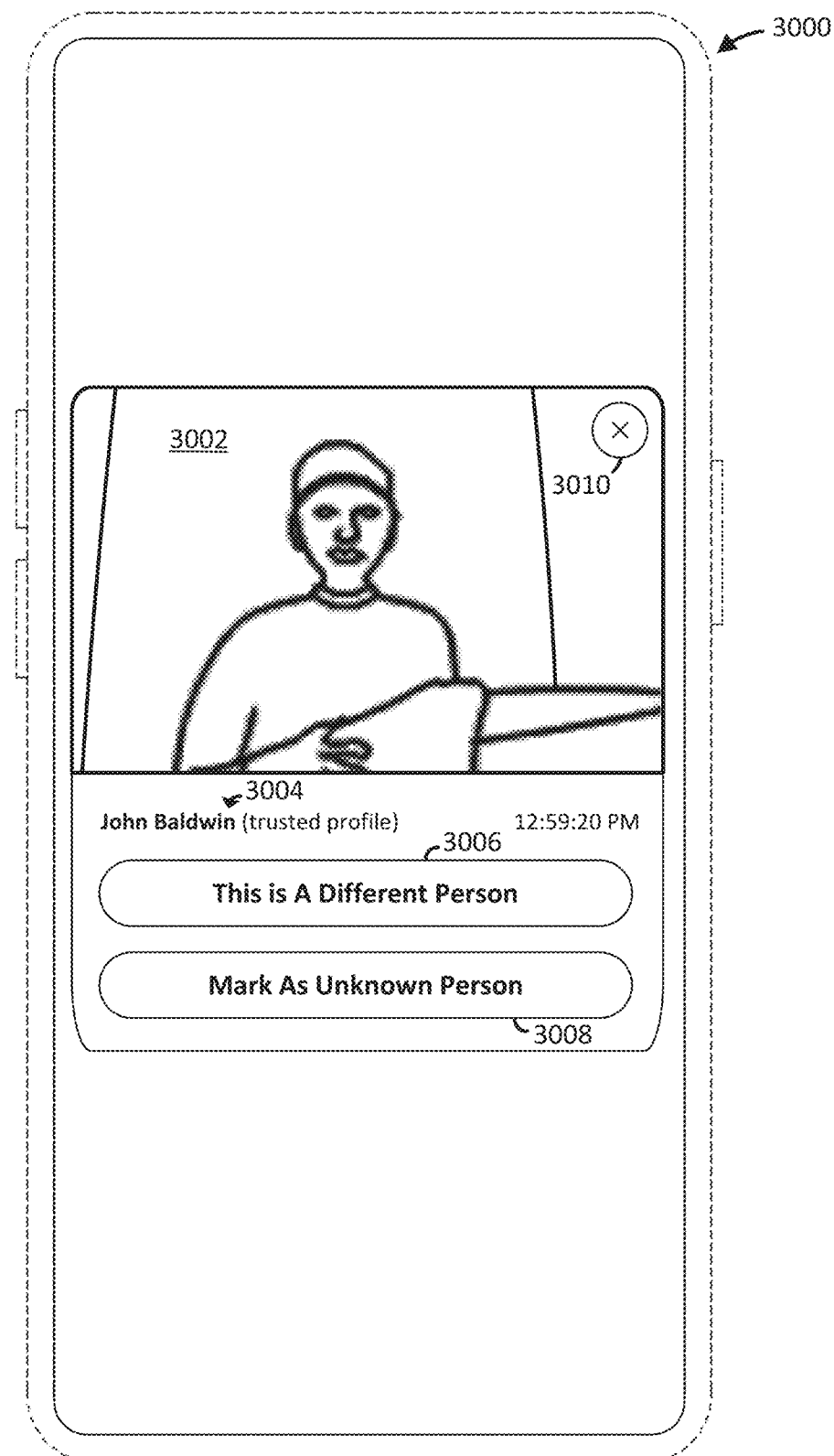
FIG. 30 is a front view of another add to profile screen, according to some examples described herein.

Continuing with the process 2700, if the app determines that the cancel button 2806 is selected, the app returns to the previously executing process. If the app determines that the add to profile button 2804 was selected, the app executes a profile confirmation process. FIG. 29 illustrates an example of such a process, profile confirmation process 2900. As shown in FIG. 29, the process 2900 starts with the app controlling the host mobile computing device to render 2902 a profile confirmation screen via the touchscreen. FIG. 30 illustrates one example of a profile confirmation screen 3000 that can be rendered in some examples. As shown in FIG. 30, the screen 3000 includes a face clip control 3002, a profile identification control 3004, a profile selection button 3006, a mark unknown button 3008, and a confirm and close button 3010. The user can select the confirm and close button 3010 to confirm the association between the face clip included in the face clip control 3002 and the profile identified by the profile identification control 3004 and navigate to the previously rendered screen.

In some examples, the profile identification control 3004 includes an identifier (e.g., a name) of a profile of a person the security system recognizes within the image displayed in the face clip control 3002. The user can select the profile selection button 3006 to indicate that the security system has misrecognized the person, and the user wishes to correct this error and associate the image with a different, potentially new, profile. The user can select the mark unknown button 3008 to indicate that the security system has misrecognized the person, and the user wishes to correct this error without associating the image with a profile.

Returning to the process 2900, the app receives 2904 input selecting a control of the screen 3000. For instance, in some examples, the app receives the input selecting the control by executing the processing described above with reference to the operation 1504 of FIG. 15.

Continuing with the process 2900, the app determines 2906 which control of the screen 3000 is selected. For instance, in some examples, the app identifies the control and the type of selection by executing the processing described above with reference to the operation 1506 of FIG. 15.

Continuing with the process 2900, if the app determines that the confirm and close button 3010 is selected, the app associates 2910 the face clip included within the face clip control 3002 with the profile identified by the profile identification control 3004 and returns to the process 2500 of FIG. 25. If the app determines that the mark unknown button 3008 is selected, the app assigns 2908 the face clip included in the face clip control 3002 to a category of unknown. In some examples, such face clips are retained for potential addition to a profile via subsequent processes and screens, such as the processes and screens described below with reference to FIGS. 49 and 50.

Figure 31:
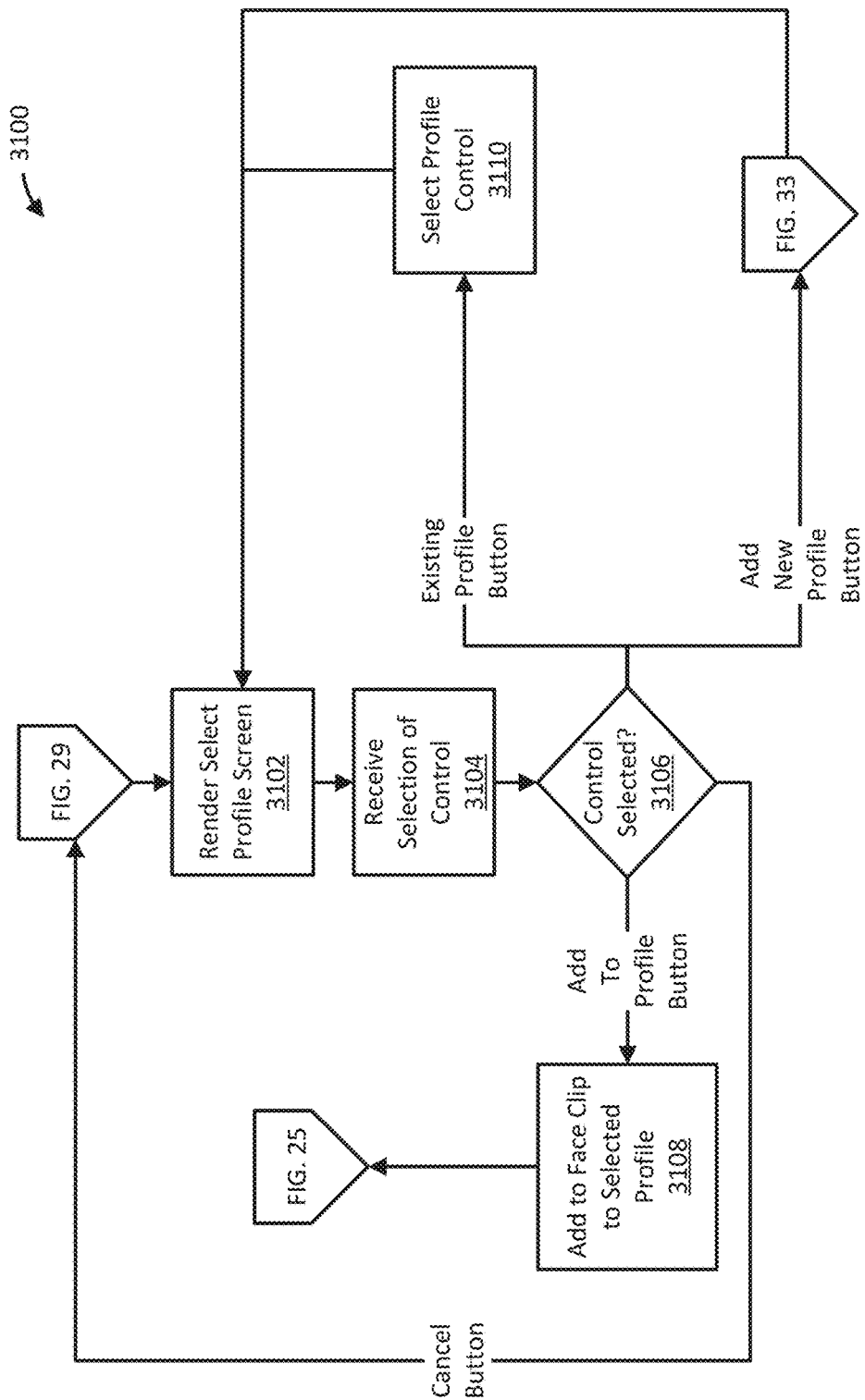
FIG. 31 is a flow diagram illustrating a process of administering a profile selection screen, according to some examples described herein.
Figure 32:
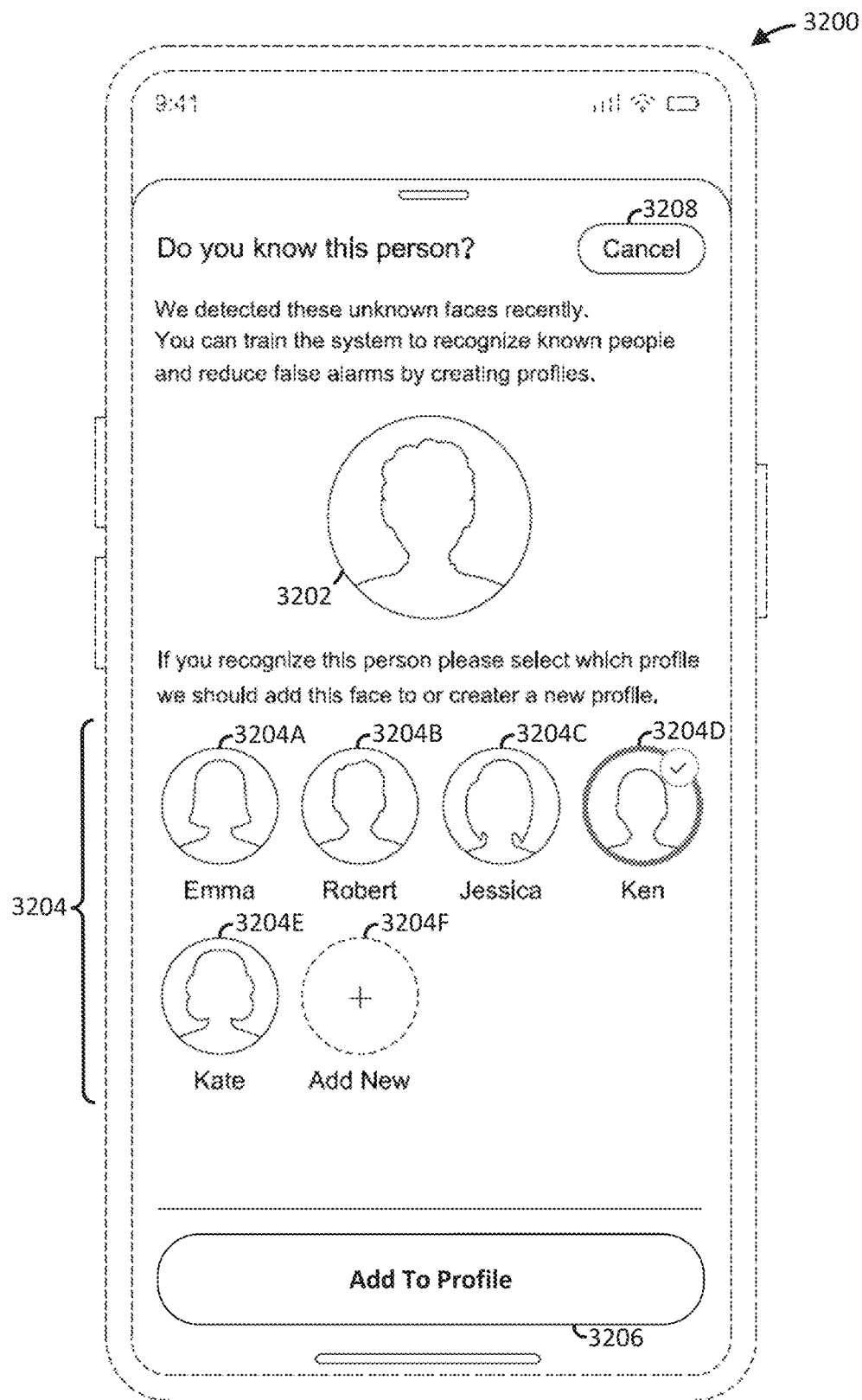
FIG. 32 is a front view of a profile selection screen, according to some examples described herein.

Continuing with the process 2900, if the app determines that the profile selection button 3006 is selected, the app executes a profile selection process. FIG. 31 illustrates an example of such a process, profile selection process 3100. As shown in FIG. 31, the process 3100 starts with the app controlling the host mobile computing device to render 3102 a profile selection screen via the touchscreen. FIG. 32 illustrates one example of a profile selection screen 3200 that can be rendered in some examples. As shown in FIG. 32, the profile selection screen 3200 includes a face clip control 3202, a profile control group 3204, an add to profile button 3206, and a cancel button 3208. The user can select the cancel button 3208 to navigate to the previously rendered screen. The profile control group 3204 includes existing profile buttons 3204A-3204E and a new profile button 3204F.

In some examples, the face clip control 3202 includes an image targeted for association with a profile. The user can select a profile with which to associate, assign or otherwise link to the image by selecting one of the existing profile buttons 3204A-3204E or initiate addition of a new profile to associate with the image by selecting the new profile button 3204F. In some examples, the app alters the appearance of selected and unselected buttons within the control group to indicate a currently selected button. For instance, as shown in FIG. 32, the existing profile button 3204D is highlighted (e.g., encircled and checked) and the other existing profile buttons 3204A-3204C and 3204E are not highlighted.

In some examples, the user can select the add to profile button 3206 to associate the image included in the face clip control 3202 with the profile associated with the currently selected existing profile button. This association, assignment or linkage provides labeled training data to the security system, thereby enabling further training of an AI service (e.g., the AI service 508 of FIG. 5A) to increase accurate recognition of the person associated with the profile. In some examples, the user can select the new profile button 3204F to create a new profile with which the image included in the face clip control 3202 can be associated.

Returning to the process 3100, the app receives 3104 input selecting a control of the screen 3200. For instance, in some examples, the app receives the input selecting the control by executing the processing described above with reference to the operation 1504 of FIG. 15.

Continuing with the process 3100, the app determines 3106 which control of the screen 3200 is selected. For instance, in some examples, the app identifies the control and the type of selection by executing the processing described above with reference to the operation 1506 of FIG. 15.

Continuing with the process 3100, if the app determines that the cancel button 3208 is selected, the app returns to the previously executing process. If the app determines that one of existing profile buttons 3204A-3204E is selected, the app marks 3110 the selected button for subsequent processing and highlights the selected button. If the app determines that the add to profile button 3206 is selected, the app associates 3108 the face clip included within the face clip control 3202 with the profile associated, assigned or otherwise linked with the currently selected existing profile button.

Figure 33:
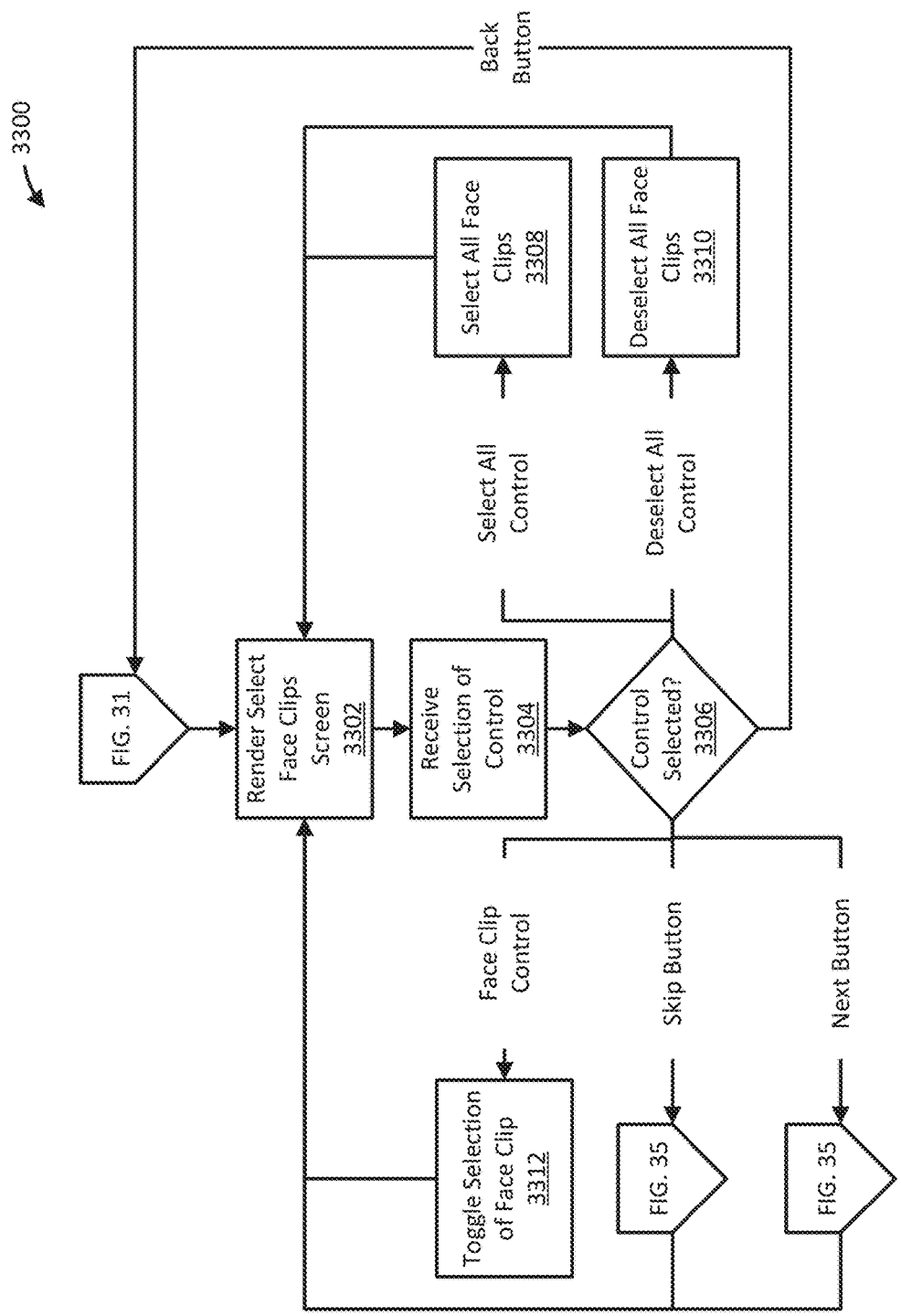
FIG. 33 is a flow diagram illustrating a process of administering a face clip selection screen, according to some examples described herein.
Figure 34:
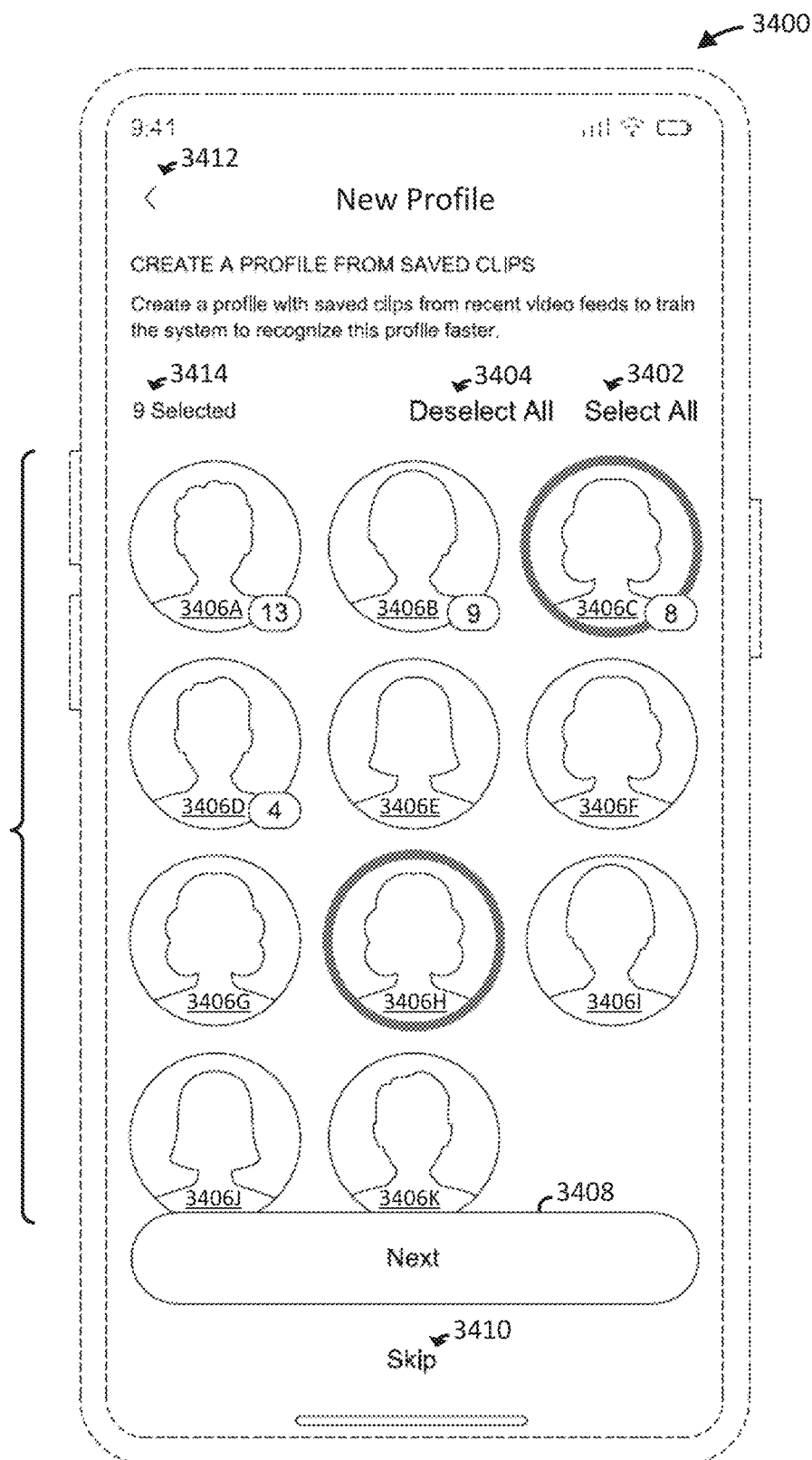
FIG. 34 is a front view of a face clip selection screen, according to some examples described herein.

Continuing with the process 3100, if the app determines that the new profile button 3204F is selected, the app executes a face clip selection process. FIG. 33 illustrates an example of such a process, face clip selection process 3300. As shown in FIG. 33, the process 3300 starts with the app controlling the host mobile computing device to render 3302 a face clips selection screen via the touchscreen. FIG. 34 illustrates one example of a face clips selection screen 3400 that can be rendered in some examples. As shown in FIG. 34, the clip selection screen 3400 includes a select all control 3402, a deselect all control 3404, a clip control group 3406, a next button 3408, a skip control 3410, a back button 3412, and a total selected control 3414. The clip control group 3406 includes face clip controls 3406A-3406K.

In some examples, individual face clip controls within the clip control group 3406 include a face clip. Face clips may include images recognized by the security system as depicting a human face and/or images stored on, or accessible to, the host mobile computing device (e.g., stored within a "camera roll" or the like). In these examples, individual face clip controls can also include a number indicating a count of distinct face clips stored in the security system for the person. As shown in FIG. 34, the face clip control 3406A indicates that the security system has 13 face clips stored for the person depicted in the face clip control 3406A. Similarly, face clip controls 3406B-3406D indicate security system storage of 9, 8, and 4 face clips for the persons depicted in face clip controls 3406B-3406D, respectively. Where the security system stores only a single face clip for a person, no number may be included in the face clip control associated with the person, as illustrated by controls 3406E-3406K. Further, in some examples, the total selected control 3414 indicates a total number of face clips currently marked for subsequent processing.

In some examples, the user can select any one of the controls 3406A-3406K to mark the control for subsequent processing. As shown in FIG. 34, controls 3406C and 3406H are marked. Marked controls can be highlighted (e.g., encircled) in some examples.

In some examples, the user can select the deselect all control 3404 to unmark all face clip controls within the control group 3406, and the user can select the select all control 3402 to mark all face clip controls within the control group 3406. In certain examples, the user can select the next button 3408 to proceed with the new profile workflow using the marked face clips. The user can select the skip control 3410 to proceed with the new profile workflow without using any face clips associated with the face clip controls 3406A-3406K. The user can select the back button to return to the previous screen.

Returning to the process 3300, the app receives 3304 input selecting a control of the screen 3400. For instance, in some examples, the app receives the input selecting the control by executing the processing described above with reference to the operation 1504 of FIG. 15.

Continuing with the process 3300, the app determines 3306 which control of the screen 3400 is selected. For instance, in some examples, the app identifies the control and the type of selection by executing the processing described above with reference to the operation 1506 of FIG. 15.

Continuing with the process 3300, if the app determines that the back button 3412 is selected, the app returns to the previously executing process. If the app determines that the select all control 3402 is selected, the app marks 3308 all face clip controls 3406A-3406K. If the app determines that the deselect all control 3404 is selected, the app unmarks 3310 all marked face clip controls 3406A-3406K. If the app determines that one of the face clip controls 3406A-3406K is selected, the app toggles 3312 marking of the selected face clip control for subsequent processing.

Figure 35:
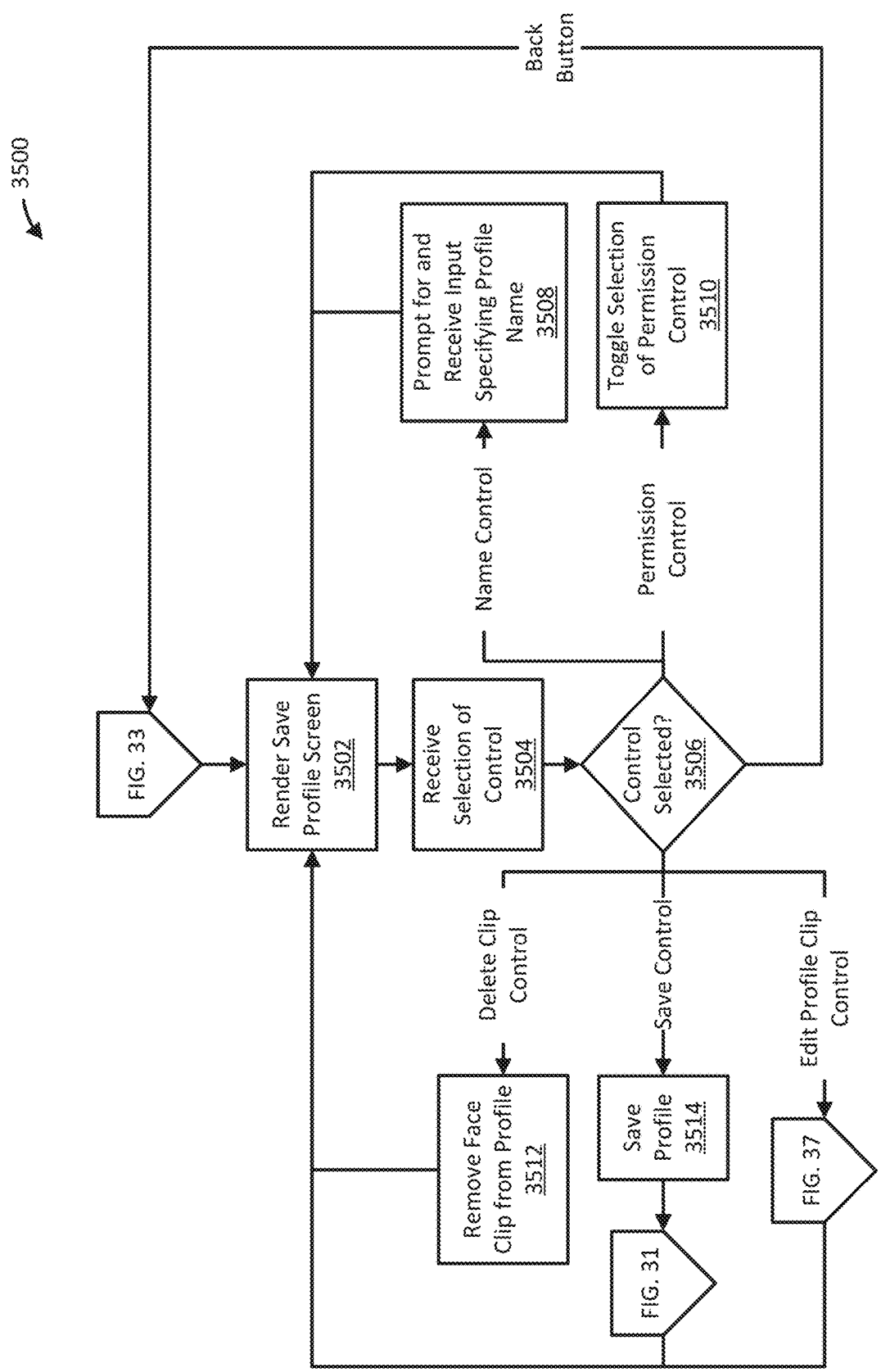
FIG. 35 is a flow diagram illustrating a process of administering a save profile screen, according to some examples described herein.
Figure 36:
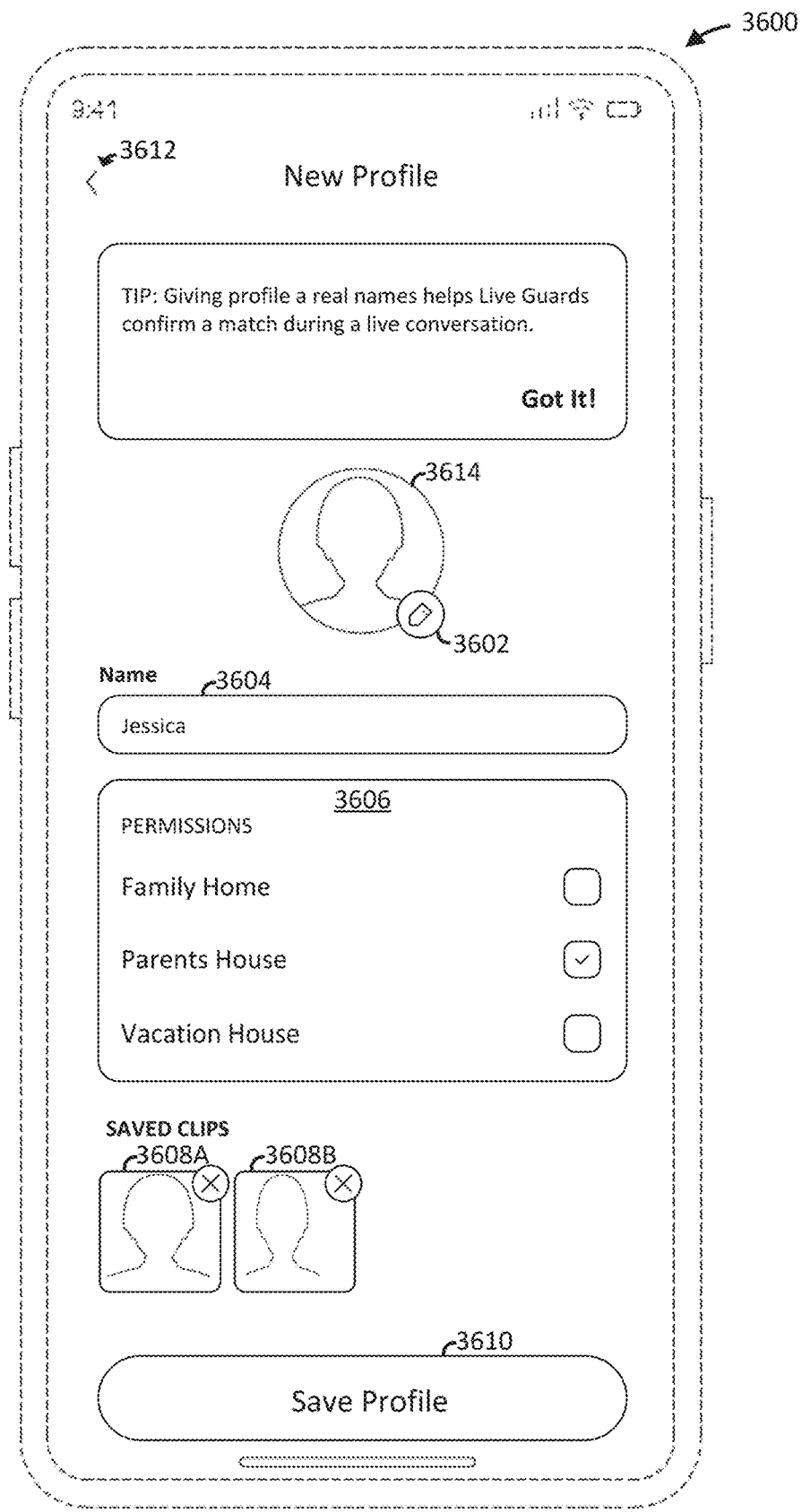
FIG. 36 is a front view of a save profile screen, according to some examples described herein.

Continuing with the process 3300, if the app determines that either the next button 3408 or the skip control 3410 is selected, the app executes a save profile process. FIG. 35 illustrates an example of such a process, save profile process 3500. As shown in FIG. 35, the process 3500 starts with the app controlling the host mobile computing device to render 3502 a save profile screen via the touchscreen. FIG. 36 illustrates one example of a save profile screen 3600 that can be rendered in some examples. As shown in FIG. 36, the save profile screen 3600 includes an edit profile clip button 3602, a profile name control 3604, a permissions list control 3606, delete clip controls 3608A and 3608B, a save profile button 3610, a back button 3612, and a profile clip control 3614. Through the save profile screen 3600 and the controls included therein, the app enables the user to save profiles of persons trusted to visit locations associated with the currently authenticated user account.

In some examples, the profile clip control 3614 includes a face clip representative of the person associated or linked with the profile being created. The face clip initially included in the profile clip control may be selected by the security system based a metric, for example, on completeness and clarity metrics of the face clip calculated by the security system, as described herein. In some examples, the completeness metric is based on a percentage of landmarks positively identified in the face clip. If no face clips have been selected for the profile, the app may include a generic image within the profile clip control 3614. The name control 3604 can include a textual identifier of the profile (e.g., a person's name). The textual identifier can include any alphanumeric character. The permissions list control 3606 indicates locations at which the person in the profile is welcome to visit without initiating an alarm. The delete clip controls 3608A and 3608B include face clips that are currently associated with the profile.

In some examples, the user can effectuate a number of changes to the current profile of the save profile screen 3600 via the controls included therein. For instance, in certain examples, the user can change the face clip displayed in the profile clip control by selecting the edit profile clip button 3602. The user can select the name control 3604 to enter a name for the profile. The user can select a control within the permissions list control 3606 to mark a location associated with the control as being welcome to visitation by the person associated with the profile without sounding an alarm. The user can select one of the delete clip controls 3608A and 3608B to disassociate the face clip depicted within the control from the profile. The user can save changes made to the profile, and complete the new profile workflow, by selecting the save profile button 3610.

Returning to the process 3500, the app receives 3504 input selecting a control of the screen 3600. For instance, in some examples, the app receives the input selecting the control by executing the processing described above with reference to the operation 1504 of FIG. 15.

Continuing with the process 3500, the app determines 3506 which control of the screen 3600 is selected. For instance, in some examples, the app identifies the control and the type of selection by executing the processing described above with reference to the operation 1506 of FIG. 15.

Continuing with the process 3500, if the app determines that the back button 3612 is selected, the app returns to the previously executing process. If the app determines that the name control 3604 is selected, the app prompts for and receives 3508 input specifying a name for the profile to be saved. If the app determines that a control of the permissions list control 3606 was selected, the app toggles 3510 marking of the selected control. If the app determines that a delete clip control (e.g., one of delete clip controls 3608A and 3608B) is selected, the app disassociates 3512 the selected face clip depicted within the selected control from the profile. If the app determines that the save profile button 3610 is selected, the app saves 3514 the profile. It should be noted that the operation 3514 may involve saving profile information locally and/or remotely, so that the security system as a whole can utilize the information to recognize persons permitted to visit specified locations without the visit resulting in an alarm.

Figure 37:
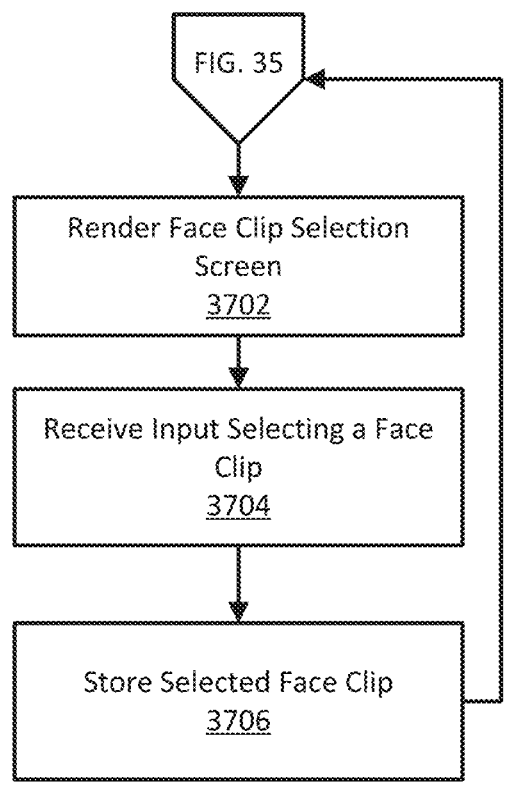
FIG. 37 is a flow diagram illustrating a process of administering a profile face clip selection screen, according to some examples described herein.

Continuing with the process 3500, if the app determines that the edit profile clip button 3602 is selected, the app executes a configuration process to update the face clip associated with the profile. FIG. 37 illustrates an example of such a process, configuration process 3700. As shown in FIG. 37, the process 3700 starts with the app controlling 3702 the host mobile computing device to render a face clip edit screen. This face clip edit screen may include, for example, controls configured to prompt for and receive selection of a face clip to be used for the profile.

Continuing with the process 3700, the app receives 3704, via the controls, user input specifying the face clip to be used to represent the profile and stores 3706 an association between the profile and the face clip. It should be noted that, in some examples, the operation 3706 may include communication of the association between the profile and the face clip to other parts (e.g., the surveillance service) of the security system via one or more messages.

Figure 38:
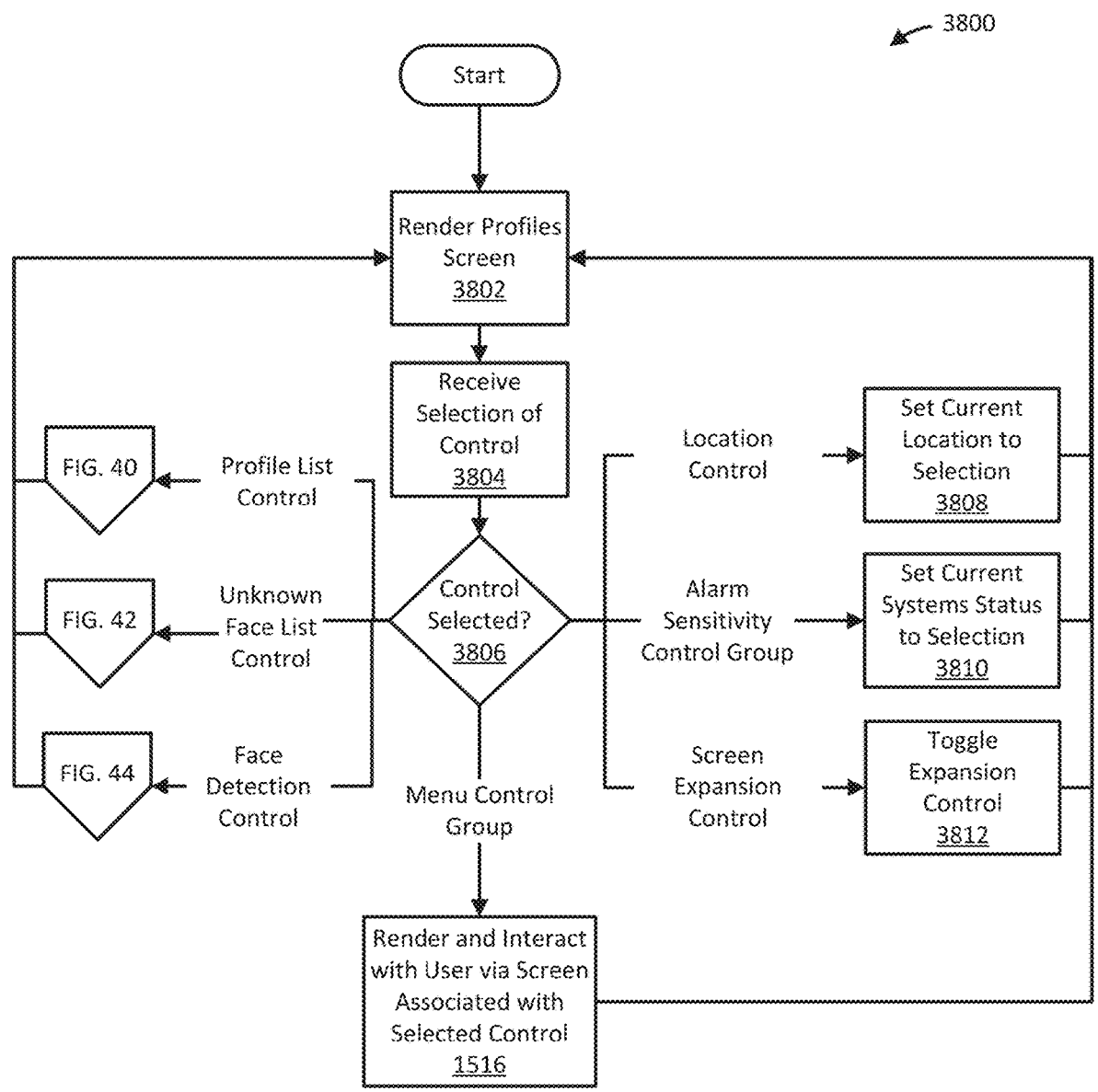
FIG. 38 is a flow diagram illustrating a process of administering a profiles screen, according to some examples described herein.
Figure 39:
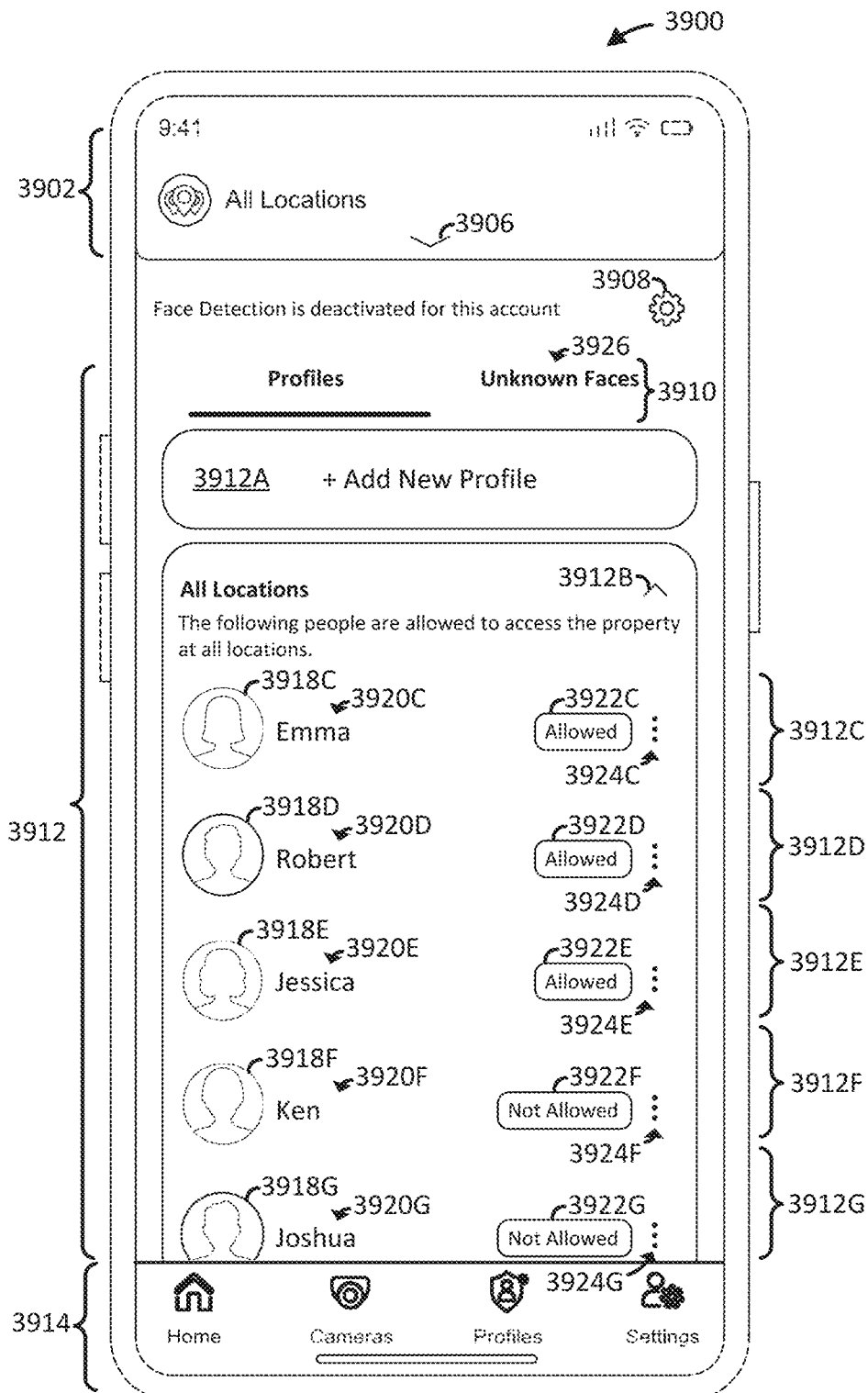
FIG. 39 is a front view of a profiles screen, according to some examples described herein.
Figure 43:
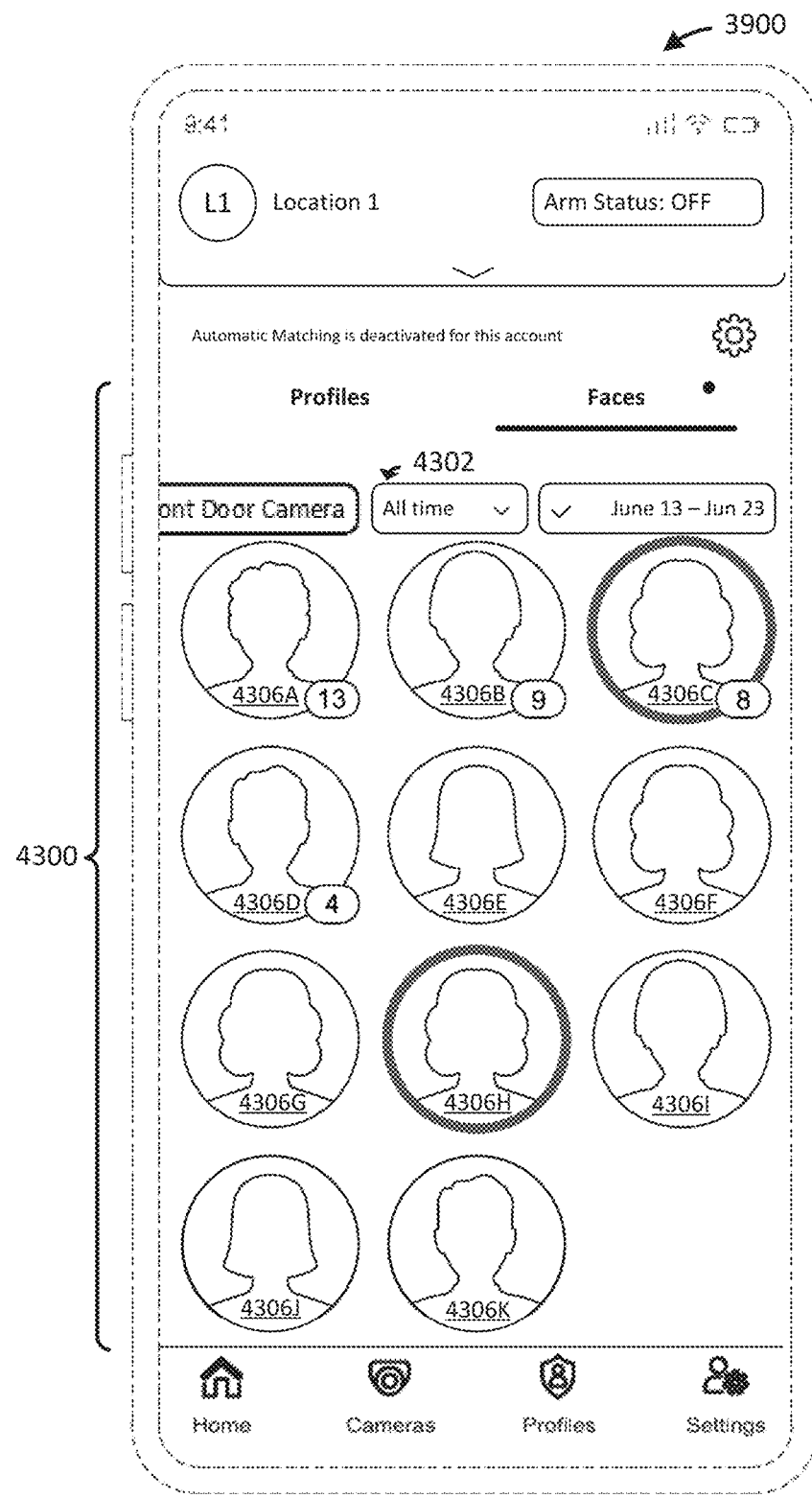
FIG. 43 is another front view of the profiles screen, according to some examples described herein.

Turning now to FIG. 38, the profiles screen provisioning process 3800 is illustrated. As shown in FIG. 38, the process 3800 starts with the app controlling the host mobile computing device to render 3802 a profiles screen via the touchscreen. FIG. 39 illustrates one example of a profiles screen 3900 that can be rendered in some examples. As shown in FIG. 39, the profiles screen 3900 includes a location control group 3902, an expansion control 3906, a face detection configuration control 3908, a profile control group 3910, and a menu control group 3914. The profile control group 3910 includes a profile list control group 3912 and a face list control group 3926, which is illustrated in FIG. 43 and described further below. The profile list control group 3912 includes an add new profile button 3912A, an optional location expansion control 3912B, and profile list entry controls 3912C-3912G. Individual list entry controls include face clip controls 3918 (shown as face clip controls 3918C-3918G), name controls 3920 (shown as name controls 3920C-3920G), status controls 3922 (shown as status controls 3922C-3922G), and edit controls 3924 (shown as edit controls 3924C-3924G).

In some examples, the location control group 3902, the expansion control 3906, and the menu control group 3914 operate within the screen 3900 as do the location control group 1602, the expansion control 1606, and the menu control group 1614 within the screen 1600. As such, the location control group 3902, the expansion control 3906, and the menu control group 3914 are not described further here for purposes of brevity.

In some examples, the user can select the face detection configuration control 3908 to navigate to a face detection preferences screen configured to interact with the user to establish or modify face detection preferences. For instance, in some examples, the face detection preferences screen includes controls configured to receive preferences regarding whether to activate or deactivate identification of individual persons by the security system via facial recognition processes.

Figure 41:
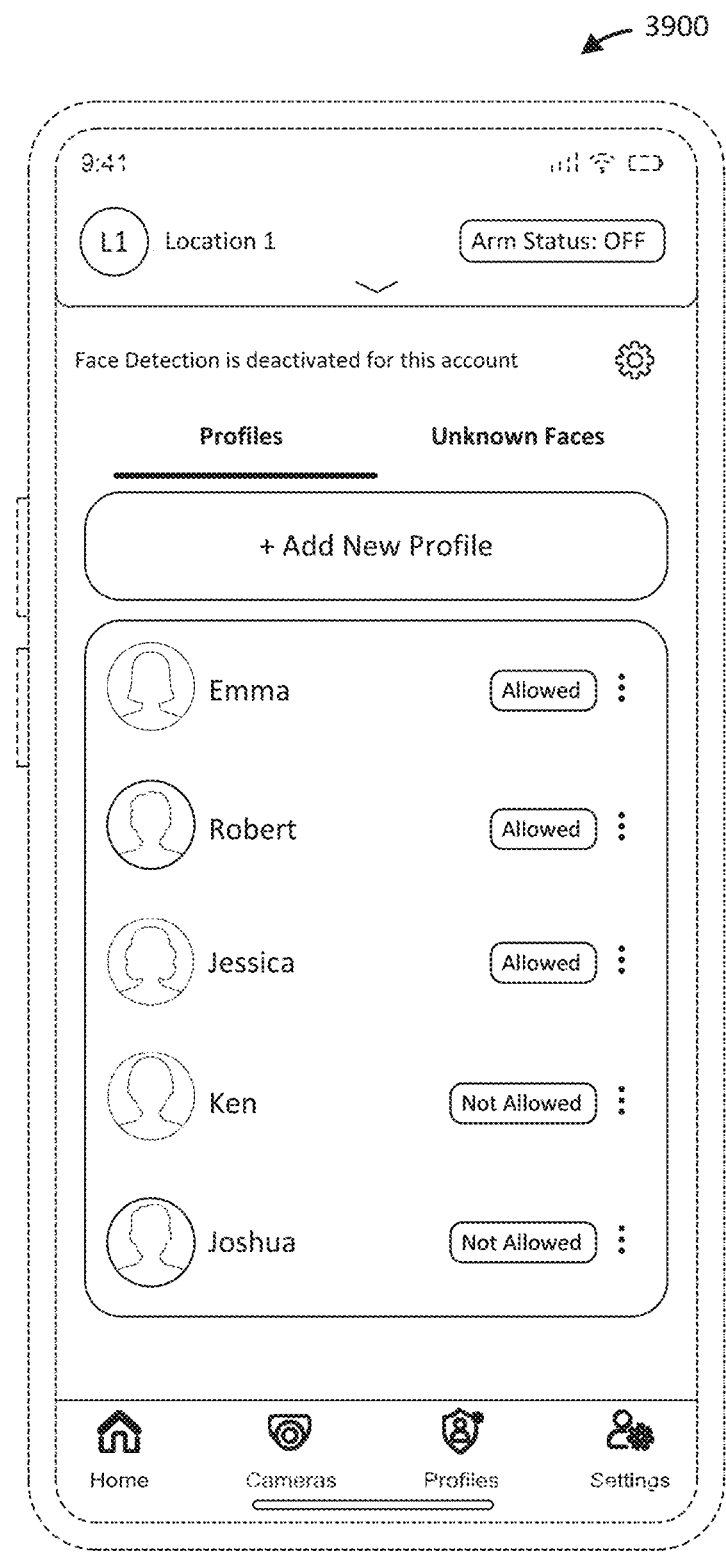
FIG. 41 is another front view of the profiles screen, according to some examples described herein.

In some examples, the user can interact with the profile control group 3910 to access either the profile list control group 3912 or the face list control group 3926. The profile list control group 3912 allows the user to initiate a new profile workflow by selecting the add new profile button 3912A or edit existing profiles by selecting one of the edit controls 3924. To indicate the identity of existing profiles associated with the profile list entry controls 3912C-3912G, individual list controls include a face clip of a profile within the profile face clips controls 3918, a name of the profile within the name controls 3920, and a permission status of the profile for the current location within the status controls 3922. The user can select the expansion control 3912B to expand or contract the profile list entry controls 3912C-3912G. The expansion control 3912B can be omitted from some examples, as illustrated in FIG. 41, which shows the screen 3900 where the currently selected location is L1 rather than all locations, as illustrated in FIG. 39.

Returning to the process 3800, the app receives 3804 input selecting a control of the screen 3900. For instance, in some examples, the app receives the input selecting the control by executing the processing described above with reference to the operation 1504 of FIG. 15.

Continuing with the process 3800, the app determines 3806 which control of the screen 3900 is selected. For instance, in some examples, the app identifies the control and the type of selection by executing the processing described above with reference to the operation 1506 of FIG. 15.

Continuing with the process 3800, if the app determines 3808 that the location control group 3902 is selected, the app sets the location context for the screen 3900 by executing the processing described above with reference to the operation 1508 of FIG. 15.

Continuing with the process 3800, if the app determines that the expansion control 3906 is selected, the app toggles 3812 the state of the expansion control 3906 and controls the host mobile computing device to re-render the screen 3900.

Continuing with the process 3800, if the app determines 3810 that the alarm sensitivity control group (not shown in FIG. 39, but available via the expansion control 3906) is selected, the app executes the processing described above with reference to the operation 1510 of FIG. 15.

Continuing with the process 3800, if the app determines that the menu control group 3914 is selected, the app executes the processing described above with reference to the operation 1516 of FIG. 15.

Figure 44:
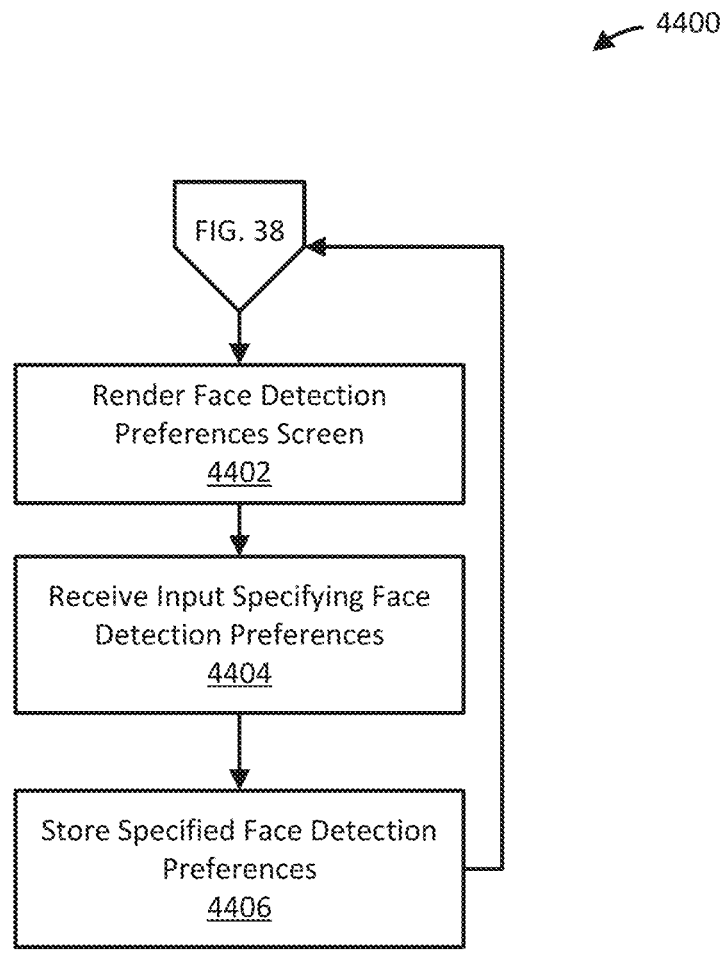
FIG. 44 is a flow diagram illustrating a process of administering an face detection preferences screen, according to some examples described herein.

Continuing with the process 3800, if the app determines that face detection configuration control 3908 is selected, the app executes a face detection configuration process. FIG. 44 illustrates an example of such a process, configuration process 4400. As shown in FIG. 44, the process 4400 starts with the app controlling the host mobile computing device to render 4402 a configuration screen via the touchscreen. This configuration screen may include, for example, controls configured to prompt for and receive selection of face detection preferences to be used by the security system with regard to facial recognition processes.

Continuing with the process 4400, the app receives 4404, via the controls, user input specifying the face detection preferences to be used by the security system and stores 4406 the specified face detection preferences. It should be noted that, in some examples, the operation 4406 may include communication of the face detection preferences to other parts (e.g., the surveillance service and/or location-based devices) of the security system via one or more messages.

Figure 42:
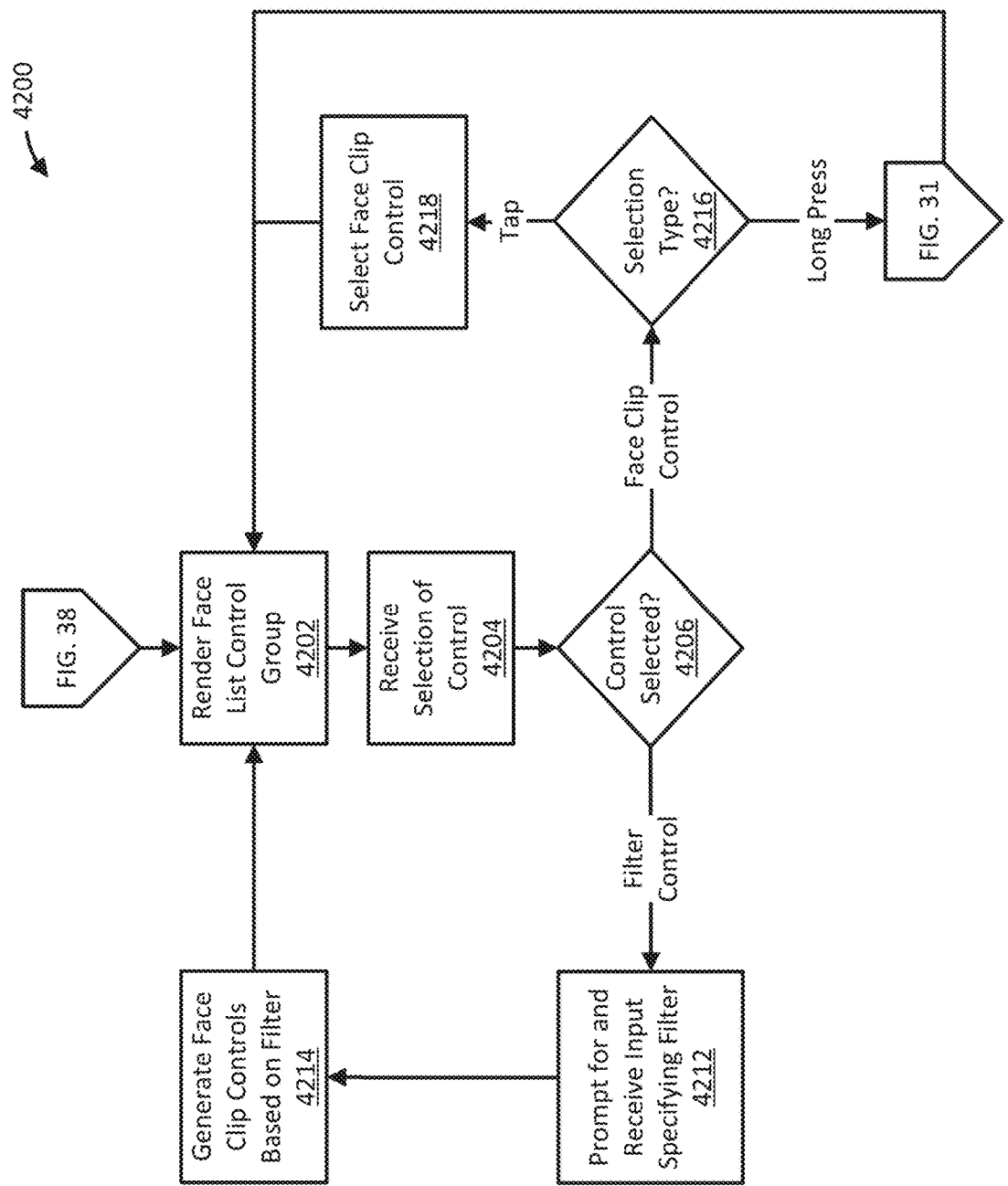
FIG. 42 is a flow diagram illustrating a process of administering a face list control group, according to some examples described herein.

Returning to the process 3800 of FIG. 38, if the app determines that a control of the unknown face list control group 3926 is selected, the app executes a face clip selection process. FIG. 42 illustrates an example of such a process, a face clip selection process 4200. As shown in FIG. 42, the process 4200 starts with the app controlling the host mobile computing device to render 4202 a faces control group via the touchscreen. FIG. 43 illustrates one example of a faces control group 4300 that can be rendered in some examples. As shown in FIG. 43, the faces control group 4300 includes a date filter control 4302 and face clip controls 4306A-4306K. In some examples, the faces control group 4300 further includes a camera filter control.

In some examples, individual face clip controls within the faces control group 4300 include a face clip (e.g., an image recognized by the security system as depicting a human face). In these examples, individual face clip controls can also include a number indicating a count of distinct face clips stored in the security system for the person. As shown in FIG. 43, the face clip control 4306A indicates that the security system has 13 face clips stored for the person depicted in the face clip control 4306A. Similarly, face clip controls 4306B-4306D indicate security system storage of 9, 8, and 4 face clips for the persons depicted in face clip controls 4306B-4306D, respectively. Where the security system stores only a single face clip for a person, no number may be included in the face clip control associated with the person, as illustrated by controls 4306E-4306K.

In some examples, the user can select any one of the controls 4306A-4306K to mark the control for subsequent processing. As shown in FIG. 43, controls 4306C and 4306H are marked. Marked controls can be highlighted (e.g., encircled) in some examples. Alternatively or additionally, in some examples, the user can select (e.g., via a long press operation) a particular face clip control to add to an existing profile or for which to create a new profile.

In some examples, the user can filter the face clip controls 4306A-4306K displayed by interacting with the filter controls described above. As shown in FIG. 43, the camera filter control is set to limit face clips to those acquired via a front door camera and the date filter control 4302 is set to limit face clips to those acquired between June 13th and June 23rd.

Returning to the process 4200, the app receives 4204 input selecting a control of the group 4300. For instance, in some examples, the app receives the input selecting the control by executing the processing described above with reference to the operation 1504 of FIG. 15.

Continuing with the process 4200, the app determines 4206 which control of the group 4300 is selected. For instance, in some examples, the app identifies the control and the type of selection by executing the processing described above with reference to the operation 1506 of FIG. 15.

Continuing with the process 4200, if the app determines 4206 that a face clip control (e.g., one of the face clip controls 4306A-4306K of FIG. 43) is selected, the app determines 4216 the type of selection. If the app determines that the type of the selection is a tap, the app visually highlights the selected control and marks 4218 the selected control for subsequent processing. If the app determines that the face clip control was long pressed, the app executes a profile selection process, such as the profile selection process 3100 described above with reference to FIG. 31.

Continuing with the process 4200, if the app determines that a filter control (e.g., the filter control 4302 of FIG. 43) of the group 4300 is selected, the app prompts for and receives 4212 input specifying values of attributes (e.g., originating camera/device, date range, etc.) for filtering the face clips prior to generating 4214 and displaying filtered face clip controls.

Figure 40:
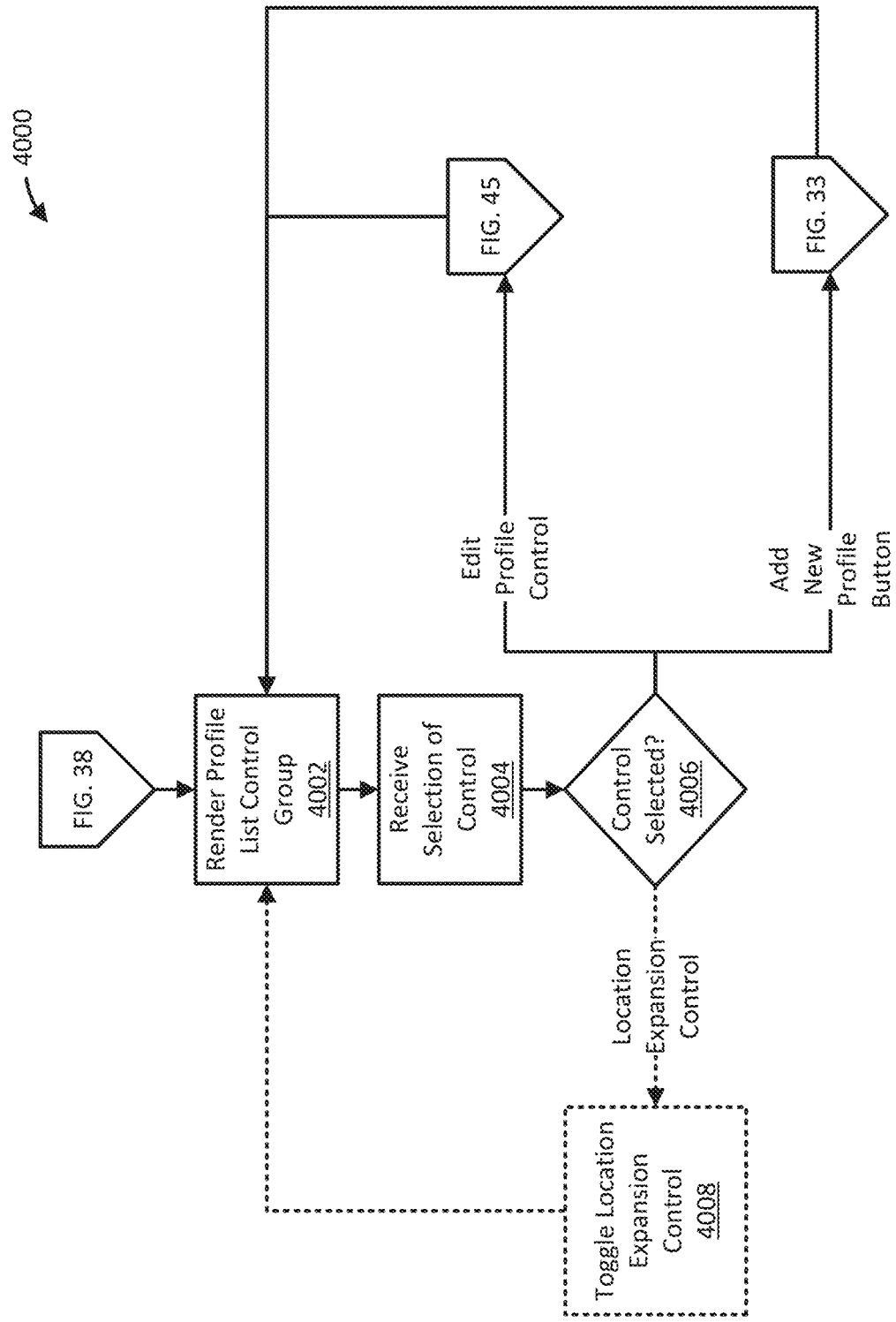
FIG. 40 is a flow diagram illustrating a process of administering a profile list control group, according to some examples described herein.

Returning to the process 3800 of FIG. 38, if the app determines that a control of the profile list control group 3912 is selected, the app executes a profile review process. FIG. 40 illustrates an example of such a process, profile review process 4000. As shown in FIG. 40, the process 4000 starts with the app controlling the host mobile computing device to render 4002 a profiles control group (e.g., the profile list control group 3912 described above with reference to FIG. 39) via the touchscreen.

Continuing with the process 4000, the app receives 4004 input selecting a control of the group 3912. For instance, in some examples, the app receives the input selecting the control by executing the processing described above with reference to the operation 1504 of FIG. 15.

Continuing with the process 4000, the app determines 4006 which control of the group 3912 is selected. For instance, in some examples, the app identifies the control and the type of selection by executing the processing described above with reference to the operation 1506 of FIG. 15.

Continuing with the process 4000, if the app determines that the add new profile button 3912A is selected, the app begins execution of a new profile workflow by executing a face clip selection process, such as the face clip selection process 3300 described above with reference to FIG. 33.

Continuing with the process 4000, if the app determines that the location expansion control 3912B is selected, the app toggles 4008 the location expansion control 3912B between expanded and compressed states. For instance, as shown in FIG. 39, the control 3912B is in an expanded state and the profile list entry controls 3912C-3912G, which are associated with all locations, are shown. If the control 3912B is in a compressed state, the app visualizes the location expansion control 3912B without the profile list entry controls 3912C-3912G underneath. It should be noted that if the location context of the group 3912 is a specific location, some examples of the app omit the location expansion control 3912B, thereby conserving valuable touchscreen display area. FIG. 41 illustrates one such example.

Figure 45:
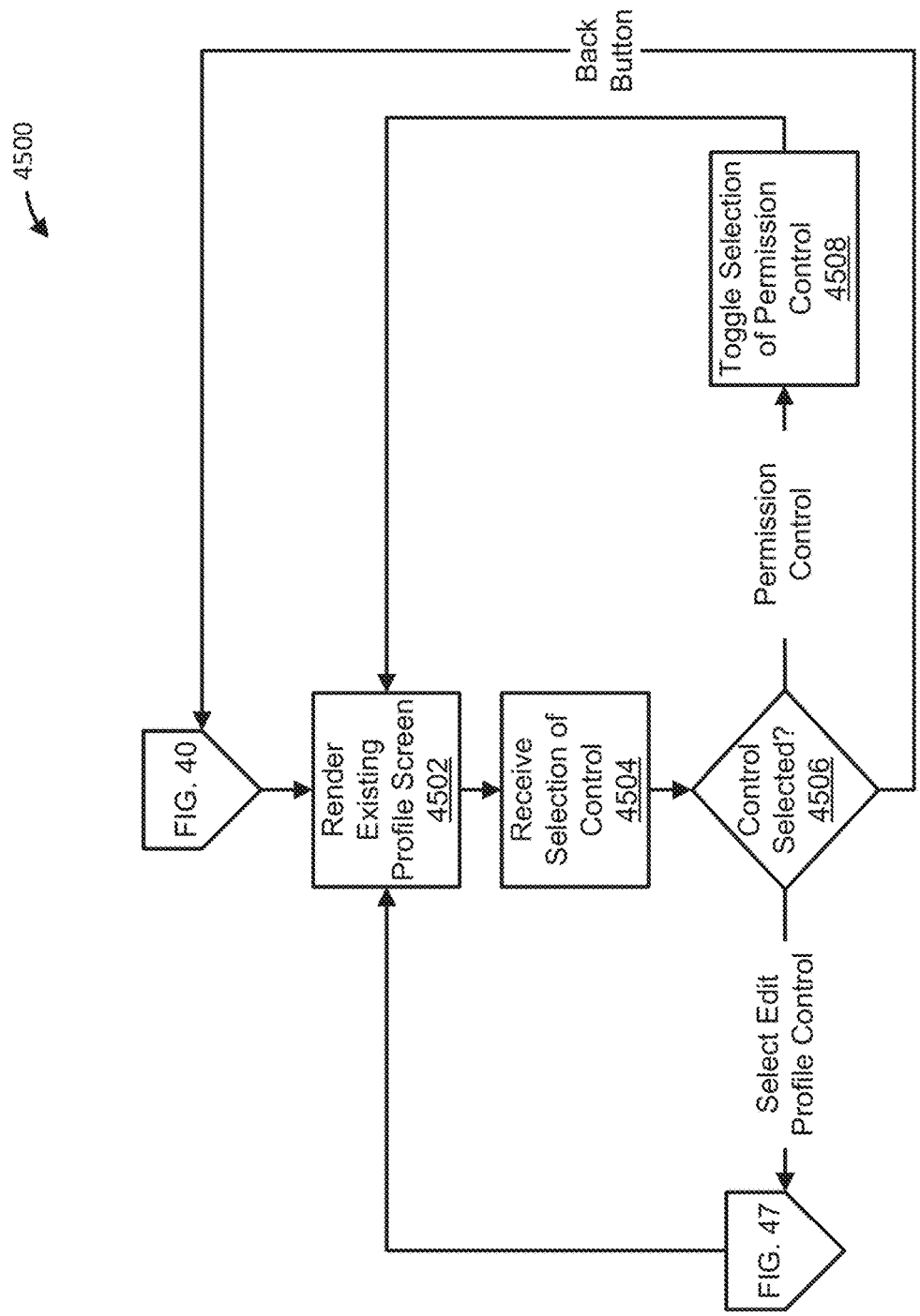
FIG. 45 is a flow diagram illustrating a process of administering an existing profile screen, according to some examples described herein.
Figure 46:
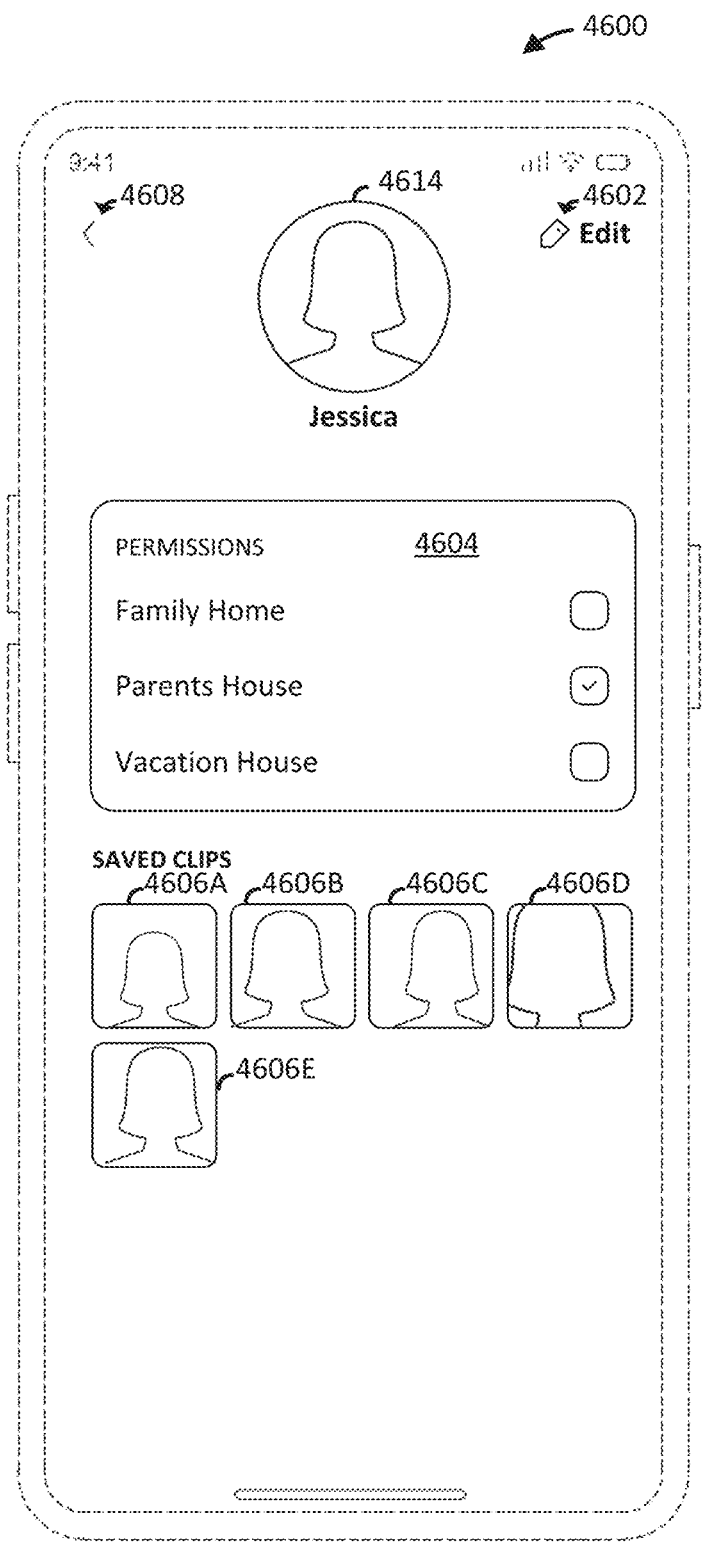
FIG. 46 is another front view of an existing profile screen, according to some examples described herein.

Continuing with the process 4000, if the app determines that one of the edit profile controls 3924 is selected, the app executes a profile review process for the profile associated with the selected control. FIG. 45 illustrates an example of such a process, profile review process 4500. As shown in FIG. 45, the process 4500 starts with the app controlling the host mobile computing device to render 4502 a profile review screen via the touchscreen. FIG. 46 illustrates one example of a profile review screen 4600 that can be rendered in some examples. As shown in FIG. 46, the profile review screen 4600 includes an edit control 4602, a permissions list control 4604, saved clip controls 4606A-4606E, a back control 4608, and a profile clip control 4614.

In some examples, the profile clip control 4614 includes a profile name and a face clip representative of the person associated with the profile being viewed. If no face clips have been selected for the profile, the app may include a generic image within the profile clip control 4614. The name can include a textual identifier of the profile (e.g., a person's name). The permissions list control 4604 indicates locations at which the person in the profile is welcome to visit without initiating an alarm. The saved clip controls 4606A-4606E include face clips that are currently associated with the profile.

In some examples, the user can navigate to a screen to edit the existing profile by selecting the edit control 4602. The user can navigate to the previous screen by selecting the back control 4608.

Returning to the process 4500, the app receives 4504 input selecting a control of the screen 4600. For instance, in some examples, the app receives the input selecting the control by executing the processing described above with reference to the operation 1504 of FIG. 15.

Continuing with the process 4500, the app determines 4506 which control of the screen 4600 is selected. For instance, in some examples, the app identifies the control and the type of selection by executing the processing described above with reference to the operation 1506 of FIG. 15.

Continuing with the process 4500, if the app determines that the back control 4608 is selected, the app returns to the previously executing process. If the app determines that a control of the permissions list control 4604 was selected, the app toggles 4508 marking of the selected control.

Figure 47:
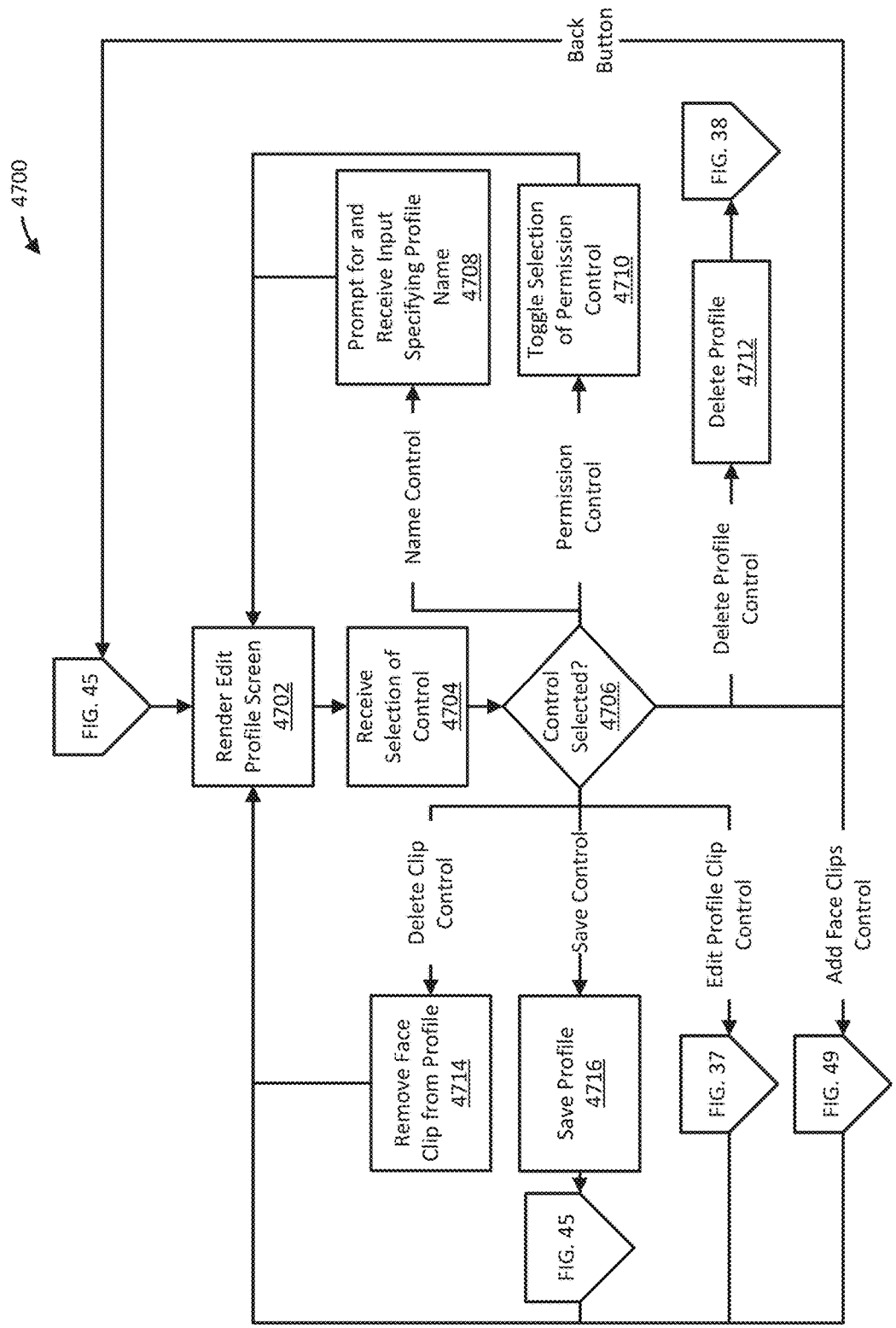
FIG. 47 is a flow diagram illustrating a process of administering an edit profile screen, according to some examples described herein.
Figure 48:
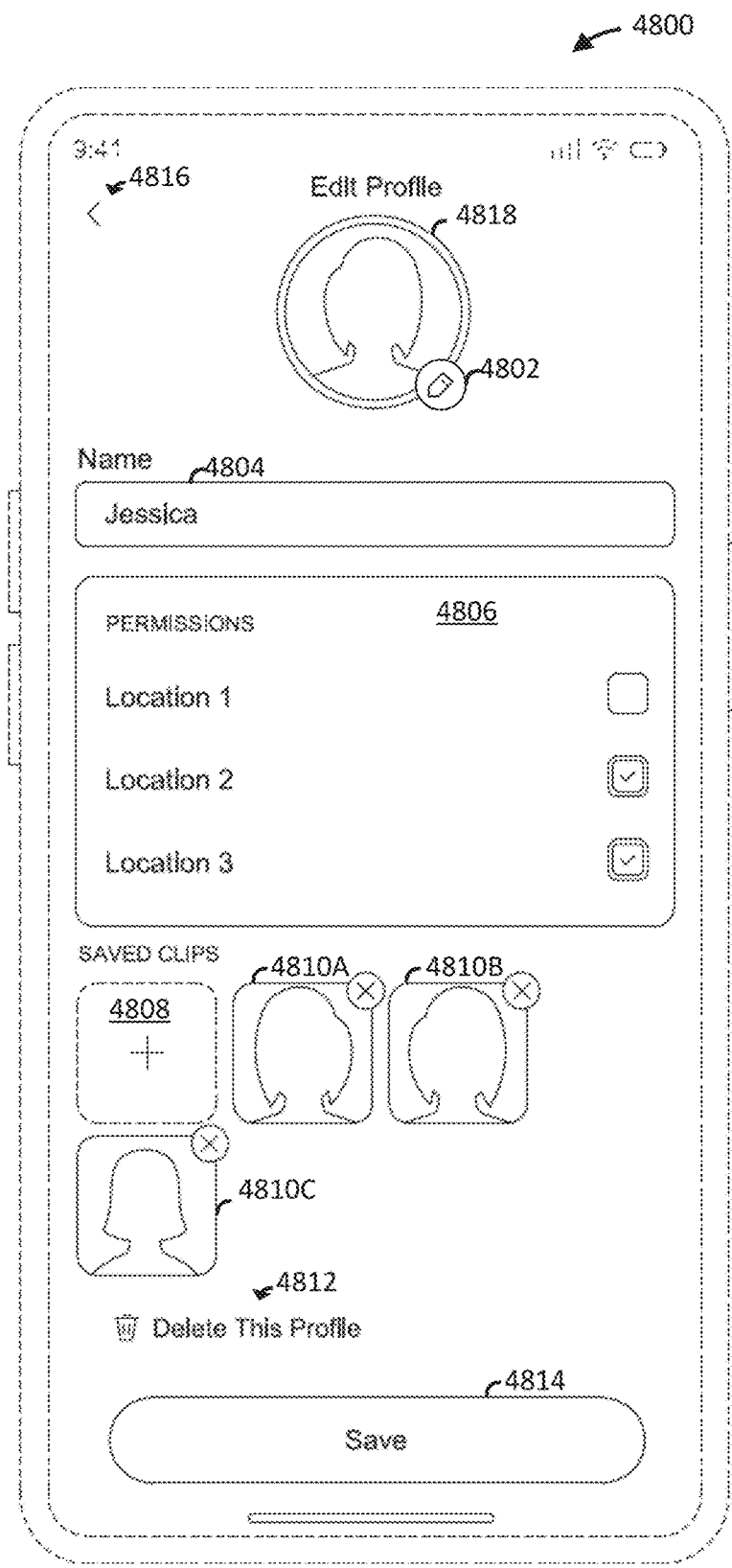
FIG. 48 is another front view of an edit profile screen, according to some examples described herein.

Continuing with the process 4500, if the app determines that the edit profile control 4602 is selected, the app executes a profile editing process. FIG. 47 illustrates an example of such a process, profile editing process 4700. As shown in FIG. 47, the process 4700 starts with the app controlling the host mobile computing device to render 4702 an edit profile screen via the touchscreen. FIG. 48 illustrates one example of an edit profile screen 4800 that can be rendered in some examples. As shown in FIG. 48, the edit profile screen 4800 includes an edit profile clip button 4802, a profile name control 4804, a permissions list control 4806, an add clip control 4808, delete clip controls 4810A-4810C, a delete profile control 4812, a save profile button 4814, a back control 4816, and profile clip control 4818.

In some examples, the profile clip control 4818 includes a face clip representative of the person associated with the profile being edited. If no face clips have been selected for the profile, the app may include a generic image within the profile clip control 4818. The name control 4804 can include a textual identifier of the profile (e.g., a person's name). The permissions list control 4806 indicates locations at which the person in the profile is welcome to visit without initiating an alarm. The delete clip controls 4810A-4810C include face clips that are currently associated with the profile (e.g., by being marked within the screen 4800 of FIG. 48).

In some examples, the user can effectuate a number of changes to the current profile of the save profile screen 4800 via the controls included therein. For instance, in certain examples, the user can change the face clip displayed in the profile clip control by selecting the edit profile clip button 4802. The user can select the name control 4804 to enter a name for the profile. The user can select a control within the permissions list control 4806 to mark a location associated with the control as being welcome to visitation by the person associated with the profile without sounding an alarm. The user can select one of the delete clip controls 4810A-4810C to disassociate the face clip depicted within the control from the profile. The user can navigate to a screen to associate additional face clips with the profile by selecting the add clip control 4808. The user can delete the profile by selecting the delete profile control 4812. The user can save changes made to the profile by selecting the save profile button 4814. The user can navigate to the previous screen by selecting the back control 4816.

Returning to the process 4700, the app receives 4704 input selecting a control of the screen 4800. For instance, in some examples, the app receives the input selecting the control by executing the processing described above with reference to the operation 1504 of FIG. 15.

Continuing with the process 4700, the app determines 4706 which control of the screen 4800 is selected. For instance, in some examples, the app identifies the control and the type of selection by executing the processing described above with reference to the operation 1506 of FIG. 15.

Continuing with the process 4700, if the app determines that the back control 4816 is selected, the app returns to the previously executing process. If the app determines that the name control 4804 is selected, the app prompts for and receives 4708 input specifying a name for the profile. If the app determines that a control of the permissions list control 4806 was selected, the app toggles 4710 marking of the selected control. If the app determines that the delete profile control 4812 is selected, the app removes 4712 the profile from the security system. If the app determines that a delete clip control (e.g., one of delete clip controls 4810A-4810C) is selected, the app disassociates 4714 the selected face clip depicted within the selected control from the profile. If the app determines that the save profile button 4814 is selected, the app saves 4716 the profile. It should be noted that the operations 4712 through 4716 may involve altering profile information locally and remotely, so that the security system as a whole can utilize the information.

Continuing with the process 4700, if the app determines that the edit profile clip button 4802 is selected, the app executes a configuration process to update the face clip associated with the profile, such as the process 3700 described above with reference to FIG. 37.

Figure 49:
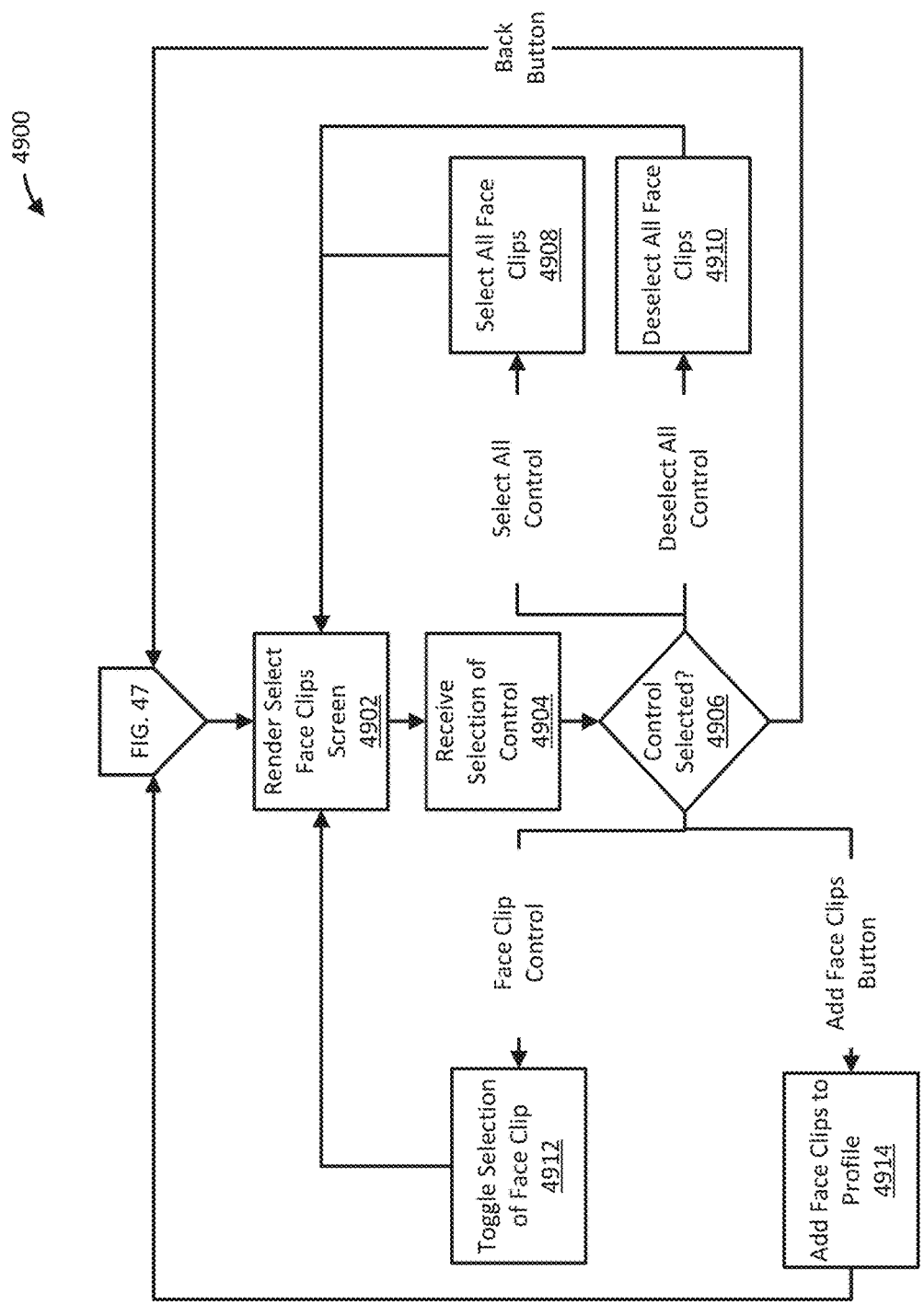
FIG. 49 is a flow diagram illustrating a process of administering a face clip selection screen, according to some examples described herein.
Figure 50:
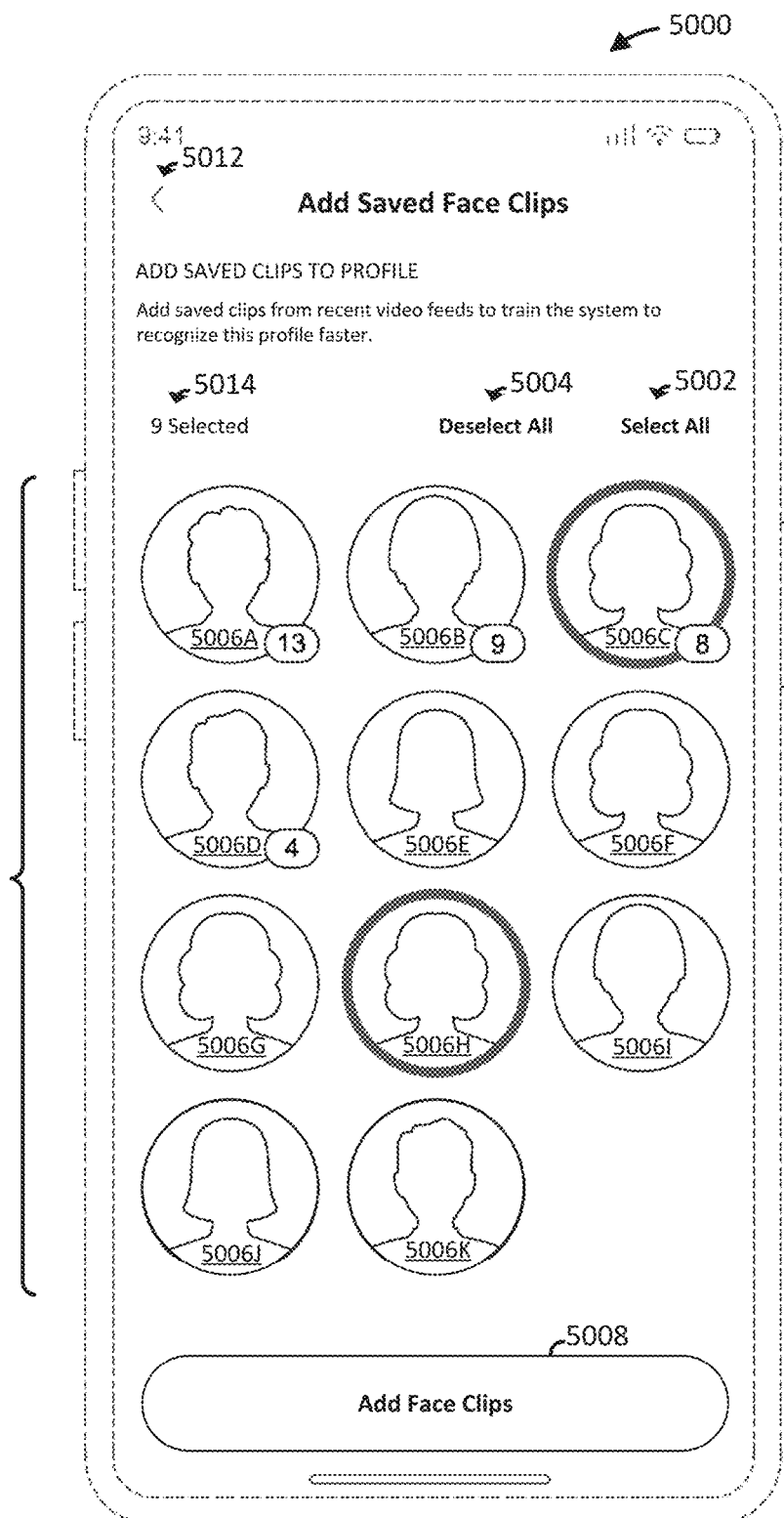
FIG. 50 is another front view of a face clip selection screen, according to some examples described herein.

Continuing with the process 4700, if the app determines that the add face clips control 4808 is selected, the app executes a face clip selection process. FIG. 49 illustrates an example of such a process, a face clip selection process 4900. As shown in FIG. 49, the process 4900 starts with the app controlling the host mobile computing device to render 4902 a face clips selection screen via the touchscreen. FIG. 50 illustrates one example of a face clips selection screen 5000 that can be rendered in some examples. As shown in FIG. 50, the screen 5000 includes a select all control 5002, a deselect all control 5004, a clip control group 5006, an add button 5008, a back button 5012, and a total selected control 5014. The clip control group 5006 includes face clip controls 5006A-5006K.

In some examples, individual face clip controls within the clip control group 5006 include a face clip of a person. In these examples, individual face clip controls can also include a number indicating a count of distinct face clips stored in the security system for the person. As shown in FIG. 50, the face clip control 5006A indicates that the security system has 13 face clips stored for the person depicted in the face clip control 5006A. Similarly, face clip controls 5006B-5006D indicate security system storage of 9, 8, and 4 face clips for the persons depicted in face clip controls 5006B-5006D, respectively. Where the security system stores only a single face clip for a person, no number may be included in the face clip control associated with the person, as illustrated by controls 5006E-5006K. Further, in some examples, the total selected control 5014 indicates a total number of face clips currently marked for subsequent processing.

In some examples, the user can select any one of the controls 5006A-5006K to mark the control for subsequent processing. As shown in FIG. 50, controls 5006C and 5006H are marked. Marked controls can be highlighted (e.g., encircled) in some examples.

In some examples, the user can select the deselect all control 5004 to unmark all face clip controls within the control group 5006, and the user can select the select all control 5002 to mark all face clip controls within the control group 5006. In certain examples, the user can select the add button 5008 to associate marked face clips with the profile being edited. The user can select the back button 5012 to return to the previous screen.

Returning to the process 4900, the app receives 4904 input selecting a control of the screen 5000. For instance, in some examples, the app receives the input selecting the control by executing the processing described above with reference to the operation 1504 of FIG. 15.

Continuing with the process 4900, the app determines 4906 which control of the screen 5000 is selected. For instance, in some examples, the app identifies the control and the type of selection by executing the processing described above with reference to the operation 1506 of FIG. 15.

Continuing with the process 4900, if the app determines that the back button 5012 is selected, the app returns to the previously executing process. If the app determines that the select all control 5002 is selected, the app marks 4908 all face clip controls 5006A-5006K. If the app determines that the deselect all control 5004 is selected, the app unmarks 4910 all marked face clip controls 5006A-5006K. If the app determines that one of the face clip controls 5006A-5006K is selected, the app toggles 4912 marking of the selected face clip control for subsequent processing. If the app determines that the add button 5008 is selected, the app associates 4914 the face clips included in the marked face clip controls with the profile.

Figure 51:
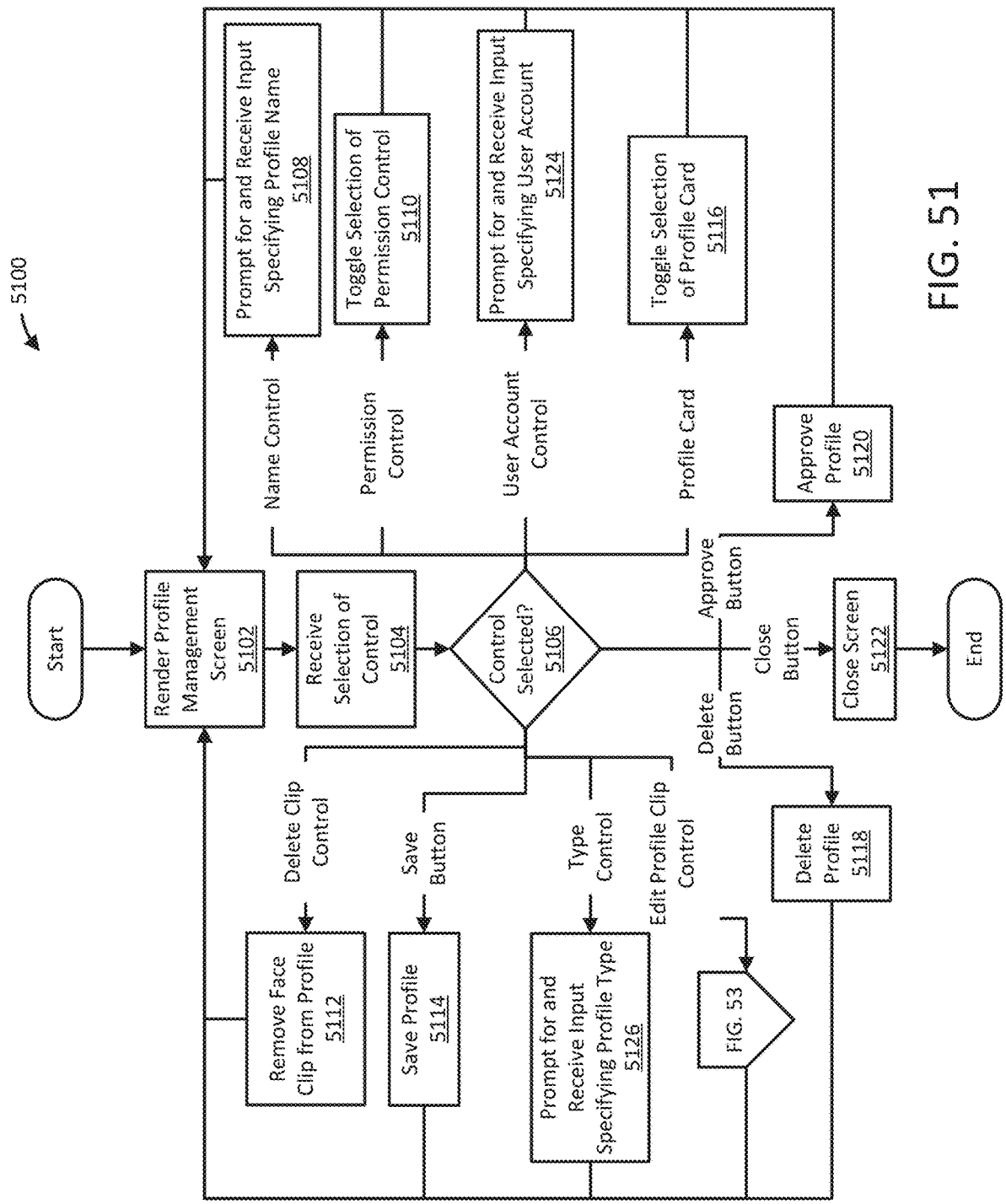
FIG. 51 is a flow diagram illustrating a process of administering a profile management screen, according to some examples described herein.
Figure 52:
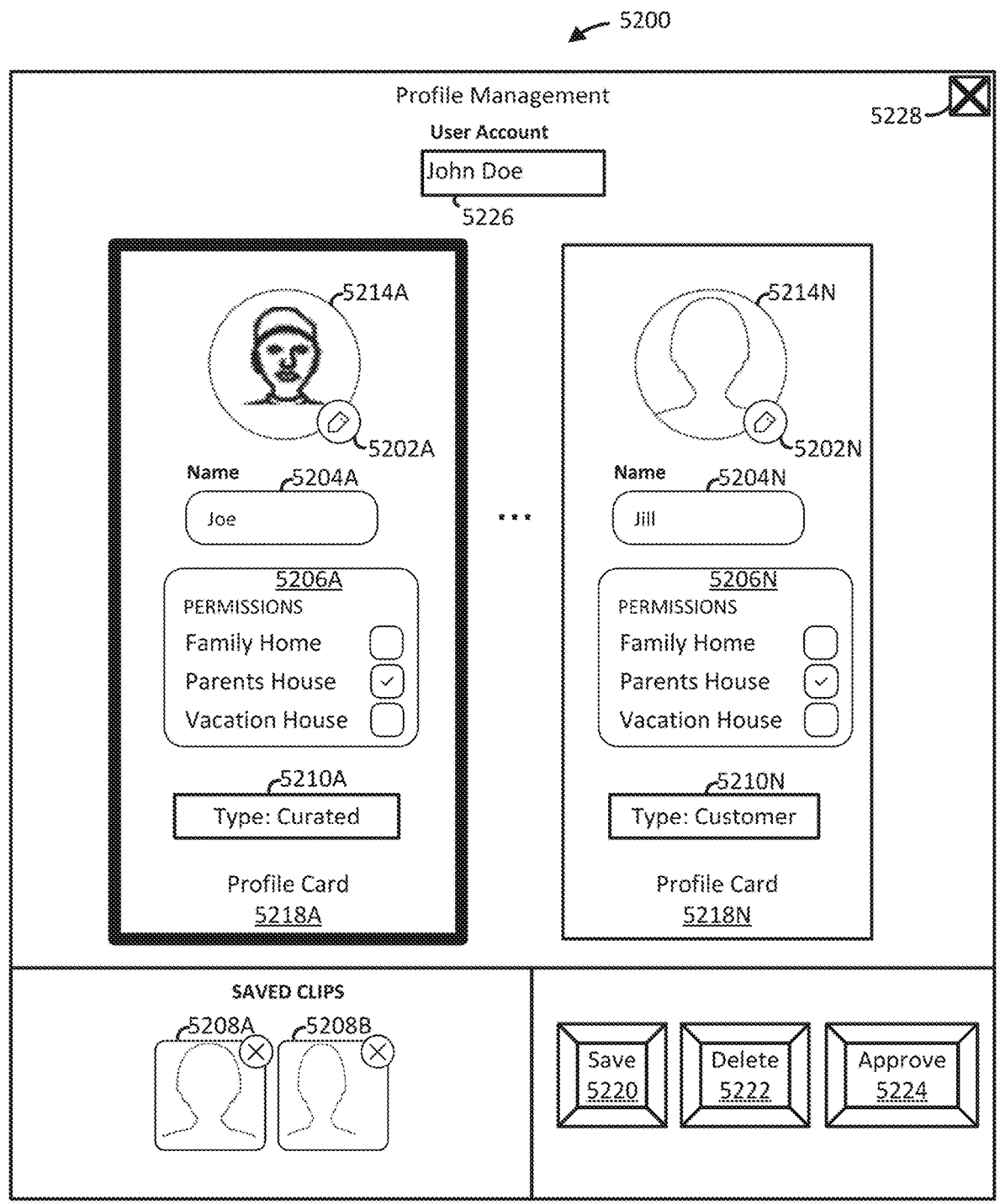
FIG. 52 is another front view of a profile management screen, according to some examples described herein.

At least some examples disclosed herein implement processes that enable a security system (e.g., the system 100 of FIG. 1) to manage profiles that are created by a variety of users. Turning now to FIG. 51, a process 5100 implemented by some such examples to administer a profile management screen is illustrated. As shown in FIG. 51, the process 5100 starts with a program (e.g., one of the monitor interfaces 130 or customer interfaces 132 of FIG. 1) controlling a computing device (e.g., one of the computing devices 518 of FIG. 5A or a customer device 122 of FIG. 1) to render 5102 a profile management screen. FIG. 52 illustrates one example of a profile management screen 5200 that can be rendered in some examples. As shown in FIG. 52, the screen 5200 includes profile cards 5218A through 5218N (collectively referred to as profile cards 5218), delete clip controls 5208A and 5208B (collectively referred to as delete clip controls 5208), a user account control 5226, a save button 5220, a delete button 5222, an approve button 5224, a close button 5228. Individual profile cards 5218 include an edit profile clip button 5202 (shown as buttons 5202A-5202N), a profile name control 5204 (shown as buttons 5204A-5204N), a permissions list control 5206 (shown as controls 5206A-5206N), a profile clip control 5214 (shown as controls 5214A-5214N), and a profile type control 5210 (shown as controls 5210A-5210N). Through the screen 5200 and the controls included therein, the program enables the user to manage profiles of subjects trusted to visit locations associated with a user account.

In some examples, the user account control 5226 is selectable by the user to initiate selection of a user account. Upon selection of a particular user account, the program populates the screen 5200 with profile cards 5218 associated with the selected user account. The following description of features of the profile card 5218A should be understood to apply to other profile cards included within the screen 5200.

In some examples, the profile clip control 5214A includes a face clip representative of the person associated with the profile being created. The face clip initially included in the profile clip control may be selected by the security system based, for example, on completeness and clarity metrics of the face clip calculated by the security system, as described herein. In some examples, the completeness metric is based on a percentage of landmarks positively identified in the face clip. If no face clips have been selected for the profile, the app may include a generic image within the profile clip control 5214A. The name control 5204A can include a textual identifier of the profile (e.g., a person's name). The textual identifier can include any alphanumeric character. The permissions list control 5206A indicates locations at which the person in the profile is welcome to visit without initiating an alarm. The profile type control 5210A is selectable by the user to initiate selection of a type (curated, recommended, or customer) for the profile.

In some examples, the user can effectuate a number of changes to a profile via the profile card 5218A. For instance, in certain examples, the user can change the face clip displayed in the profile clip control by selecting the edit profile clip button 5202A. The user can select the name control 5204A to enter a name for the profile. The user can select a control within the permissions list control 5206A to mark a location associated with the control as being welcome to visitation by the person associated with the profile without sounding an alarm.

In some examples, individual profile cards are selectable by the user to mark the profile associated with the card for subsequent processing initiated via the controls 5208-5224. As shown in FIG. 52, the profile card 5218A is marked. Marked profile cards can be highlighted (e.g., bordered by a thick boundary) in some examples. In some examples, the delete clip controls 5208A and 5208B include face clips that are associated with the profile associated with the currently selected profile card. The delete clip controls 5208A and 5208B are selectable by the user to disassociate the face clip depicted within the control from the profile. The save button 5220 is selectable by the user to initiate recordation and application of any changes made to the profile via the screen 5200. The delete button 5222 is selectable by the user to delete the profile. The approve button 5224 is selectable by the user to promote the profile from a recommended profile type to a customer profile type.

Returning to the process 5100, the program receives 5104 input selecting a control of the screen 5200. For instance, in some examples, the program receives the input selecting the control by executing the processing described above with reference to the operation 804 of FIG. 8.

Continuing with the process 5100, the program determines 5106 which control of the screen 5200 is selected. For instance, in some examples, the program identifies the control and the type of selection by executing the processing described above with reference to the operation 806 of FIG. 8.

Continuing with the process 5100, if the program determines that the close button 5228 is selected, the program closes 5122 the screen 5200 and returns control to the previously executing process. If the program determines that user account control 5226 is selected, the program prompts for and receives 5124 input specifying an identifier (e.g., a textual name) of a user account. In response to receiving input selecting a particular identifier via the user account control 5226, the program looks up (e.g., via one or more API calls to the surveillance service) profiles associated with the selected user account and renders profile cards 5218 representative of the retrieved profiles. If the program determines that a name control 5204 is selected, the program prompts for and receives 5108 input specifying a name for the profile associated with the profile card 5218 including the name control 5204. If the program determines that a profile type control 5210 is selected, the program prompts for and receives 5126 input specifying a type for the profile associated with the profile card 5218 including the profile type control 5210. If the program determines that a control of a permissions list control 5206 was selected, the program toggles 5110 marking of the selected control. If the program determines that a profile card 5218 was selected, the program toggles 5116 marking of the selected card. If the program determines that a delete clip control (e.g., one of delete clip controls 5208A and 5208B) is selected, the program disassociates 5112 the selected face clip depicted within the selected control from the profile associated with the currently selected profile card 5218. If the program determines that the save profile button 5220 is selected, the program saves 5114 the profile associated with the currently selected profile card 5218. In some examples, the program prompts the user for, and receives input specifying, notes descriptive of the profile as part of the operation 5114. This prompt may include previously recorded notes. If the program determines that the delete profile button 5222 is selected, the program deletes 5118 the profile associated with the currently selected profile card 5218. If the program determines that the approve profile button 5224 is selected, the program promotes 5120 the profile associated with the currently selected profile card 5218 to a customer profile type. It should be noted that the operations 5114, 5118, and 5120 may involve adjusting profile information locally and/or remotely, so that the security system as a whole can utilize the information.

Figure 53:
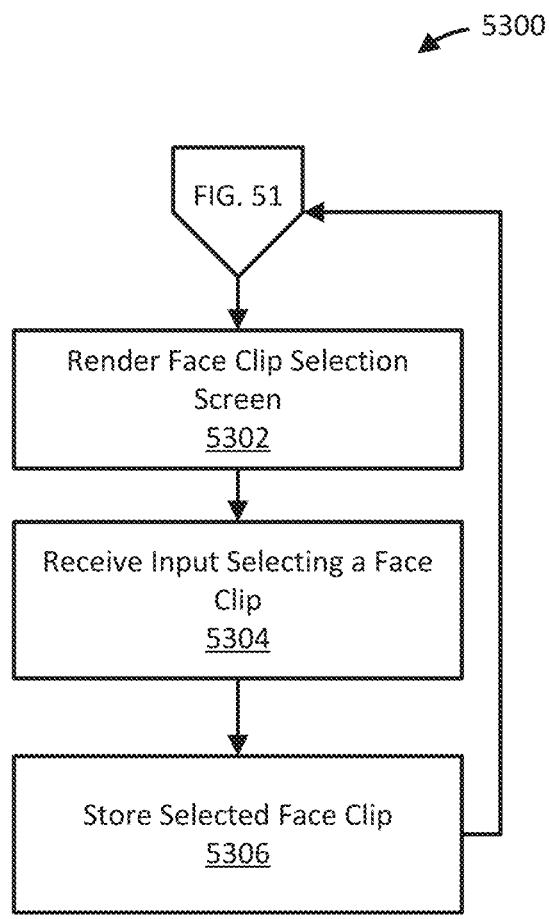
FIG. 53 is a flow diagram illustrating a process of administering a profile face clip selection screen, according to some examples described herein.

Continuing with the process 5100, if the program determines that an edit profile clip button 5202 is selected, the program executes a configuration process to update the face clip associated with the profile associated with the profile card 5218 including the edit profile clip button 5202. FIG. 53 illustrates an example of such a process, configuration process 5300. As shown in FIG. 53, the process 5300 starts with the program controlling 5302 the host mobile computing device to render a face clip edit screen. This face clip edit screen may include, for example, controls configured to prompt for and receive selection of a face clip to be used for the profile.

Continuing with the process 5300, the program receives 5304, via the controls, user input specifying the face clip to be used to represent the profile and stores 5306 an association between the profile and the face clip. It should be noted that, in some examples, the operation 5306 may include communication of the association between the profile and the face clip to other parts (e.g., the surveillance service) of the security system via one or more messages.

Figure 54:
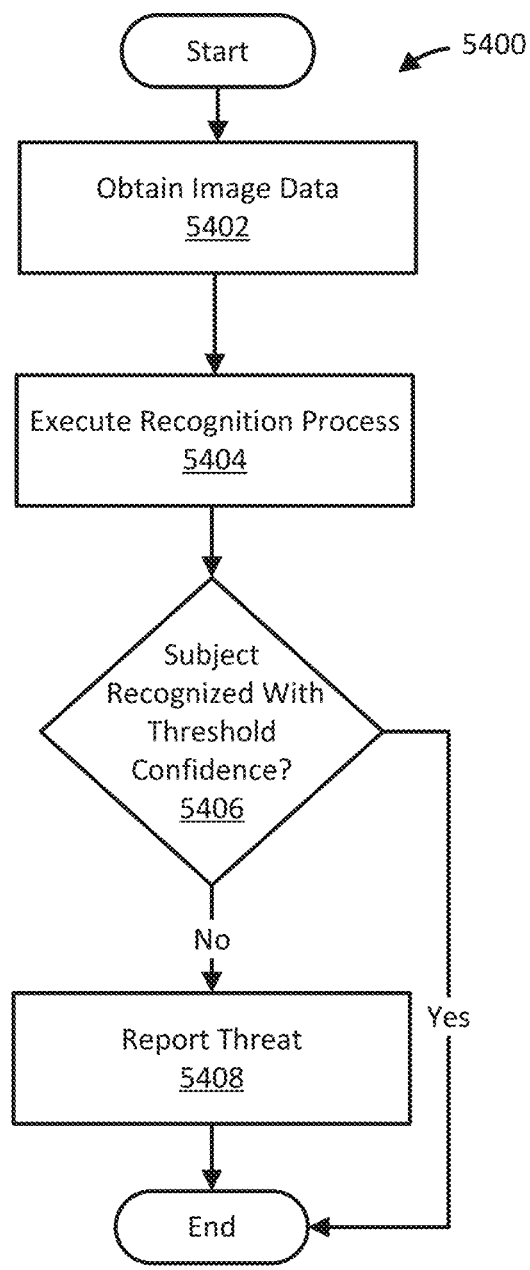
FIG. 54 is a flow diagram illustrating a process of filtering potential threats using profiles, according to some examples described herein.

Turning now to FIG. 54, a threat detection process 5400 that utilizes profiles is illustrated. The process 5400 can be executed, in some examples, by a security system (e.g., the security system 100 of FIG. 1). More specifically, in some examples, at least a portion of the process 5400 is executed by the location-based devices under the control of device control system (DCS) code (e.g., either the code 208, 308, or 408) implemented by at least one processor (e.g., either of the processors 200, 300, or 400 of FIGS. 2-4C). The DCS code can include, for example, a camera agent (e.g., the camera agent 138 of FIG. 1). Alternatively or additionally, a portion of the process 5400 can be executed by a base station (e.g., the base station 114 of FIG. 1) under control of a surveillance client (e.g., the surveillance client 136 of FIG. 1). Alternatively or additionally, at least a portion of the process 5400 can be executed by a data center environment (e.g., the data center environment 124 of FIG. 1) under control of a surveillance service (e.g., the surveillance service 128 of FIG. 1) or under control of transport services (e.g., the transport services 126 of FIG. 1).

As shown in FIG. 54, the process 5400 starts with a device obtaining 5402 image data that depicts a potential threat (e.g., a person) at a monitored location. For instance, in some examples, an image capture device (e.g., the image capture device 110 of FIG. 1) captures image data via a camera incorporated therein and stores the image data locally for subsequent processing.

Continuing with the process 5400, a device executes a facial recognition process. For instance, in some examples, the image capture devices executes an AI process trained to recognize subjects of profiles. In certain examples, the AI process returns a metric that indicates a level of confidence that a subject depicted in the image data is the subject of a profile associated with the monitored location.

Continuing with the process 5400, a device determines 5406 whether the metric transgresses a threshold value (e.g., 75%, 85%, 95%, etc.). For instance, in some examples, the image capture devices determines whether the metric is greater than a threshold value of 85%. If the device determines that the metric fails to transgress the threshold value, the device proceeds to operation 5408. If the device determines that the metric transgresses the threshold value, the process 5400 can end because the image depicts a subject of a profile.

Continuing with the process 5400, a device determines that the potential threat is an actual threat and communicates 5408 this reportable event to one or more other devices within the security system. For instance, in some examples, the image capture device communicates the actual threat to a base station (e.g., the base station 114 of FIG. 1) and the process 5400 can end.

It should be noted that devices other than an image capture device can execute the operations of the process 5400 described above, depending on the implementation of the security system. For instance, in some examples, the operation 5402 can be executed by the base station or a data center environment (e.g., the data center environment 124 of FIG. 1). In these examples, either the base station or the data center environment can receive image data originally acquired by the image capture device. In some examples, the operations 5404, 5406, and 5408 can also be executed by the base station or a data center environment. Each of these configurations can provide advantages, depending on the goals and constraints of the security system. For instance, a highly distributed approach in which the image capture devices execute most or all of the process 5400 benefits from greater scalability and faster responses to potential and actual threats. However, a highly distributed approach also requires image capture devices with more computing power and greater power consumption than centralized approaches in which the base station and/or data center environment execute most or all of the process 5400.

Figure 55:
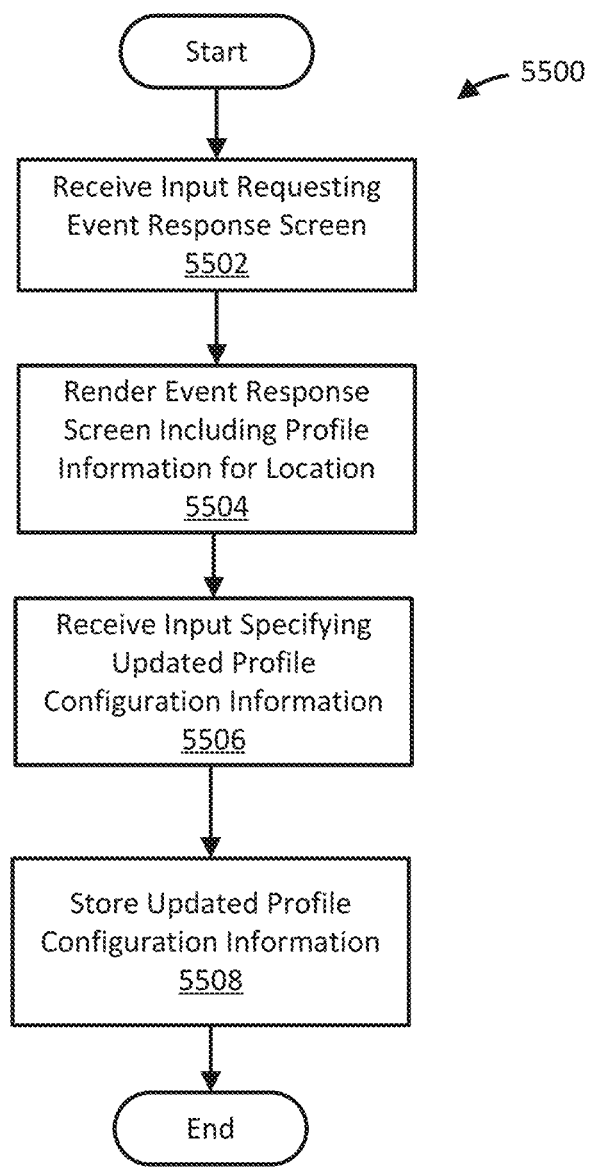
FIG. 55 is a flow diagram illustrating a process of configuring profiles, according to some examples described herein.

Turning now to FIG. 55, a profile configuration process 5500 is illustrated. The process 5500 can be executed, in some examples, by a security system (e.g., the security system 100 of FIG. 1). More specifically, at least a portion of the process 5500 is executed by a monitoring center environment (e.g., the monitoring center environment 120 of FIG. 1) under control of a monitor interface (e.g., the monitor interface 130 of FIG. 1). At least a portion of the process 5500 can be executed by a data center environment (e.g., the data center environment 124 of FIG. 1) under control of a surveillance service (e.g., the surveillance service 128 of FIG. 1) or under control of transport services (e.g., the transport services 126 of FIG. 1).

As shown in FIG. 55, the process 5500 starts with a device receiving 5502 input requesting access to an event response screen. For instance, in some examples, a computing device located within the monitoring center environment receives input (e.g., via a mouse and/or keyboard connected to the computing device) from a monitoring professional requesting access to the event response screen 1300 of FIGS. 13A and 13B, so as to initiate a response to a reportable event received from a monitored location.

Continuing with the process 5500, the device renders 5504 the event response screen. For instance, in some examples, the device executes the process 1200 of FIG. 12 in response to the input received in operation 5502. As part of the operation 5504, the devices renders and orients the controls included in the event response screen 1300 to the event received from the monitored location.

Continuing with the process 5500, the device receives 5506 input specifying updated profile configuration information. For instance, in some examples, the device receives a selection of the tag button 1322, and, in response thereto, executes the operation 1220 of FIG. 12. It should be noted that the input received in the operation 5506 may update other portions of the configuration and/or create new profile configuration information (e.g., via selection of the new button 1320), in some examples.

Continuing with the process 5500, the device stores 5508 the updated profile configuration information. For instance, in some examples, the device receives a selection of the save button 1324 and, in response thereto, executes the operation 1222 of FIG. 12. Subsequent to the operation 5508 the process 5500 can end.

Figure 56:
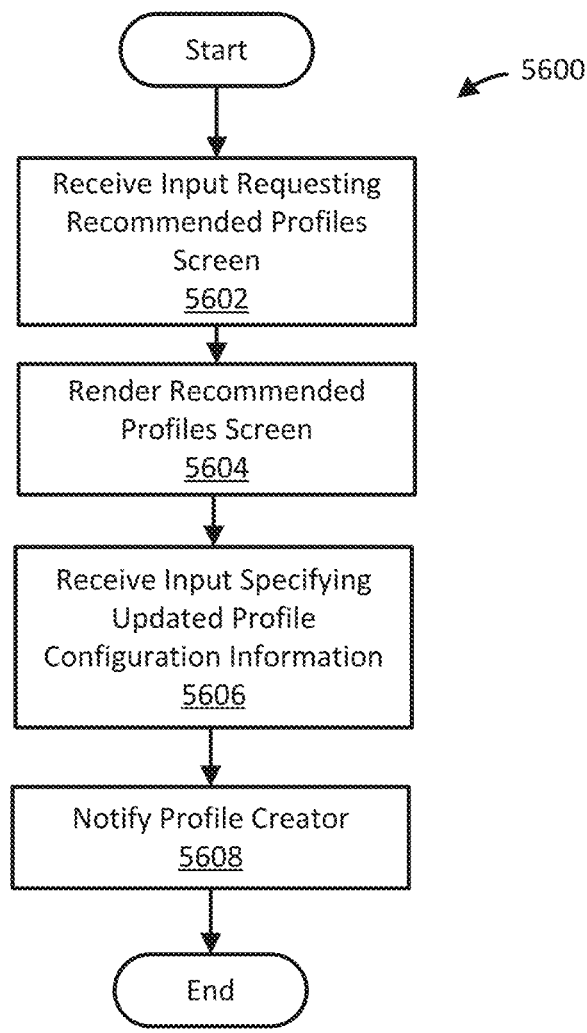
FIG. 56 is a flow diagram illustrating another process of configuring profiles, according to some examples described herein.

Turning now to FIG. 56, a profile configuration process 5600 is illustrated. The process 5600 can be executed, in some examples, by a security system (e.g., the security system 100 of FIG. 1). More specifically, at least a portion of the process 5600 is executed by a customer device (e.g., the customer device 122 of FIG. 1) under control of a customer interface (e.g., customer interface 132 of FIG. 1). At least a portion of the process 5600 can be executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 5500 can be executed by a monitoring center environment (e.g., the monitoring center environment 120 of FIG. 1) under control of a monitor interface (e.g., the monitor interface 130 of FIG. 1).

As shown in FIG. 56, the process 5600 starts with a device receiving 5602 input requesting access to a recommended profiles screen. For instance, in some examples, the customer device receives input (e.g., via a touchscreen) from a customer requesting access to the recommended profiles screen 1600 of FIG. 16, so as to initiate review of recommended profiles created by monitoring personnel.

Continuing with the process 5600, the device renders 5604 the recommended profiles screen. For instance, in some examples, the device executes the process 1500 of FIG. 15 in response to the input received in operation 5602. As part of the operation 5604, the devices renders the recommended profiles screen 1600.

Continuing with the process 5600, the device receives 5606 input specifying updated profile configuration information. For instance, in some examples, the device receives one or more selections of one or more approve buttons 1622, and, in response thereto, executes the operation 1514 of FIG. 15. It should be noted that the input received in the operation 5606 may update other portions of the configuration, in some examples.

Continuing with the process 5600, a device communicates 5608 a notification to the creator of the recommended profile detailing the change to the profile configuration information. For instance, in some examples, a computing device within the data center transmits a message to a monitor interface indicating whether the recommended profile was demoted to a curated profile or promoted to a customer profile. In at least one example, this message takes the form of updated profile configuration information sent to a event response screen, such as the event response screen 1300 of FIGS. 13A and 13B. Subsequent to the operation 5608 the process 5600 can end.

Figure 57:
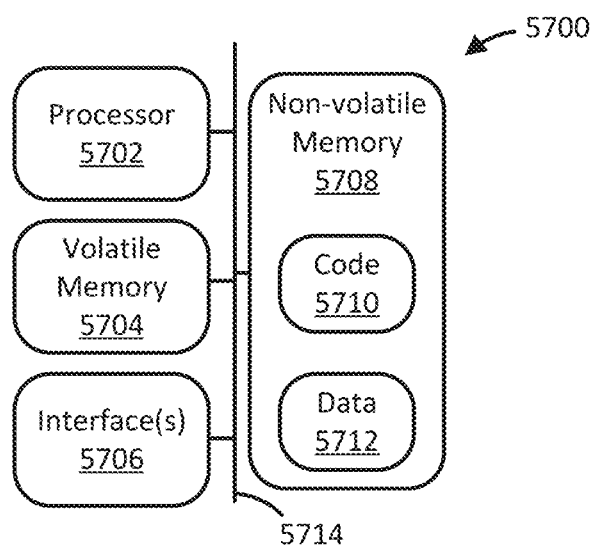
FIG. 57 is a schematic diagram of a computing device, according to some examples described herein.

Turning now to FIG. 57, a computing device 5700 is illustrated schematically. As shown in FIG. 57, the computing device includes at least one processor 5702, volatile memory 5704, one or more interfaces 5706, non-volatile memory 5708, and an interconnection mechanism 5714. The non-volatile memory 5708 includes code 5710 and at least one data store 5712.

In some examples, the non-volatile (non-transitory) memory 5708 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 5710 stored in the non-volatile memory can include an operating system and one or more applications or programs that are configured to execute under the operating system. Alternatively or additionally, the code 5710 can include specialized firmware and embedded software that is executable without dependence upon a commercially available operating system. Regardless, execution of the code 5710 can result in manipulated data that may be stored in the data store 5712 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 57, the processor 5702 can be one or more programmable processors to execute one or more executable instructions, such as a computer program specified by the code 5710, to control the operations of the computing device 5700. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 5704) and executed by the circuitry. In some examples, the processor 5702 is a digital processor, but the processor 5702 can be analog, digital, or mixed. As such, the processor 5702 can execute the function, operation, or sequence of operations using digital values and/or using analog signals. In some examples, the processor 5702 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 5702 that are multicore can provide functionality for parallel, simultaneous execution of instructions or for parallel, simultaneous execution of one instruction on more than one piece of data.

Continuing with the example of FIG. 57, prior to execution of the code 5710 the processor 5702 can copy the code 5710 from the non-volatile memory 5708 to the volatile memory 5704. In some examples, the volatile memory 5704 includes one or more static or dynamic random access memory (RAM) chips and/or cache memory (e.g., memory disposed on a silicon die of the processor 5702). Volatile memory 5704 can offer a faster response time than a main memory, such as the non-volatile memory 5708.

Through execution of the code 5710, the processor 5702 can control operation of the interfaces 5706. The interfaces 5706 can include network interfaces. These network interfaces can include one or more physical interfaces (e.g., a radio, an ethernet port, a USB port, etc.) and a software stack including drivers and/or other code 5710 that is configured to communicate with the one or more physical interfaces to support one or more LAN, PAN, and/or WAN standard communication protocols. The communication protocols can include, for example, TCP and UDP among others. As such, the network interfaces enable the computing device 5700 to access and communicate with other computing devices via a computer network.

The interfaces 5706 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 5710 that is configured to communicate with the user input and/or output devices. As such, the user interfaces enable the computing device 5700 to interact with users to receive input and/or render output. This rendered output can include, for instance, one or more GUIs including one or more controls configured to display output and/or receive input. The input can specify values to be stored in the data store 5712. The output can indicate values stored in the data store 5712.

Continuing with the example of FIG. 57, the various features of the computing device 5700 described above can communicate with one another via the interconnection mechanism 5714. In some examples, the interconnection mechanism 5714 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising receiving, from a computing device, input specifying a profile of a subject authorized to access a location; receiving, from an image capture device of a system, an image acquired at the location, the image depicting the subject; and refraining from initiating an alarm signal in response to detection of the subject by the system based on the image and the profile.

Example 2 includes the subject matter of Example 1, wherein the image acquired at the location is a first image; receiving the input comprises receiving a second image of a face of the subject; and the method further includes analyzing the second image using a facial recognition process trained using one or more other images of the face of the subject.

Example 3 includes the subject matter of Example 2, further comprising obtaining the one or more other images of the face of the subject from a camera roll maintained on a mobile computing device.

Example 4 includes the subject matter of either Example 2 or Example 3, wherein analyzing the second image includes executing the facial recognition process on the image capture device.

Example 5 includes the subject matter of any of Examples 2 through 4, wherein analyzing the second image includes executing the facial recognition process on a remote server.

Example 6 includes the subject matter of any of Examples 2 through 5, wherein analyzing the second image includes executing the facial recognition process in a data center environment.

Example 7 includes the subject matter of any of Examples 1 through 6, wherein the computing device is a first computing device, the profile is a curated profile, and the method further comprises receiving, from a second computing device different from the first device, input promoting the curated profile to a customer profile.

Example 8 includes the subject matter of Example 7, further comprising communicating a message recommending the curated profile from the first computing device to the second computing device.

Example 9 includes the subject matter of either Example 7 or Example 8, wherein receiving the input specifying the curated profile comprises receiving the input via a monitor interface.

Example 10 includes the subject matter of any of Examples 7 through 9, wherein: the curated profile includes a group of images including the image depicting the subject; and the method further comprises training a facial recognition process using the group of images.

Example 11 includes the subject matter of any of Examples 1 through 10, wherein receiving the input specifying the profile includes receiving identifiers of one or more locations the subject is authorized to access.

Example 12 includes the subject matter of any of Examples 1 through 11, wherein receiving the input includes receiving input specifying a customer profile.

Example 13 includes the subject matter of Example 12, wherein receiving the input specifying the customer profile includes receiving the input via a customer interface.

Example 14 includes the subject matter of Example 13, wherein receiving the input via the customer interface includes receiving the input via a mobile computing device.

Example 15 is an image capture device comprising an image sensor; a network interface; and at least one processor configured to receive, from a computing device via the network interface, input specifying a profile of a subject authorized to access a location; receive, from the image sensor, an image acquired at the location, the image depicting the subject; and refrain from initiating an alarm signal in response to detection of the subject based on the image and the profile.

Example 16 includes the subject matter of Example 15, wherein the image acquired at the location is a first image;

to receive the input comprises to receive a second image of a face of the subject; and the at least one processor is further configured to analyze the second image using a facial recognition process trained using one or more other images of the face of the subject.

Example 16.1 includes the subject matter of Example 15, wherein to receive the input comprises to receive an image of a face of the subject and the at least one processor is further configured to analyze the image using a facial recognition process trained using one or more other images of the face of the subject.

Example 17 is a device comprising a network interface; and at least one processor configured to receive, from a computing device via the network interface, input specifying a profile of a subject authorized to access a location; receive, from an image capture device, an image acquired at the location, the image depicting the subject; and refrain from initiating an alarm signal in response to detection of the subject based on the image and the profile.

Example 18 includes the subject matter of Example 17, wherein to receive the input comprises to receive an image of a face of the subject and the at least one processor is further configured to analyze the image using a facial recognition process trained using one or more other images of the face of the subject.

Example 19 is a server within a data center environment comprising a network interface; and at least one processor configured to receive, from a computing device via the network interface, input specifying a profile of a subject authorized to access a location; receive, from an image capture device, an image acquired at the location, the image depicting the subject; and refrain from initiating an alarm signal in response to detection of the subject based on the image and the profile.

Example 20 includes the subject matter of Example 19, wherein the image acquired at the location is a first image; to receive the input comprises to receive a second image of a face of the subject; and the at least one processor is further configured to analyze the second image using a facial recognition process trained using one or more other images of the face of the subject.

Example 21 includes the subject matter of Example 19, wherein the computing device is a first computing device; the profile is a curated profile; and the at least one processor is further configured to receive, from a second computing device different from the first computing device, input promoting the curated profile to a customer profile.

Use of ordinal terms such as "first", "second", "third", etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method comprising:
   receiving, at a computing device, at least one image of a subject;
   generating, based on the at least one image of the subject, a profile of the subject;
   transmitting profile filter data to a first device at a first location and to a second device at a second location, wherein the profile filter data characterizes a visual appearance of the subject;
   receiving input authorizing the subject to access the first location and the second location;
   receiving a first image acquired at the first location and a second image acquired at the second location;
   using the profile filter data to make a determination that at least one of the first image or the second image depicts the subject; and
   refraining, based on the profile, from initiating an alarm signal in response to making the determination.

2. The method of claim 1, wherein:
   the method further includes analyzing the at least one image of the subject that is received at the computing device using a facial recognition process trained using one or more other images of a face of the subject.

3. The method of claim 2, further comprising obtaining the one or more other images of the face of the subject from a camera roll maintained on a mobile computing device.

4. The method of claim 2, wherein analyzing the at least one image of the subject that is received at the computing device includes executing the facial recognition process on an image capture device.

5. The method of claim 2, wherein analyzing the at least one image of the subject that is received at the computing device includes executing the facial recognition process on a remote server.

6. The method of claim 2, wherein analyzing the at least one image of the subject that is received at the computing device includes executing the facial recognition process in a data center environment.

7. The method of claim 1, wherein:
the computing device is a first computing device;
the profile is a curated profile; and
the method further comprises receiving, from a second computing device different from the first computing device, input promoting the curated profile to a customer profile.

8. The method of claim 7, further comprising communicating a message recommending the curated profile from the first computing device to the second computing device.

9. The method of claim 1, further comprising receiving input specifying the profile to be a curated profile via a monitor interface.

10. The method of claim 7, wherein:
the curated profile includes a group of images including the at least one image of the subject; and
the method further comprises training a facial recognition process using the group of images.

11. The method of claim 1, wherein the at least one image of the subject that is received at the computing device is acquired before receiving the first image acquired at the first location and the second image acquired at the second location.

12. The method of claim 1, wherein receiving the at least one image of the subject at the computing device comprises receiving input via a customer interface of the computing device.

13. The method of claim 1, wherein receiving the at least one image of the subject at the computing device includes receiving input via a mobile computing device.

14. A server within a data center environment comprising:
a network interface; and
at least one processor configured to
receive, at the server, at least one image of a subject;
generate, based on the at least one image of the subject, a profile of the subject;
transmit profile filter data to a first device at a first location and to a second device at a second location, wherein the profile filter data characterizes a visual appearance of the subject;
receive input authorizing the subject to access the first location and the second location;
receive a first image acquired at the first location and a second image acquired at the second location, the first image and the second image depicting the subject; and
refrain, based on the profile, from initiating an alarm signal after a determination is made that at least one of the first image or the second image depicts the subject.

15. The server of claim 14, wherein:
the at least one processor is further configured to analyze the at least one image of the subject that is received at the server using a facial recognition process trained using one or more other images of a face of the subject.

16. The server of claim 14, wherein:
the profile is a curated profile; and
the at least one processor is further configured to receive, from a computing device, input promoting the curated profile to a customer profile.

17. The server of claim 14, wherein the at least one image of the subject is received from a camera roll maintained on a mobile computing device.

18. The server of claim 14, wherein the at least one image of the subject is received before receiving the first image acquired at the first location and the second image acquired at the second location.

* * * * *